US011305799B2

(12) United States Patent
Mesher

(10) Patent No.: US 11,305,799 B2
(45) Date of Patent: Apr. 19, 2022

(54) DEBRIS DEFLECTION AND REMOVAL METHOD FOR AN APPARATUS AND METHOD FOR GATHERING DATA FROM SENSORS ORIENTED AT AN OBLIQUE ANGLE RELATIVE TO A RAILWAY TRACK

(71) Applicant: TETRA TECH, INC., Pasadena, CA (US)

(72) Inventor: Darel Mesher, Spruce Grove (CA)

(73) Assignee: Tetra Tech, Inc., Pasadena, CA (US)

( * ) Notice: Subject to any disclaimer, the term of this patent is extended or adjusted under 35 U.S.C. 154(b) by 0 days.

(21) Appl. No.: 16/898,544

(22) Filed: Jun. 11, 2020

(65) Prior Publication Data

US 2020/0398876 A1  Dec. 24, 2020

Related U.S. Application Data

(63) Continuation of application No. 16/255,928, filed on Jan. 24, 2019, which is a continuation-in-part of application No. 16/127,956, filed on Sep. 11, 2018, now Pat. No. 10,625,760, application No.
(Continued)

(51) Int. Cl.
| | |
|---|---|
| *B61L 23/04* | (2006.01) |
| *B61L 23/00* | (2006.01) |
| *G01S 19/50* | (2010.01) |
| *B61K 9/08* | (2006.01) |
| *G01B 11/25* | (2006.01) |
| *G01D 11/24* | (2006.01) |

(Continued)

(52) U.S. Cl.
CPC ............. *B61L 23/045* (2013.01); *B61L 23/00* (2013.01); *G01S 19/50* (2013.01); *B61K 9/08* (2013.01); *B61L 23/047* (2013.01); *G01B 11/25* (2013.01); *G01D 5/245* (2013.01); *G01D 11/245* (2013.01); *G01D 11/26* (2013.01)

(58) Field of Classification Search
CPC ...... B61L 23/045; B61L 23/00; B61L 23/047; B61K 9/08; G01S 19/50; G01D 11/26; G01D 11/245
See application file for complete search history.

(56) References Cited

U.S. PATENT DOCUMENTS

| | | |
|---|---|---|
| 3,562,419 A | 2/1971 | Stewart et al. |
| 3,942,000 A | 3/1976 | Dieringer |
| 4,040,738 A | 8/1977 | Wagner |
| 4,198,164 A | 4/1980 | Cantor |
| 4,265,545 A | 5/1981 | Slaker |
| 4,330,775 A | 5/1982 | Iwamoto et al. |

(Continued)

FOREIGN PATENT DOCUMENTS

| | | |
|---|---|---|
| CA | 2061014 A1 | 8/1992 |
| CA | 2069971 | 3/1993 |
| CA | 2574428 A1 | 2/2006 |
| CA | 2607634 A1 | 4/2008 |

(Continued)

OTHER PUBLICATIONS

US 8,548,242 B1, 10/2013, Longacre, Jr. (withdrawn)
(Continued)

*Primary Examiner* — Manuel L Barbee
(74) *Attorney, Agent, or Firm* — Robinson Law, PLLC

(57) ABSTRACT

A system and method for inspecting a railway track using sensors oriented at an oblique angle relative to a rail vehicle on which the system is traveling. The use of an air blower, ducts, and one or more air distribution lids over the sensors helps remove debris from blocking the sensors and structured light generators.

8 Claims, 48 Drawing Sheets

Related U.S. Application Data

16/898,544, which is a continuation of application No. 16/255,928, filed on Jan. 24, 2019.

(60) Provisional application No. 62/679,467, filed on Jun. 1, 2018.

(51) Int. Cl.
  *G01D 11/26* (2006.01)
  *G01D 5/245* (2006.01)

(56) References Cited

U.S. PATENT DOCUMENTS

| | | |
|---|---|---|
| 4,490,038 A | 12/1984 | Theurer et al. |
| 4,531,837 A | 7/1985 | Panetti |
| 4,554,624 A | 11/1985 | Wickham et al. |
| 4,600,012 A | 7/1986 | Kohayakawa et al. |
| 4,653,316 A | 3/1987 | Fukuhara |
| 4,676,642 A | 6/1987 | French |
| 4,691,565 A | 9/1987 | Theurer |
| 4,700,223 A | 10/1987 | Shoutaro et al. |
| 4,731,853 A | 3/1988 | Hata |
| 4,775,238 A | 10/1988 | Weber |
| 4,781,060 A | 11/1988 | Berndt |
| 4,899,296 A | 2/1990 | Khattak |
| 4,900,153 A | 2/1990 | Weber et al. |
| 4,915,504 A | 4/1990 | Thurston |
| 4,974,168 A | 11/1990 | Marx |
| 5,199,176 A | 4/1993 | Theurer et al. |
| 5,203,089 A | 4/1993 | Trefouel et al. |
| 5,221,044 A | 6/1993 | Guins |
| 5,245,855 A | 9/1993 | Burgel et al. |
| 5,247,338 A | 9/1993 | Danneskiold-Samsoe et al. |
| 5,275,051 A | 1/1994 | De Beer |
| 5,353,512 A | 10/1994 | Theurer et al. |
| 5,433,111 A | 7/1995 | Hershey et al. |
| 5,487,341 A | 1/1996 | Newman |
| 5,493,499 A | 2/1996 | Theurer et al. |
| 5,612,538 A | 3/1997 | Hackel et al. |
| 5,623,244 A | 4/1997 | Cooper |
| 5,627,508 A | 5/1997 | Cooper et al. |
| 5,671,679 A | 9/1997 | Straub et al. |
| 5,721,685 A | 2/1998 | Holland et al. |
| 5,743,495 A | 4/1998 | Welles |
| 5,744,815 A | 4/1998 | Gurevich et al. |
| 5,757,472 A | 5/1998 | Wangler et al. |
| 5,786,750 A | 7/1998 | Cooper |
| 5,787,815 A | 8/1998 | Andersson et al. |
| 5,791,063 A | 8/1998 | Kesler et al. |
| 5,793,491 A | 8/1998 | Wangler et al. |
| 5,793,492 A | 8/1998 | Vanaki |
| 5,804,731 A | 9/1998 | Jaeggi |
| 5,808,906 A | 9/1998 | Sanchez-Revuelta et al. |
| 5,912,451 A | 6/1999 | Gurevich et al. |
| 5,969,323 A | 10/1999 | Gurevich |
| 5,970,438 A | 10/1999 | Clark et al. |
| 5,986,547 A | 11/1999 | Korver et al. |
| 6,025,920 A | 2/2000 | Dec |
| 6,055,322 A | 4/2000 | Salganicoff |
| 6,055,862 A | 5/2000 | Martens |
| 6,062,476 A | 5/2000 | Stern et al. |
| 6,064,428 A | 5/2000 | Trosino et al. |
| 6,069,967 A | 5/2000 | Rozmus et al. |
| 6,128,558 A | 10/2000 | Kernwein |
| 6,243,657 B1 | 6/2001 | Tuck et al. |
| 6,252,977 B1 | 6/2001 | Salganicoff |
| 6,324,912 B1 | 12/2001 | Wooh |
| 6,347,265 B1 | 2/2002 | Bidaud |
| 6,356,299 B1 | 3/2002 | Trosino et al. |
| 6,357,297 B1 | 3/2002 | Makino et al. |
| 6,405,141 B1 | 6/2002 | Carr et al. |
| 6,416,020 B1 | 7/2002 | Gronskov |
| 6,496,254 B2 | 12/2002 | Bostrom |
| 6,523,411 B1 | 2/2003 | Mian et al. |
| 6,540,180 B2 | 4/2003 | Anderson |
| 6,570,497 B2 | 5/2003 | Puckette, IV |
| 6,600,999 B2 | 7/2003 | Clark et al. |
| 6,615,648 B1 | 9/2003 | Ferguson et al. |
| 6,647,891 B2 | 11/2003 | Holmes et al. |
| 6,665,066 B2 | 12/2003 | Nair et al. |
| 6,681,160 B2 | 1/2004 | Bidaud |
| 6,698,279 B1 | 3/2004 | Stevenson |
| 6,715,354 B2 | 4/2004 | Wooh |
| 6,768,551 B2 | 7/2004 | Mian et al. |
| 6,768,959 B2 | 7/2004 | Ignagni |
| 6,804,621 B1 | 10/2004 | Pedanckar |
| 6,854,333 B2 | 2/2005 | Wooh |
| 6,862,936 B2 | 3/2005 | Kenderian et al. |
| 6,873,998 B1 | 3/2005 | Dorum |
| 6,909,514 B2 | 6/2005 | Nayebi |
| 7,023,539 B2 | 4/2006 | Kowalski |
| 7,034,272 B1 | 4/2006 | Leonard |
| 7,036,232 B2 | 5/2006 | Casagrande |
| 7,054,762 B2 | 5/2006 | Pagano et al. |
| 7,084,989 B2 | 8/2006 | Johannesson et al. |
| 7,130,753 B2 | 10/2006 | Pedanekar |
| 7,152,347 B2 | 12/2006 | Herzog et al. |
| 7,164,476 B2 | 1/2007 | Shima et al. |
| 7,208,733 B2 | 4/2007 | Mian et al. |
| 7,213,789 B1 | 5/2007 | Matzan |
| 7,298,548 B2 | 11/2007 | Mian |
| 7,328,871 B2 | 2/2008 | Mace et al. |
| 7,355,508 B2 | 4/2008 | Mian et al. |
| 7,357,326 B2 | 4/2008 | Hattersley et al. |
| 7,392,117 B1 | 6/2008 | Bilodeau et al. |
| 7,392,595 B2 | 7/2008 | Heimann |
| 7,403,296 B2 | 7/2008 | Farritor et al. |
| 7,412,899 B2 | 8/2008 | Mian et al. |
| 7,463,348 B2 | 12/2008 | Chung |
| 7,499,186 B2 | 3/2009 | Waisanen |
| 7,502,670 B2 | 3/2009 | Harrison |
| 7,516,662 B2 | 4/2009 | Nieisen et al. |
| 7,555,954 B2 | 7/2009 | Pagano et al. |
| 7,564,569 B2 | 7/2009 | Mian et al. |
| 7,602,937 B2 | 10/2009 | Mian et al. |
| 7,616,329 B2 | 11/2009 | Villar et al. |
| 7,659,972 B2 | 2/2010 | Magnus et al. |
| 7,680,631 B2 | 3/2010 | Selig et al. |
| 7,681,468 B2 | 3/2010 | Verl et al. |
| 7,698,028 B1 | 4/2010 | Bilodeau et al. |
| 7,755,660 B2 | 7/2010 | Nejikovsky et al. |
| 7,755,774 B2 | 7/2010 | Farritor et al. |
| 7,769,538 B2 | 8/2010 | Rousseau |
| 7,832,281 B2 | 11/2010 | Mian et al. |
| 7,869,909 B2 | 1/2011 | Harrison |
| 7,882,742 B1 | 2/2011 | Martens |
| 7,899,207 B2 | 3/2011 | Mian et al. |
| 7,920,984 B2 | 4/2011 | Farritor |
| 7,937,246 B2 | 5/2011 | Farritor et al. |
| 7,942,058 B2 | 5/2011 | Turner |
| 8,006,559 B2 | 8/2011 | Mian et al. |
| 8,079,274 B2 | 12/2011 | Mian et al. |
| 8,081,320 B2 | 12/2011 | Villar et al. |
| 8,111,387 B2 | 2/2012 | Douglas et al. |
| 8,140,250 B2 | 3/2012 | Mian et al. |
| 8,150,105 B2 | 4/2012 | Mian et al. |
| 8,155,809 B1 | 4/2012 | Bilodeau et al. |
| 8,180,590 B2 | 5/2012 | Szwilski et al. |
| 8,188,430 B2 | 5/2012 | Mian et al. |
| 8,190,377 B2 | 5/2012 | Fu |
| 8,209,145 B2 | 6/2012 | Paglinco et al. |
| 8,263,953 B2 | 9/2012 | Fomenkov et al. |
| 8,289,526 B2 | 10/2012 | Kilian et al. |
| 8,326,582 B2 | 12/2012 | Mian et al. |
| 8,335,606 B2 | 12/2012 | Mian et al. |
| 8,345,948 B2 | 1/2013 | Zarembski et al. |
| 8,345,099 B2 | 2/2013 | Bloom et al. |
| 8,365,604 B2 | 2/2013 | Kahn |
| 8,405,837 B2 | 3/2013 | Nagle, II et al. |
| 8,412,393 B2 | 4/2013 | Anderson |
| 8,418,563 B2 | 4/2013 | Wigh et al. |
| 8,423,240 B2 | 4/2013 | Mian et al. |
| 8,424,387 B2 | 4/2013 | Wigh et al. |
| 8,478,480 B2 | 7/2013 | Mian et al. |

(56) References Cited

U.S. PATENT DOCUMENTS

| | | |
|---|---|---|
| 8,485,035 B2 | 7/2013 | Wigh et al. |
| 8,490,887 B2 | 7/2013 | Jones |
| 8,514,387 B2 | 8/2013 | Scherf et al. |
| 8,577,647 B2 | 11/2013 | Farritor et al. |
| 8,615,110 B2 | 12/2013 | Landes |
| 8,625,878 B2 | 1/2014 | Haas et al. |
| 8,649,932 B2 | 2/2014 | Mian et al. |
| 8,655,540 B2 | 2/2014 | Mian et al. |
| 8,682,077 B1 | 3/2014 | Longacre, Jr. |
| 8,700,924 B2 | 4/2014 | Mian et al. |
| 8,711,222 B2 | 4/2014 | Aaron et al. |
| 8,724,904 B2 | 5/2014 | Fujiki |
| 8,806,948 B2 | 8/2014 | Kahn et al. |
| 8,818,585 B2 | 8/2014 | Bartonek |
| 8,820,166 B2 | 9/2014 | Wigh et al. |
| 8,868,291 B2 | 10/2014 | Mian et al. |
| 8,875,635 B2 | 11/2014 | Turner et al. |
| 8,887,572 B2 | 11/2014 | Turner |
| 8,903,574 B2 | 12/2014 | Cooper et al. |
| 8,925,873 B2 | 1/2015 | Gamache et al. |
| 8,934,007 B2 | 1/2015 | Snead |
| 8,942,426 B2 | 1/2015 | Bar-am |
| 8,958,079 B2 | 2/2015 | Kainer et al. |
| 9,036,025 B2 | 5/2015 | Haas et al. |
| 9,049,433 B1 | 6/2015 | Prince |
| 9,050,984 B2 | 6/2015 | Li et al. |
| 9,111,444 B2 | 8/2015 | Kaganovich |
| 9,121,747 B2 | 9/2015 | Mian et al. |
| 9,134,185 B2 | 9/2015 | Mian et al. |
| 9,175,998 B2 | 11/2015 | Turner et al. |
| 9,177,210 B2 | 11/2015 | King |
| 9,187,104 B2 | 11/2015 | Fang et al. |
| 9,195,907 B1 | 11/2015 | Longacre, Jr. |
| 9,205,849 B2 | 12/2015 | Cooper et al. |
| 9,205,850 B2 | 12/2015 | Shimada |
| 9,212,902 B2 | 12/2015 | Enomoto et al. |
| 9,222,904 B2 | 12/2015 | Harrison |
| 9,234,786 B2 | 1/2016 | Groll et al. |
| 9,255,913 B2 | 2/2016 | Kumar et al. |
| 9,297,787 B2 | 3/2016 | Fisk |
| 9,310,340 B2 | 4/2016 | Mian et al. |
| 9,336,683 B2 | 5/2016 | Inomata et al. |
| 9,340,219 B2 | 5/2016 | Gamache et al. |
| 9,346,476 B2 | 5/2016 | Dargy et al. |
| 9,347,864 B2 | 5/2016 | Farritor et al. |
| 9,389,205 B2 | 7/2016 | Mian et al. |
| 9,415,784 B2 | 8/2016 | Bartonek et al. |
| 9,423,415 B2 | 8/2016 | Nanba et al. |
| 9,429,545 B2 | 8/2016 | Havira et al. |
| 9,441,956 B2 | 9/2016 | Kainer et al. |
| 9,446,776 B2 | 9/2016 | Cooper et al. |
| 9,454,816 B2 | 9/2016 | Mian et al. |
| 9,469,198 B2 | 10/2016 | Cooper et al. |
| 9,518,947 B2 | 12/2016 | Bartonek et al. |
| 9,533,698 B2 | 1/2017 | Warta |
| 9,562,878 B2 | 2/2017 | Graham et al. |
| 9,571,796 B2 | 2/2017 | Mian et al. |
| 9,575,007 B2 | 2/2017 | Rao et al. |
| 9,580,091 B2 | 2/2017 | Kraeling et al. |
| 9,581,998 B2 | 2/2017 | Cooper et al. |
| 9,607,446 B2 | 3/2017 | Cooper et al. |
| 9,618,335 B2 | 4/2017 | Mesher |
| 9,619,691 B2 | 4/2017 | Pang et al. |
| 9,619,725 B2 | 4/2017 | King |
| 9,628,762 B2 | 4/2017 | Farritor |
| 9,664,567 B2 | 5/2017 | Sivathanu et al. |
| 9,669,852 B2 | 6/2017 | Combs |
| 9,671,358 B2 | 6/2017 | Cooper et al. |
| 9,689,760 B2 | 6/2017 | Lanza di Scalea et al. |
| 9,714,043 B2 | 7/2017 | Mian et al. |
| 9,744,978 B2 | 8/2017 | Bhattacharjya et al. |
| 9,752,993 B1 | 9/2017 | Thompson et al. |
| 9,771,090 B2 | 9/2017 | Warta |
| 9,796,400 B2 | 10/2017 | Puttagunta et al. |
| 9,810,533 B2 | 11/2017 | Fosburgh et al. |
| 9,825,662 B2 | 11/2017 | Mian et al. |
| 9,849,894 B2 | 12/2017 | Mesher |
| 9,849,895 B2 | 12/2017 | Mesher |
| 9,860,962 B2 | 1/2018 | Mesher |
| 9,873,442 B2 | 1/2018 | Mesher |
| 9,921,584 B2 | 3/2018 | Rao et al. |
| 9,922,416 B2 | 3/2018 | Mian et al. |
| 9,950,716 B2 | 4/2018 | English |
| 9,950,720 B2 | 4/2018 | Mesher |
| 9,981,671 B2 | 5/2018 | Fraser et al. |
| 9,981,675 B2 | 5/2018 | Cooper et al. |
| 9,983,593 B2 | 5/2018 | Cooper et al. |
| 9,989,498 B2 | 6/2018 | Lanza di Scalea et al. |
| 10,035,498 B2 | 7/2018 | Richardson et al. |
| 10,040,463 B2 | 8/2018 | Singh |
| 10,043,154 B2 | 8/2018 | King |
| 10,077,061 B2 | 9/2018 | Schmidt et al. |
| 10,081,376 B2 | 9/2018 | Singh |
| 10,086,857 B2 | 10/2018 | Puttagunta et al. |
| 10,167,003 B1 | 1/2019 | Bilodeau |
| 10,286,877 B2 | 5/2019 | Lopez Galera et al. |
| 10,322,734 B2 | 6/2019 | Mesher |
| 10,349,491 B2 | 7/2019 | Mesher |
| 10,352,831 B2 | 7/2019 | Kondo et al. |
| 10,362,293 B2 | 7/2019 | Mesher |
| 10,384,697 B2 | 8/2019 | Mesher |
| 10,392,035 B2 | 8/2019 | Berggren |
| 10,401,500 B2 | 9/2019 | Fang et al. |
| 10,408,606 B1 | 9/2019 | Raab |
| 10,414,416 B2 | 9/2019 | Hampapur |
| 10,502,831 B2 | 12/2019 | Eichenholz |
| 10,518,791 B2 | 12/2019 | Singh |
| 10,543,861 B1 | 1/2020 | Bartek et al. |
| 10,582,187 B2 | 3/2020 | Mesher |
| 10,611,389 B2 | 4/2020 | Khosla |
| 10,613,550 B2 | 4/2020 | Khosla |
| 10,616,556 B2 | 4/2020 | Mesher |
| 10,616,557 B2 | 4/2020 | Mesher |
| 10,616,558 B2 | 4/2020 | Mesher |
| 10,618,537 B2 | 4/2020 | Khosla |
| 10,625,760 B2 | 4/2020 | Mesher |
| 10,730,538 B2 | 8/2020 | Mesher |
| 10,796,192 B2 | 10/2020 | Fernandez |
| 10,816,347 B2 | 10/2020 | Wygant et al. |
| 10,822,008 B2 | 11/2020 | Wade |
| 10,829,135 B2 | 11/2020 | Anderson et al. |
| 10,908,291 B2 | 2/2021 | Mesher |
| 10,989,694 B2 | 4/2021 | Kawabata et al. |
| 11,001,283 B2 | 5/2021 | Dick et al. |
| 11,169,269 B2 | 11/2021 | Mesher |
| 2001/0045495 A1 | 11/2001 | Olson et al. |
| 2002/0065610 A1 | 5/2002 | Clark et al. |
| 2002/0070283 A1 | 6/2002 | Young |
| 2002/0093487 A1 | 7/2002 | Rosenberg |
| 2002/0099507 A1 | 7/2002 | Clark et al. |
| 2002/0150278 A1 | 10/2002 | Wustefeld |
| 2002/0196456 A1 | 12/2002 | Komiya et al. |
| 2003/0059087 A1 | 3/2003 | Waslowski et al. |
| 2003/0062414 A1 | 4/2003 | Tsikos et al. |
| 2003/0072001 A1 | 4/2003 | Mian et al. |
| 2003/0075675 A1 | 4/2003 | Braune et al. |
| 2003/0140509 A1 | 7/2003 | Casagrande |
| 2003/0160193 A1 | 8/2003 | Reveulta et al. |
| 2003/0164053 A1 | 9/2003 | Ignagni |
| 2004/0021858 A1 | 2/2004 | Shima et al. |
| 2004/0084069 A1 | 5/2004 | Woodard |
| 2004/0088891 A1 | 5/2004 | Theurer |
| 2004/0122569 A1 | 6/2004 | Bidaud |
| 2004/0189452 A1 | 9/2004 | Li |
| 2004/0247157 A1 | 12/2004 | Lages |
| 2004/0263624 A1 | 12/2004 | Nejikovsky |
| 2005/0121539 A1 | 6/2005 | Takada et al. |
| 2005/0244585 A1 | 11/2005 | Schmeling |
| 2005/0279240 A1 | 12/2005 | Pedanekar et al. |
| 2006/0017911 A1 | 1/2006 | Villar |
| 2006/0098843 A1 | 5/2006 | Chew |
| 2006/0171704 A1 | 8/2006 | Single |
| 2006/0231685 A1 | 10/2006 | Mace et al. |
| 2007/0136029 A1 | 6/2007 | Selig et al. |

(56) References Cited

U.S. PATENT DOCUMENTS

| | | |
|---|---|---|
| 2007/0150130 A1 | 6/2007 | Welles |
| 2007/0211145 A1 | 9/2007 | Kilian et al. |
| 2007/0265780 A1 | 11/2007 | Kesler et al. |
| 2007/0289478 A1 | 12/2007 | Becker et al. |
| 2008/0007724 A1 | 1/2008 | Chung |
| 2008/0177507 A1 | 7/2008 | Mian et al. |
| 2008/0212106 A1 | 9/2008 | Hoffmann |
| 2008/0298674 A1 | 12/2008 | Baker |
| 2008/0304065 A1 | 12/2008 | Hesser |
| 2008/0304083 A1 | 12/2008 | Farritor et al. |
| 2009/0040503 A1 | 2/2009 | Kilian |
| 2009/0073428 A1 | 3/2009 | Magnus |
| 2009/0196486 A1 | 8/2009 | Distante et al. |
| 2009/0250533 A1 | 10/2009 | Akiyama et al. |
| 2009/0273788 A1 | 11/2009 | Nagle et al. |
| 2009/0319197 A1 | 12/2009 | Villar et al. |
| 2010/0007551 A1 | 1/2010 | Pagliuco |
| 2010/0026551 A1 | 2/2010 | Szwilski |
| 2010/0106309 A1 | 4/2010 | Grohman et al. |
| 2010/0207936 A1 | 8/2010 | Minear |
| 2010/0289891 A1 | 11/2010 | Akiyama |
| 2011/0064273 A1 | 3/2011 | Zarembski et al. |
| 2011/0209549 A1 | 9/2011 | Kahn |
| 2011/0251742 A1 | 10/2011 | Haas et al. |
| 2012/0026352 A1 | 2/2012 | Natroshvilli et al. |
| 2012/0051643 A1 | 3/2012 | Ha et al. |
| 2012/0062731 A1 | 3/2012 | Enomoto et al. |
| 2012/0192756 A1 | 8/2012 | Miller et al. |
| 2012/0218868 A1 | 8/2012 | Kahn et al. |
| 2012/0222579 A1 | 9/2012 | Turner et al. |
| 2012/0245908 A1 | 9/2012 | Berggren |
| 2012/0263342 A1 | 10/2012 | Haas |
| 2012/0300060 A1 | 11/2012 | Farritor |
| 2013/0070083 A1 | 3/2013 | Snead |
| 2013/0092758 A1 | 4/2013 | Tanaka et al. |
| 2013/0096739 A1 | 4/2013 | Landes et al. |
| 2013/0155061 A1 | 6/2013 | Jahanashahi et al. |
| 2013/0170709 A1 | 7/2013 | Distante et al. |
| 2013/0191070 A1 | 7/2013 | Kainer |
| 2013/0202090 A1 | 8/2013 | Belcher et al. |
| 2013/0231873 A1 | 9/2013 | Fraser |
| 2013/0276539 A1 | 10/2013 | Wagner et al. |
| 2013/0313372 A1 | 11/2013 | Gamache et al. |
| 2013/0317676 A1 | 11/2013 | Cooper et al. |
| 2014/0069193 A1 | 3/2014 | Graham et al. |
| 2014/0129154 A1 | 5/2014 | Cooper |
| 2014/0142868 A1 | 5/2014 | Bidaud |
| 2014/0151512 A1 | 6/2014 | Cooper |
| 2014/0177656 A1 | 6/2014 | Mian et al. |
| 2014/0200952 A1 | 7/2014 | Hampapur et al. |
| 2014/0333771 A1 | 11/2014 | Mian et al. |
| 2014/0339374 A1 | 11/2014 | Mian et al. |
| 2015/0106038 A1 | 4/2015 | Turner |
| 2015/0131108 A1 | 5/2015 | Kainer et al. |
| 2015/0219487 A1 | 8/2015 | Maraini |
| 2015/0225002 A1 | 8/2015 | Branka et al. |
| 2015/0268172 A1 | 9/2015 | Naithani et al. |
| 2015/0269722 A1 | 9/2015 | Naithani et al. |
| 2015/0284912 A1 | 10/2015 | Delmonic et al. |
| 2015/0285688 A1 | 10/2015 | Naithani et al. |
| 2015/0375765 A1 | 12/2015 | Mustard |
| 2016/0002865 A1 | 1/2016 | English et al. |
| 2016/0039439 A1 | 2/2016 | Fahmy et al. |
| 2016/0059623 A1 | 3/2016 | Kilian |
| 2016/0121912 A1 | 5/2016 | Puttagunta et al. |
| 2016/0159381 A1 | 6/2016 | Fahmy |
| 2016/0207551 A1 | 7/2016 | Mesher |
| 2016/0209003 A1 | 7/2016 | Mesher |
| 2016/0212826 A1 | 7/2016 | Mesher |
| 2016/0249040 A1 | 8/2016 | Mesher |
| 2016/0282108 A1 | 9/2016 | Martinod Restrepo et al. |
| 2016/0304104 A1 | 10/2016 | Witte et al. |
| 2016/0305915 A1 | 10/2016 | Witte et al. |
| 2016/0312412 A1 | 10/2016 | Schrunk, III |
| 2016/0318530 A1 | 11/2016 | Johnson |
| 2016/0321513 A1 | 11/2016 | Mitti et al. |
| 2016/0325767 A1 | 11/2016 | LeFabvre et al. |
| 2016/0368510 A1 | 12/2016 | Simon et al. |
| 2017/0029001 A1 | 2/2017 | Berggren |
| 2017/0034892 A1 | 2/2017 | Mesher |
| 2017/0066459 A1 | 3/2017 | Singh |
| 2017/0106885 A1* | 4/2017 | Singh ..................... G01B 11/22 |
| 2017/0106887 A1 | 4/2017 | Mian et al. |
| 2017/0182980 A1 | 6/2017 | Davies et al. |
| 2017/0203775 A1 | 7/2017 | Mesher |
| 2017/0205379 A1 | 7/2017 | Prince et al. |
| 2017/0219471 A1 | 8/2017 | Fisk et al. |
| 2017/0267264 A1 | 9/2017 | English et al. |
| 2017/0297536 A1 | 10/2017 | Giraud et al. |
| 2017/0305442 A1 | 10/2017 | Viviani |
| 2017/0313286 A1 | 11/2017 | Giraud et al. |
| 2017/0313332 A1 | 11/2017 | Paget et al. |
| 2017/0336293 A1 | 11/2017 | Kondo et al. |
| 2018/0038957 A1 | 2/2018 | Kawazoe et al. |
| 2018/0039842 A1 | 2/2018 | Schuchmann et al. |
| 2018/0057030 A1 | 3/2018 | Puttagunta et al. |
| 2018/0079433 A1 | 3/2018 | Mesher |
| 2018/0079434 A1 | 3/2018 | Mesher |
| 2018/0106000 A1 | 4/2018 | Fruehwirt |
| 2018/0120440 A1 | 5/2018 | O'Keefe |
| 2018/0127006 A1 | 5/2018 | Wade |
| 2018/0220512 A1 | 8/2018 | Mesher |
| 2018/0222504 A1 | 8/2018 | Birch et al. |
| 2018/0276494 A1 | 9/2018 | Fernandez |
| 2018/0281829 A1 | 10/2018 | Euston et al. |
| 2018/0339720 A1 | 11/2018 | Singh |
| 2018/0370552 A1 | 12/2018 | Puttagunta et al. |
| 2018/0372875 A1 | 12/2018 | Juelsgaard et al. |
| 2019/0039633 A1 | 2/2019 | Li |
| 2019/0054937 A1 | 2/2019 | Graetz |
| 2019/0107607 A1 | 4/2019 | Danziger |
| 2019/0135315 A1 | 5/2019 | Dargy et al. |
| 2019/0154800 A1* | 5/2019 | Schmidt ................ G01S 7/4817 |
| 2019/0156569 A1 | 5/2019 | Jung et al. |
| 2019/0179026 A1 | 6/2019 | Englard et al. |
| 2019/0248393 A1 | 8/2019 | Khosla |
| 2019/0310470 A1* | 10/2019 | Weindorf ................ B60R 11/04 |
| 2019/0349563 A1 | 11/2019 | Mesher |
| 2019/0349564 A1 | 11/2019 | Mesher |
| 2019/0349565 A1 | 11/2019 | Mesher |
| 2019/0349566 A1 | 11/2019 | Mesher |
| 2019/0357337 A1 | 11/2019 | Mesher |
| 2019/0367060 A1 | 12/2019 | Mesher |
| 2019/0367061 A1 | 12/2019 | Mesher |
| 2020/0025578 A1 | 1/2020 | Wygant et al. |
| 2020/0034637 A1 | 1/2020 | Olson et al. |
| 2020/0086903 A1 | 3/2020 | Mesher |
| 2020/0116865 A1 | 4/2020 | Yang et al. |
| 2020/0156677 A1 | 5/2020 | Mesher |
| 2020/0160733 A1 | 5/2020 | Dick et al. |
| 2020/0164904 A1 | 5/2020 | Dick et al. |
| 2020/0180667 A1 | 6/2020 | Kim et al. |
| 2020/0198672 A1 | 6/2020 | Underwood et al. |
| 2020/0221066 A1 | 7/2020 | Mesher |
| 2020/0231193 A1 | 7/2020 | Chen et al. |
| 2020/0239049 A1 | 7/2020 | Dick et al. |
| 2020/0302592 A1 | 9/2020 | Ebersohn et al. |
| 2020/0346673 A1 | 11/2020 | Mesher |
| 2020/0363532 A1 | 11/2020 | Mesher |
| 2020/0400542 A1 | 12/2020 | Fisk et al. |
| 2021/0019548 A1 | 1/2021 | Fernandez |
| 2021/0041398 A1 | 2/2021 | Van Wyk et al. |
| 2021/0041877 A1 | 2/2021 | Lacaze et al. |
| 2021/0049783 A1 | 2/2021 | Saniei et al. |
| 2021/0061322 A1 | 3/2021 | Dick et al. |
| 2021/0072393 A1 | 3/2021 | Mesher |
| 2021/0078622 A1 | 3/2021 | Miller et al. |
| 2021/0229714 A1 | 7/2021 | Dick et al. |

FOREIGN PATENT DOCUMENTS

| | | |
|---|---|---|
| CA | 2574428 C | 10/2009 |
| CA | 2782341 A1 | 6/2011 |
| CA | 2844113 | 2/2013 |

(56) References Cited

FOREIGN PATENT DOCUMENTS

| | | |
|---|---|---|
| CA | 2986580 | 9/2014 |
| CA | 2867560 A1 | 4/2015 |
| CA | 2607634 C | 6/2015 |
| CA | 2945614 | 10/2015 |
| CA | 2945614 A1 | 10/2015 |
| CA | 2732971 | 1/2016 |
| CA | 2996128 | 3/2016 |
| CA | 2860073 | 5/2016 |
| CA | 2867560 C | 7/2017 |
| CA | 2955105 | 7/2017 |
| CN | 104751602 | 7/2015 |
| CN | 106291538 A | 1/2017 |
| CN | 106364503 A | 2/2017 |
| CN | 106373191 A | 2/2017 |
| CN | 106384190 A | 2/2017 |
| CN | 1045356526 | 6/2017 |
| CN | 107688024 A | 2/2018 |
| CN | 206984011 U | 2/2018 |
| CN | 108009484 A | 5/2018 |
| CN | 108657222 | 10/2018 |
| CN | 113626975 A | 9/2021 |
| DE | 19831176 | 1/2000 |
| DE | 19831215 | 1/2000 |
| DE | 10040139 | 7/2002 |
| DE | 19826422 | 9/2002 |
| DE | 60015268 | 3/2005 |
| DE | 19943744 | 1/2006 |
| DE | 19919604 | 8/2009 |
| DE | 102012207427 | 7/2013 |
| DE | 102009018036 | 2/2014 |
| DE | 102014119056 | 6/2016 |
| EP | 0274081 | 7/1988 |
| EP | 1079322 | 2/2001 |
| EP | 1146353 | 10/2001 |
| EP | 1158460 | 11/2001 |
| EP | 1168269 | 1/2002 |
| EP | 1197417 A1 | 4/2002 |
| EP | 1236634 A1 | 9/2002 |
| EP | 1098803 | 1/2003 |
| EP | 1600351 | 1/2007 |
| EP | 1892503 | 7/2007 |
| EP | 1918702 A2 | 5/2008 |
| EP | 1964026 | 9/2008 |
| EP | 1992167 | 5/2016 |
| EP | 3024123 | 5/2016 |
| EP | 2806065 | 9/2016 |
| EP | 3138753 A1 | 3/2017 |
| EP | 3138754 A1 | 3/2017 |
| EP | 2697738 | 8/2017 |
| EP | 2697738 B1 | 8/2017 |
| EP | 2998927 | 9/2018 |
| EP | 3431359 | 1/2019 |
| EP | 3561501 | 10/2019 |
| EP | 3105599 | 4/2020 |
| EP | 3433154 | 6/2020 |
| EP | 3658439 | 6/2020 |
| EP | 3689706 | 8/2020 |
| EP | 3685117 B1 | 11/2021 |
| FR | 2674809 | 10/1992 |
| FR | 3049255 A1 | 9/2017 |
| FR | 3077553 | 2/2018 |
| FR | 304925561 | 4/2018 |
| FR | 3052416 | 7/2019 |
| FR | 3077553 | 8/2019 |
| GB | 2265779 | 10/1993 |
| GB | 2378344 | 2/2003 |
| GB | 2383635 B | 6/2005 |
| GB | 2403861 | 3/2006 |
| GB | 2419759 | 2/2007 |
| GB | 2536746 | 9/2016 |
| GB | 2536746 B | 3/2017 |
| JP | 51001138 B1 | 1/1976 |
| JP | 60039555 | 3/1985 |
| JP | 63302314 | 12/1988 |
| JP | 6011316 | 1/1994 |
| JP | 06322707 | 11/1994 |
| JP | H07146131 | 6/1995 |
| JP | 7280532 | 10/1995 |
| JP | H07294443 | 11/1995 |
| JP | H07294444 | 11/1995 |
| JP | 10332324 | 12/1998 |
| JP | 11172606 | 6/1999 |
| JP | 2000221146 | 8/2000 |
| JP | 2000241360 | 9/2000 |
| JP | H0924828 | 7/2002 |
| JP | 2002294610 | 10/2002 |
| JP | 2003074004 | 3/2003 |
| JP | 2003121556 | 4/2003 |
| JP | 2004132881 | 4/2004 |
| JP | 2007240342 | 9/2007 |
| JP | 4008082 | 11/2007 |
| JP | 2010229642 A | 10/2010 |
| JP | 5283548 | 9/2013 |
| JP | 5812595 | 11/2015 |
| JP | 2015209205 | 11/2015 |
| JP | 2016191264 A | 11/2016 |
| JP | 6068012 B2 | 1/2017 |
| JP | 2017020862 A | 1/2017 |
| JP | 6192717 B2 | 9/2017 |
| JP | 6327413 B2 | 5/2018 |
| JP | 6425990 B2 | 11/2018 |
| JP | 2019065650 A | 4/2019 |
| JP | 6530979 B2 | 6/2019 |
| KR | 101562635 | 10/2015 |
| KR | 101706271 B1 | 2/2017 |
| KR | 1020180061929 A | 6/2018 |
| RU | 2142892 | 12/1999 |
| RU | 101851 | 1/2011 |
| SU | 1418105 | 8/1988 |
| WO | 2000/05576 A2 | 2/2000 |
| WO | 2000/08459 | 2/2000 |
| WO | 2000-73118 A1 | 12/2000 |
| WO | 2001/066401 A1 | 9/2001 |
| WO | 01/86227 | 11/2001 |
| WO | 2001066401 | 5/2003 |
| WO | 2005/036199 A2 | 4/2005 |
| WO | 2005036199 | 4/2005 |
| WO | 2005098352 | 10/2005 |
| WO | 2006008292 | 1/2006 |
| WO | 2006014893 | 2/2006 |
| WO | 2010091970 | 8/2010 |
| WO | 2011002534 | 1/2011 |
| WO | 2011126802 | 10/2011 |
| WO | 2012142548 A1 | 10/2012 |
| WO | 2013146502 | 3/2013 |
| WO | 2013/177393 A1 | 11/2013 |
| WO | 2014017015 | 1/2014 |
| WO | 2015160300 A1 | 10/2015 |
| WO | 2015/165560 A1 | 11/2015 |
| WO | 2016/008201 A1 | 1/2016 |
| WO | 2016/027072 A1 | 2/2016 |
| WO | 2016007393 A3 | 7/2016 |
| WO | 2016168576 | 10/2016 |
| WO | 2016168623 | 10/2016 |
| WO | 2017159701 A1 | 9/2017 |
| WO | 2018158712 | 9/2018 |
| WO | 2018207469 | 11/2018 |
| WO | 2018208153 | 11/2018 |
| WO | 2018210441 | 11/2018 |
| WO | 2019/023613 A1 | 1/2019 |
| WO | 2019/023658 A1 | 1/2019 |
| WO | 2019023613 | 1/2019 |
| WO | 2019023658 | 1/2019 |
| WO | 2019086158 | 5/2019 |
| WO | 2019212693 | 11/2019 |
| WO | 2020078703 | 4/2020 |
| WO | 2020232431 | 11/2020 |
| WO | 2020232443 | 11/2020 |

OTHER PUBLICATIONS

US Patent and Trademark Office, Non-Final Office Action for U.S. Appl. No. 14/725,490 dated Feb. 23, 2018.

(56) References Cited

OTHER PUBLICATIONS

Shawn Landers et al., "Development and Calibration of a Pavement Surface Performance Measure and Prediction Models for the British Columbia Pavement Management System" (2002).
Zheng Wu, "Hybrid Multi-Objective Optimization Models for Managing Pavement Assetts" (Jan. 25, 2008).
"Pavement Condition Index 101", OGRA's Milestones (Dec. 2009).
"Rail Radar Bringing the Track Into the Office" presentation given to CN Rail Engineering on Jan. 21, 2011.
Rail Radar, Inc. Industrial Research Assistance Program Application (IRAP) (Aug. 10, 2012).
"Rail Radar Automated Track Assessment" paper distributed at the Association of American Railways (AAR) Transportation Test Center in Oct. 2010 by Rail Radar, Inc.
US Patent and Trademark Office, Non-Final Office Action for U.S. Appl. No. 14/725,490 dated Mar. 30, 2017.
US Patent and Trademark Office, Final Office Action for U.S. Appl. No. 14/725,490 dated Aug. 16, 2017.
Kantor, et al., "Automatic Railway Classification Using Surface and Subsurface Measurements" Proceedings of the 3rd International Conference on Field and Service Robitics, pp. 43-48 (2001).
Magnes, Daniel L., "Non-Contact Technology for Track Speed Rail Measurements (ORIAN)" SPIE vol. 2458, pp. 45-51 (1995).
Ryabichenko, et al. "CCD Photonic System for Rail Width Measurement" SPIE vol. 3901, pp. 37-44 (1999).
Gingras, Dennis, "Optics and Photonics Used in Road Transportation" (1998).
Liviu Bursanescu and Francois Blais, "Automated Pavement Distress Data Collection and Analysis: a 3-D Approach" (1997).
US Patent and Trademark Office, Non-Final Office Action for U.S. Appl. No. 14/724,925 dated Feb. 26, 2016.
US Patent and Trademark Office, Non-Final Office Action for U.S. Appl. No. 14/724,890 dated Jul. 29, 2016.
US Patent and Trademark Office, Final Office Action for U.S. Appl. No. 14/724,890 dated Nov. 10, 2016.
US Patent and Trademark Office, Non-Final Office Action for U.S. Appl. No. 14/724,890 dated Mar. 24, 2017.
Korean Intellectual Property Office, International Search Report for Int. App. No. PCT/IB2018/058574 dated Feb. 27, 2019.
Korean Intellectual Property Office, Written Opinion of the International Searching Authority for Int. App. No. PCT/IB2018/058574 dated Feb. 27, 2019.
Espino et al., "Rail and Turnout Detection Using Gradient Information and Template Matching", 2013 IEEE Internatiojnal Conference on Intelligent Rail Transportation Proceedings (2013).
U.S. Patent and Tademark Office, Non-Final Office Action for U.S. Appl. No. 17/243,746 dated Aug. 27, 2021.
"Laser Triangulation for Track Change and Defect Detection", U.S. Department of Transportation, Federal Railroad Administration (Mar. 2020).
"Extended Field Trials of LRAIL for Automated Track Change Detection", U.S. Department of Transportation, Federal Railroad Administration (Apr. 2020).
Pavemetrics' Compulsory Counterclaim for Declaratory Judgment, *Pavemetrics Systems, Inc. v. Tetra Tech, Inc.* (case 2:21-cv-1289) (Mar. 24, 2021).
Handbook of Computer Vision and Applications, vol. 2, Academic Press, "Signal Processing and Pattern Recognition" (1999).
International Advances in Nondestructive Testing, vol. 16, Gordon and Breach Science Publishers, S.A. (1991).
Babenko, Pavel, dissertation entitled "Visual Inspection of Railroad Tracks", University of Central Florida (2009).
Shah, Mubarak, "Automated Visual Inspection/Detection of Railroad Track", Florida Department of Transportation (Jul. 2010).
Metar et al., "Automatic Track Inspection Using 3D Laser Profilers to Improve Rail Transit Asset Condition Assessment and State of Good Repair—A Preliminary Study", TRB 93rd Annual Meeting (Nov. 15, 2013).
Laurent, John et al., "Implementation and Validation of a New 3D Automated Pavement Cracking Measurement Equipment" (2010).

Final Written Judgment, U.S. Patentent Trial and Appeal Board, Inter Partes Review, *Tetra Tech Canada, Inc. v. Georgetown Rail Equipment Company*, (2020).
Tetra Tech, Inc. Annual Report excerpts (2020).
Federal Railroad AdminisliaLion Track Safety Standards Fact Sheet.
Declaration of David Drakes, *Pavemetrics Systems, Inc. v. Tetra Tech, Inc.* (case 2:21-cv-1289) (Mar. 22, 2021).
Declaration of John Laurent, *Pavemetrics Systems, Inc. v. Tetra Tech, Inc.* (case 2:21-cv-1289) (Mar. 22, 2021).
"An Automated System for Rail Transit Infrastructure Inspection", 1st Quarterly Report, USDOT and University of Massachusetts Lowell (Sep. 30, 2012).
IRI Measurements Using the LCMS presentation, Pavemetrics (2012).
High-speed 3D imaging of rail YouTube URL link and associated image.
LCMS for High-speed Rail Inspection video URL link and image.
"An Automated System for Rail Transit Infrastructure Inspection", 2d Quarterly Report, USDOT and University of Massachusetts Lowell (Jan. 15, 2013).
RITARS 3rd Quarterly Meeting Minutes, "An Automated System for Rail Transit Infrastructure Inspection" (May 14, 2013).
"An Automated System for Rail Transit Infrastructure Inspection", 5th Quarterly Report, USDOT and University of Massachusetts Lowell (Oct. 15, 2013).
25th Annual Road Profile User's Group Meeting agenda, San Antonio, Texas (Sep. 16, 2013).
"LCMS-Laser Crack Measurement System" presentation, PAVEMETRICS Systems Inc. (Sep. 2013).
Metari, et al., "An Automatic Track Inspection Using 3D Laser Profilers to Improve Rail Transit Asset Condition Assessment and State of Good Repair: A Preliminary Study" presentation, Transportation Research Board 93rd Annual Meeting (given Jan. 14, 2014).
Lorent, et al., "Detection of Range-Based Rail Gage and Missing Rail Fasteners: Use of High-Resolution Two- and Three-dimensional Images" (Jan. 2014).
"3D Mapping of Pavements: Geometry and DTM" presentation, PAVEMETRICS Systems Inc. (Sep. 2014).
"Laser Rail Inspection System (LRAIL)" datasheet, PAVEMETRICS Systems Inc. (Oct. 2014).
PAVEMETRICS Systems Inc. webpage screenshot (Dec. 18, 2014).
PAVEMETRICS Systems Inc. LRAIL webpage (Feb. 20, 2015).
Pavemetrics' Memorandum in Opposition to motion for Preliminary Injunction, *Pavemetrics Systems, Inc. v. Tetra Tech, Inc.* (case 2:21-cv-1289) (Mar. 22, 2021).
Paul et al., "A Technical Evaluation of Lidar-Based Measurement of River Water Levels", Water Resources Research (Apr. 4, 2020).
Ahn et al., "Estimating Water Reflectance at Near-Infrared Wavelengths for Turbid Water Atmospheric Correction: A Preliminary Study for GOCI-II", Remote Sensing (Nov. 18, 2020).
Hart et al., "Automated Railcar and Track Inspection Projects: A Review of Collaborations Between CVRL and RailTEC", presentation by Computer Vision and Robotics Laboratory and Railroad Engineering Program (RailTEC) University of Illinois at Urbana-Champaign (2017).
International Preliminary Report on Patentability, PCT Application No. PCT/US2020/033449, completed May 24, 2021 and dated Aug. 12, 2021.
US Patent and Trademark Office, Non-Final Office Action for U.S. Appl. No. 16/802,763 dated Jun. 29, 2021.
Yang et al., "Automated Extraction of 3-D Railway Tracks from Mobile Laser Scanning Point Clouds", IEEE Journal of Selected Topics in Applied Earth Observations and Remote Sensing, vol. 7, No. 12, Dec. 2014.
Li et al., "Rail Component Detection, Optimization, and Assessment for Automatic Rail Track Inspection", IEEE Transactions of Intelligent Transportation Systems, vol. 15, No. 2, Apr. 2014.
International Search Report and Written Opinion of the International Searching Authority, PCT App. Ser. No. PCT/US2020/033449 dated Sep. 14, 2020 (including Kovalev et al. "Freight car models and their computer-aided dynamic analysis", Multibody System Dynamics, Nov. 2009).

(56) References Cited

OTHER PUBLICATIONS

Julio Molleda et al., "A Profile Measurement System for Rail Manufacturing using Multiple Laser Range Finders" (2015).
US Patent and Trademark Office, Final Office Action for U.S. Appl. No. 16/255,928 dated Apr. 27, 2020.
US Patent and Trademark Office, Non-Final Office Action for U.S. Appl. No. 16/742,057 dated May 26, 2020.
Invitation to Pay Additional Fees, PCT App. Ser. No. PCT/US2020/033449 dated Jul. 9, 2020.
International Report on Patentability, PCT App. Ser. No. PCT/IB2018/058574 dated Aug. 6, 2020.
International Reporton Patentability, PCT App. Ser. No. PCT/US2020/033374 dated Aug. 14, 2020.
US Patent and Trademark Office, Non-Final Office Action for U.S. Appl. No. 16/127,956 dated Dec. 31, 2018.
D.D. Davis et al., "Tie Performance—A Progress Report of the Des Plaines Test Site," Report No. R-746, Association of American Railroads Research and Test Department (Apr. 1990).
Mattias Johanneson, "Architectures for Sheet-of-Light Range Imaging," Report No. LiTH-ISY-I-1335, Image Processing Group, Department of Eleclrical Engineering, Linkoping University (Feb. 27, 1992).
U.S. Appl. No. 60/584,769, "System & Method For Inspecting Railroad Track" by John Nagle & Steven C. Orrell.
Mattias Johannesson, "Sheet-of-light Range Imaging," Linköping Studies in Science and Technology. Dissertations No. 399 (1995).
M. Johannesson, SIMD Architectures for Range and Radar Imaging, PhD thesis, University of Linköping (1995).
Erik Åstrand, "Automatic Inspection of Sawn Wood," Linkoping Studies in Science and Technology. Dissertations. No. 424 (1996).
Mattias Johannesson, "Sheet-of-Light range imaging experiments with MAPP2200," Report No. LiTH-ISY-I-1401, Image Processing Group, Department of Electrical Engineering, Linköping University (Sep. 28, 1992).
M. de Bakker et al., "A Smart Range Image Sensor," Proceedings of the 24th European Solid-State Circuits Conference (1998):208-11;xii+514.
Dr. Mats Gokstorp et al., "Smart Vision Sensors," International Conference on Image Processing (Oct. 4-7, 1998), Institute of Electrical and Electronics Engineers, Inc.
Mattias Johanneson, et al., "An Image Sensor for Sheet-of-Light Range Imaging," IAPR Workshop on Machine Vision Applications (Dec. 7-9, 1992).
Mattias Johannesson, "Can Sorting using sheet-of-light range imaging and MAPP2200," Institute of Electrical and Electronics Engineers; International Conference on Systems, Man and Cybernetics (Oct. 17-20, 1993).
Michiel de Bakker, et al., "Smart PSD array for sheet-of-light range imaging," The International Society for Optical Engineering. Sensors and Camera Systems for Scientific, Industrial, and Digital Photography Applications (Jan. 24-26, 2000).
Umayal Chidambaram, "Edge Extraction of Color and Range Images," (Dec. 2003).
Franz Pernkopf et al., "Detection of surface defects on raw milled steel blocks using range imaging" The International Society for Optical Engineering. Machine Vision Applications in Industrial Inspection X (Jan. 21-22, 2002).
Murhed, Anders, "IVP Integrated Vision Products," Pulp and Paper International 44.12 (Dec. 1, 2002).
Anders Åstrand, "Smart Image Sensors," Linköping Studies in Science and Technology Dissertations No. 319 (1993).
Mattias Johannesson et al., "Five Contributions to the Art of Sheet-of-light Range Imaging on MAPP2200," Report No. LiTH-ISY-R-1611, Image Processing Group, Department of Electrical Engineering, Linköping University (Apr. 14, 1994).
Federal Register, vol. 73 (70695-70696).
Newman et al., "A Survey of Automated Visual Inspection," Computer Vision an Image Understanding vol. 61, No. 2, Mar., pp. 231-262, 1995.

J. Velten et al., "Application of a Brightness-Adapted Edge Detector for Real-Time Railroad Tie Detection in Video Images," Institute of Electrical and Electronics Engineers (1999).
R. Gordon Kennedy, "Problems of Cartographic Design in Geographic Information Systems for Transportation," Cartographic Perspectives (Jul. 20, 1999).
Richard Reiff, "An Evaluation of Remediation Techniques for Concrete Tie Rail Seat Abrasion in the Fast Environment," American Railway Engineering Association, Bulletin 753 (1995).
Russell H. Lutch et al., "Causes and Preventative Methods for Rail Seat Abrasion in North America's Railroads," Conference Paper (Oct. 2014).
Nigel Peters and Steven R. Mattson, "CN 60E Concrete Tie Development," AREMA: 25 (2003).
Federal Register, vol. 76, No. 175, pp. 55819-55825.
National Transportation Safety Board, "Railroad Accident Brief" (NTSB/RAB—Jun. 2003).
Arthur L. Clouse et al. "Track Inspection Into the 21st Century" (Sep. 19, 2006).
Federal Register, vol. 76, No. 63, pp. 18001-18346 (18073).
Railroad Safety Advisory Committee (RSAC), Minutes of Meeting, Dec. 10, 2008, Washington, D C.
Dennis P. Curtin, "An Extension to The Textbook of Digital Photography, Pixels and Images" (2007).
Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's Response to Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's P.R. 4-5(a) Opening Markman Claim Construction Brief in *Georgetown Rail Equipment Company v. Holland L.P.*, (E.D. Tex) (Tyler) (6:13-cv-366).
Holland L.P.'s Responsive Markman Claim Construction Brief Under P.R. 4-5 in *Georgetown Rail Equipment Company v. Holland L.P.*, (E.D. Tex.) (Tyler) (6:13-cv-366).
Claim Construction Memorandum Opinion and Order in *Georgetown Rail Equipment Company v. Holland L.P.*, (E.D. Tex.) (Tyler) (6:13-cv-366).
Public Judgment and Reasons in *Georgetown Rail Equipment Company v. Rail Radar Inc.* and *Tetra Tech EBA Inc.* (T-896-15) (2018 FC 70).
US Patent and Trademark Office, Non-Final Office Action for U.S. Appl. No. 16/255,928 dated Oct. 18, 2019.
US Patent and Trademark Office, Final Office Action for U.S. Appl. No. 16/127,956 dated Jul. 9, 2019.
US Patent and Tademark Office, Non-Final Office Action for U.S. Appl. No. 17/076,899 dated Jan. 29, 2021.
T. Kanade, ed., Three-Dimensional Machine Vision, Kluwer Academic Publishers (1987) [Part 1].
T. Kanade, ed., Three-Dimensional Machine Vision, Kluwer Academic Publishers (1987) [Part 2].
D.D. Davis et al., "Tie Condition Inspection a Case Study of Tie Failure Rate, Mods, and Clustering," Report No. R-714, Association of American Railroads Research and Test Department (Jul. 1989).
John Choros et al., "Prevention of Derailments due to Concrete Tie Rail Seat Deterioration," Proceedings of ASME/IEEE Joint Rail Conference & Internal Combustion Engine Spring Technical Conference. No. 40096 (2007).
MVTec Software GmbH, HALCON Solution Guide 1: Basics, available at http://download.mvtec.com/halcon-10.0-solution-guide-i.pdf (2013)("HALCON Solution Guide").
National Instruments, NI Vision for LabVIEW User Manual, available at https://www.ni.com/pdf/manuals/371007b.pdf (2005) ("LabVIEW 2005 Manual").
Wenbin Ouyang & Bugao Xu, Pavement Cracking Measurements Using 3D Laser-Scan Images, 24 Measurement Sci. & Tech. 105204 (2013) ("Ouyang").

(56) References Cited

OTHER PUBLICATIONS

Çağlar Aytekin et al., Railway Fastener Inspection by Real-Time Machine Vision, 45 IEEE Transactions on Sys., Man, and Cybernetics: Sys. 1101 (Jan. 2015) ("Aytekin").
Jinfeng Yang et al., An Efficient Direction Field-Based Method for the Detection of Fasteners on High-Speed Railways, 11 Sensors 7364 (2011) ("Yang").
Urszula Marmol & Slawomir Mikrut, Attempts at Automatic Detection of Railway Head Edges from Images and Laser Data, 17 Image Processing & COMMC'N 151 (2012) ("Marmol").
Xaxier Gibert-Serra et al., A Machine Vision System for Automated Joint Bar Inspection from a Moving Rail Vehicle, Droc. 2007 ASME/IEEE Joint Rail Conf. & Internal Combustion Engine Spring Tech. Conf. 289 (2007) ("Gibert-Serra").
SICK Sensor Intelligence, Product Catalog 2014/2015: Vision, available at https://www.sick.com/media/docs/2/02/302/Product_catalog_Vision_en_IM005 0302.pdf (2013) ("SICK Catalog").
SICK Sensor Intelligence, Application: 3D Vision for Cost-Efficient Maintenance of Rail Networks, TETRATECH_0062963-64 (Jan. 2015) ("SICK Article").
Matrox Electronic Systems, Ltd., Matrox Imaging Library version 9 User Guide, available at https://www.matrox.com/apps/imaging_documentation_files/mil_userguide.pdf (2008) ("Matrox MIL 9 User Guide").
MVTec Software GmbH, HALCON: the Power of Machine Vision, available at https://pyramidimaging.com/specs/MVTec/Halcon%2011.pdf (2013)("HALCON Overview").
Tordivel AS, Scorpion Vision Software: Version X Product Data, available at http://www.tordivel.no/scorpion/pdf/Scorpion%20X/PD-2011-0005%20Scorpion%20X%20Product%20Data.pdf (2010) ("Scorpion Overview").

Mathworks Help Center, Documentation: edge, available https://www.mathworks.com/help/images/ref/edge.html (2011) ("Matlab").
National Instruments, NI Vision for LabVIEW Help, available https://www.ni.com/pdf/manuals/370281w.zip (2014) ("LabVIEW").
Intel Integrated Performance Primitives for Intel Architecture, Reference Manual, vol. 2: Image and Video Processing, available at http://www.nacad.ufrj.br/online/intel/Documentation/en_US/ipp/ippiman.pdf (Mar. 2009).
Andrew Shropshire Boddiford, Improving the Safety and Efficiency of Rail Yard Operations Using Robotics, UT Elec. Theses and Dissertations, available at http://hdl.handle.net/2152/2911 (2013).
Leszek Jarzebowicz & Slawomir Judek, 3D Machine Vision System for Inspection of Contact Strips in Railway Vehicle Durrent Collectors, 2014 Int'l Conf. on Applied Elecs. 139 (2014).
Peng Li, A Vehicle-Based Laser System for Generating High-Resolution Digital Elevation Models, K-State Elec. Theses, Dissertations, and Reports, available at http://hdl.handle.net/2097/3890 (2010).
Pavemetrics' Preliminary Invalidity Contentions in Case No. 2:21-cv-1289, dated Jul. 15, 2021.
Exhibits 2-9 to Pavemetrics' Preliminary Invalidity Contentions in Case No. 2:21-cv-1289, dated Jul. 15, 2021.
Pavemetrics' Invalidity Contentions and Preliminary Identification in Case No. 2:21-cv-1289, dated Sep. 13, 2021.
Fxhibit 2 to ‚Pavemetrics' Invalidity Contentions and Preliminary Identification in Case No. 2:21-cv-1289, dated Sep. 13, 2021.
Exhibit 3 to ‚Pavemetrics' Invalidity Contentions and Preliminary Identification in Case No. 2:21-cv-1289, dated Sep. 13, 2021.
U.S. Patent and Trademark Office, Non-Final Office Action for U.S. Appl. No. 16/889,016 dated Sep. 23, 2021.
U.S. Patent and Trademark Office, Non-Final Office Action for U.S. Appl. No. 16/877,106 dated Sep. 20, 2021.
International Preliminary Report on Patentability, PCT App. No. PCT/US2020/033374 dated Nov. 16, 2021.

* cited by examiner

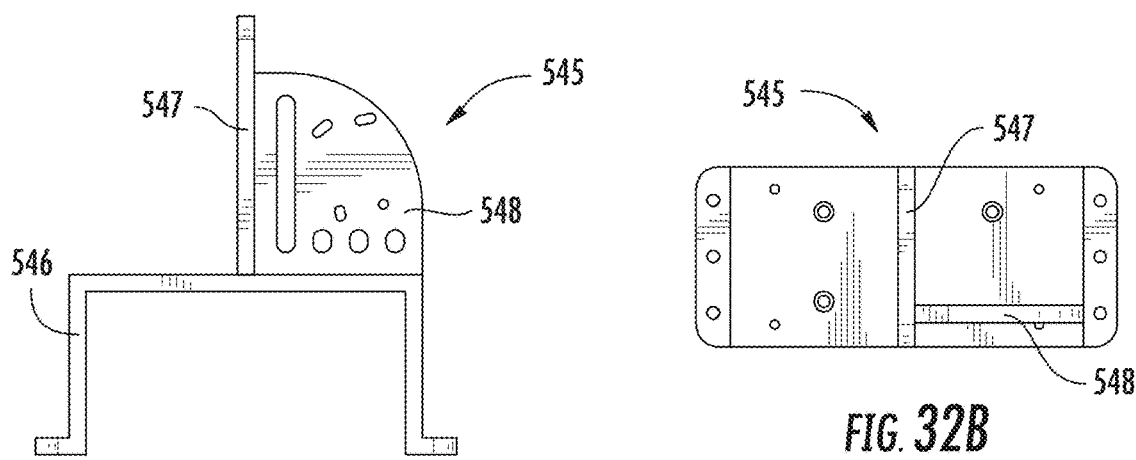
FIG. 32A
FIG. 32B
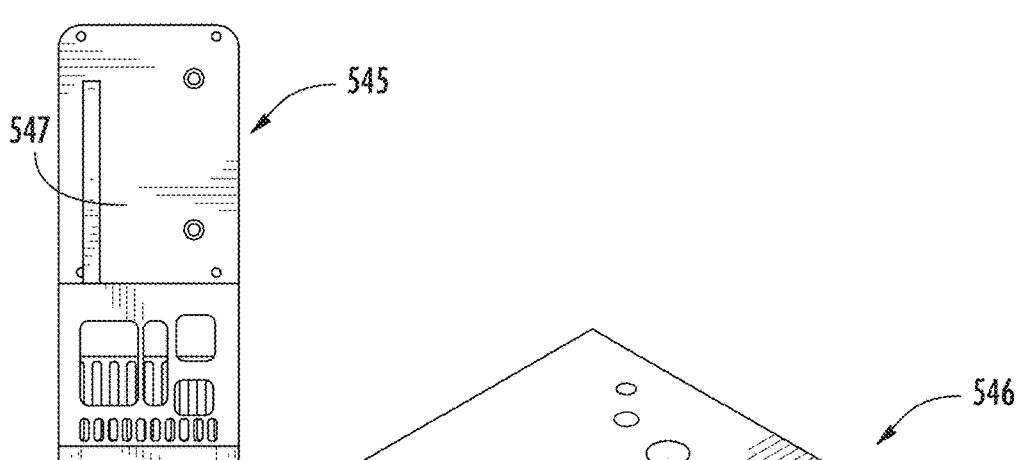
FIG. 32C
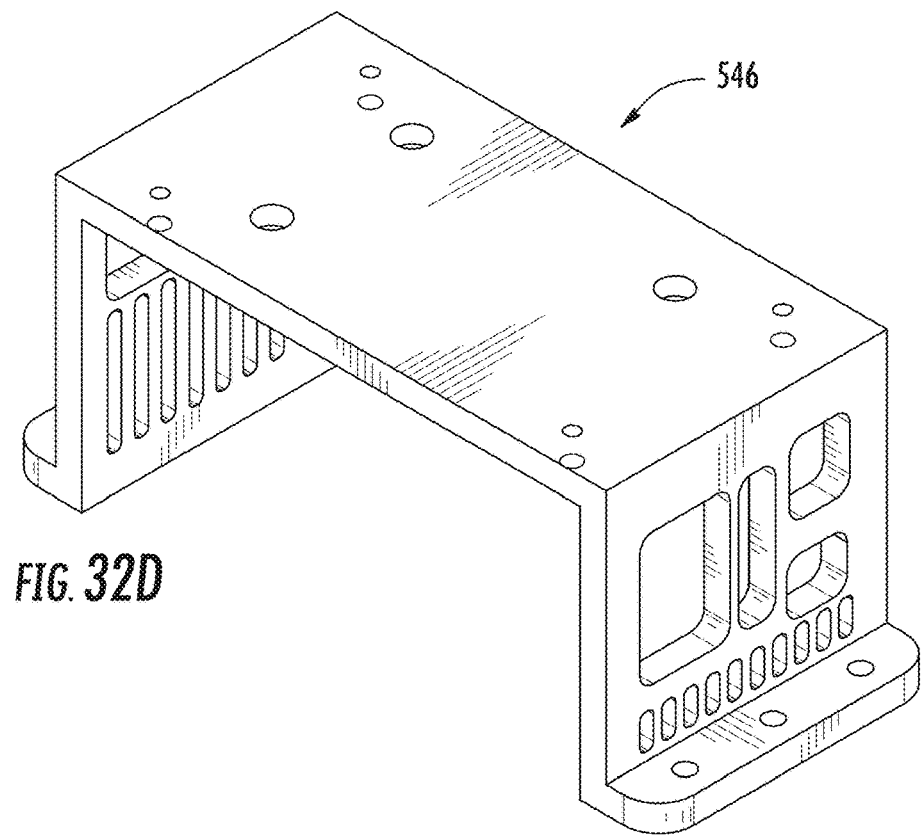
FIG. 32D

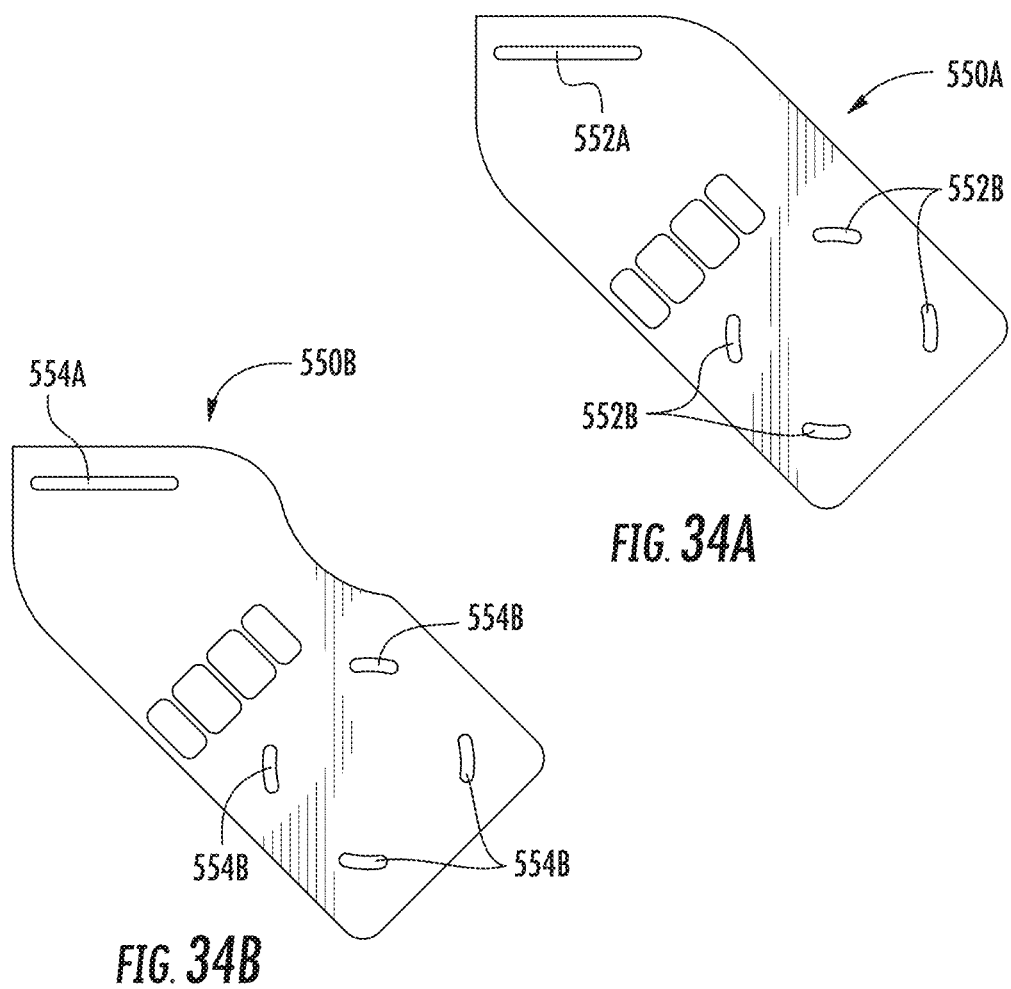
FIG. 34A
FIG. 34B
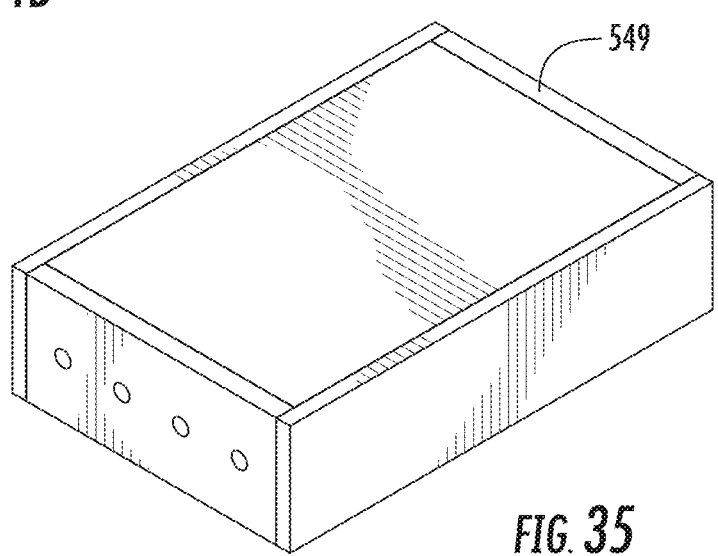
FIG. 35

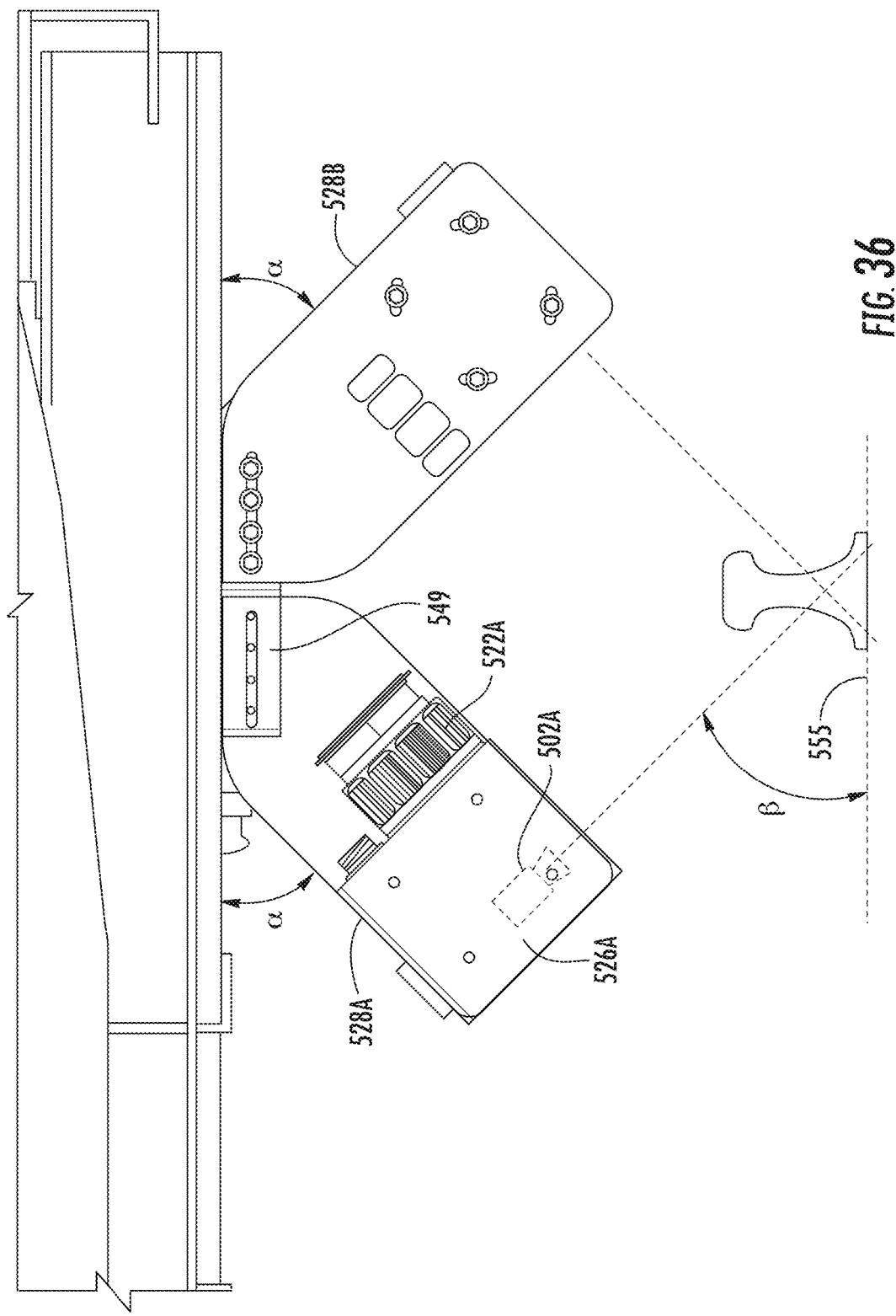

DEBRIS DEFLECTION AND REMOVAL METHOD FOR AN APPARATUS AND METHOD FOR GATHERING DATA FROM SENSORS ORIENTED AT AN OBLIQUE ANGLE RELATIVE TO A RAILWAY TRACK

CROSS-REFERENCE TO RELATED APPLICATION

This application is a continuation of and claims priority to U.S. Nonprovisional application Ser. No. 16/255,928 entitled "APPARATUS AND METHOD FOR GATHERING DATA FROM SENSORS ORIENTED AT AN OBLIQUE ANGLE RELATIVE TO A RAILWAY TRACK" which was filed on Jan. 24, 2019 which is a continuation-in-part of and claims priority to U.S. Nonprovisional application Ser. No. 16/127,956 entitled "APPARATUS AND METHOD FOR CALCULATING WOODEN CROSSTIE PLATE CUT MEASUREMENTS AND RAIL SEAT ABRASION MEASUREMENTS BASED ON RAIL HEAD HEIGHT" which was filed on Sep. 11, 2018 which claims priority to U.S. Provisional Application Ser. No. 62/679,467 entitled "APPARATUS AND METHOD FOR CALCULATING WOODEN TIE PLATE CUT MEASUREMENTS AND RAIL SEAT ABRASION MEASUREMENTS" which was filed on Jun. 1, 2018, the entireties of which are incorporated herein by reference in their respective entireties.

FIELD

This disclosure relates to the field of railway track inspection and assessment systems. More particularly, this disclosure relates to a railway track inspection and assessment system using one or more 3D sensors oriented at an oblique angle relative to a railway track for gathering data from a side of a rail.

BACKGROUND

Tie plate damage to wooden crossties through crosstie surface abrasion is a significant form of distress negatively impacting crosstie condition by reducing rail fastener holding capabilities. Referring to FIG. 1, a typical rail assembly includes a rail 100 resting on top of a tie plate 102 (also referred to as a "rail plate" or "base plate") and a plurality of spikes 104 securing the tie plate 102 and rail 100 to a crosstie 106, such as a wooden crosstie. The amount that a base of the tie plate 102 (i.e., a tie plate base 108) has penetrated or cut into a surface of the underlying wooden crosstie 106 is due to repeatedly applied heavy loads from train traffic and is referred to as the level of "Plate Cut" (the amount the tie plate base 108 has cut or abraded into a surface of the crosstie 106).

The rail 100 includes a rail head 110 located at a top of the rail 100, a rail web 112, and a rail foot 114 located below the rail web 112 and the rail head 110. A bottom of the rail foot 114 is referred to as a rail base seat 116, and a top of the rail foot 114 is referred to as a rail base surface 118.

Employing current three-dimensional (3D) triangulation-based measurement technologies used for railway track assessment with 3D sensors positioned above the rail assembly, an elevation of the rail base seat 116, or the tie plate base 108 cannot be measured directly. Therefore, an elevation of the tie plate base 108 must be estimated by measuring an elevation of a top surface of the tie plate 102 (i.e., the tie plate surface 120) and subtracting an estimated thickness of the tie plate 102.

The plate cut value increases as the tie plate 102 cuts downward into an upper surface of the crosstie 106 to which the tie plate 102 is fastened (the tie plate base 108 penetrates or cuts into the upper crosstie surface 122). Conventional methods of determining plate cut value require calculating the difference between the surface elevation of outermost tie plate edges (on the "field" side outside of the rails and on the "gauge" side that is between the rails) and the adjacent upper crosstie surface 122 elevations near the edge of the tie plate 102. Referring to FIG. 2, a conventional plate cut measure is derived from the difference in elevation between tie plate surface 120 and the adjacent crosstie surface elevation (i.e., the upper crosstie surface 122). In situations where the tie plate and crosstie surface regions are not obscured, plate cut can be calculated as follows:

Plate Cut=Crosstie Surface Elevation−(Plate Surface Elevation−Plate Thickness Estimate)   Equation 1:

A plate cut value of 0 millimeters (mm) would represent an undamaged (new) crosstie surface, as shown in FIG. 2. Referring to FIG. 3, in contrast to a new crosstie, a plate cut value of 25 mm or greater would represent a significant amount of damage to the crosstie surface. In practice, it is common to have significant amounts of ballast 124 or other track debris obscuring the tie plate 102 surface for significant portions of a rail network, as illustrated in FIG. 4. The presence of any material on the tie plate surface 120 makes it difficult, if not impossible, to determine the plate surface elevation in debris occluded areas. Without the ability to determine elevations of the tie plate surface 120 (for either the field and gauge side), a plate cut value cannot be determined.

In addition to plate cut in wooden crossties, concrete crosstie surface abrasion is a significant form of distress which negatively impacts concrete crosstie condition. Referring to FIG. 5, rail assemblies may also be formed using a concrete crosstie 126. The rail 100 rests on top of a pad 128 located between a rail base seat 130 and an upper crosstie surface 132 of the concrete crosstie 126. A clip 134 secures the rail 100 to the concrete crosstie 126 and includes an insulator 136 located between the clip 134 and the rail 100. Rail seat abrasion reduces rail fastener downward force on a rail foot 138 of the rail 100, thereby reducing the capability of the clip 134 to secure the rail 100 to the concrete crosstie 126. The pad 128 placed under rail 100 protects the upper crosstie surface 132 from rail movements due to applied loads from train traffic and from rail movement due to rail thermal expansion and contraction. The pad 128 wears until the pad thickness is diminished to the point where the rail base seat 130 is able to contact the upper crosstie surface 132. The amount that the rail base seat has penetrated or abraded the underlying crosstie surface is referred to as the level of rail seat abrasion.

Employing 3D triangulation-based measurement technologies used for railway track assessment with sensors positioned above the track surface, the elevation of the rail base seat 130, or the rail pad thickness cannot be measured directly. Therefore, the rail base seat elevation must be estimated by measuring a rail base surface elevation 140 and subtracting an estimated rail base thickness.

As a rail base seat wears the underlying pad 128, the pad thickness is reduced to zero. At the point of a zero thickness pad, the rail seat abrasion is said to be 0 mm, representing the point at which the rail base seat 130 is beginning to contact the upper crosstie surface 132. As the rail base seat 130 continues to abrade and penetrate into the upper crosstie surface 132, the rail seat abrasion values increase.

The conventional method of determining the rail seat abrasion parameter requires calculating the difference between the rail base seat elevation (for the field and the gauge sides of the rail) and the adjacent crosstie surface field and gauge elevations near the rail base, as shown in FIGS. 6 and 7. The conventional method of calculating rail seat abrasion is based on the elevation difference between the rail base surface and the adjacent crosstie surface. In situations where the rail base and crosstie surface regions are not obscured, rail seat abrasion is calculated as follows:

Rail Seat Abrasion=Crosstie Surface Elevation−(Rail Base Surface Elevation−Rail Base Thickness Estimate)   Equation 2:

In practice, it is common to have significant amounts of ballast 124 or other track debris obscuring the rail base surface for substantial portions of a rail network, as illustrated in FIG. 8. The presence of any material on the rail base surface makes it difficult, if not impossible, to determine the rail base surface elevation in debris occluded areas. Without the ability to determine elevations of the rail base surface (for either the field or gauge side), a rail seat abrasion value cannot be determined.

What is needed, therefore, is a means to measure plate cut and rail seat abrasion values in all track conditions. The capability to determine elevations for all crosstie plates and rail base surfaces regardless of whether they are obscured by ballast or other debris would significantly improve the ability to report plate cut measures for all wooden crossties and rail seat abrasion measures for all concrete crossties in a rail owner's network.

In another aspect, current track assessment systems used by various companies that obtain 3D elevation maps of railway tracks view such tracks and associated features vertically and such systems are unable to obtain full views of the sides (rail webs) of rails. What is needed, therefore, is a means to obtain 3D profiles an 3D elevation maps of the rail webs of rails to analyze various track features.

In a related aspect, manufacturer markings are often placed on rail webs and contain important information regarding the physical characteristics of the rails on which such markings are located as well as other information including the age of the particular rails and the manufacturer of the particular rails. What is needed, therefore, is a way to access such information when assessing a railway track using a track assessment system on a moving rail vehicle operating along such railway track. Such information could be used for inventory purposes and/or to help with analysis of the degradation of particular rails along a railway track.

In another aspect, sensors and structured light emitters are often disrupted by debris moving around beneath rail vehicles carrying track assessment systems, such debris building up on the optics of such sensors and light emitters or on substantially transparent panels for protecting such sensors and light emitters. What is needed, therefore, is a means to easily remove such debris buildup while a track assessment system is in operation, moving along a railway track.

SUMMARY

The above and other needs are met by a system for inspecting a railway track, the apparatus comprising a processor; at least one sensor oriented to capture data of the railway track, the at least one sensor in electronic communication with the processor; a data storage device in electronic communication with the processor; and computer executable instructions stored on a computer readable storage medium in communication with the processor. The computer executable instructions are operable to determine an elevation of a surface of a rail head of a rail located on the railway track based on a distance to the rail head from the at least one sensor; determine an elevation of a surface of a crosstie of the railway track based on a distance to a top surface of the crosstie from the at least one sensor; estimate a total rail height and underlying rail support height; and calculate a crosstie wear value based on the determined rail head surface elevation, crosstie surface elevation, and estimated total rail height of the rail and underlying rail support height of an underlying rail support. The underlying rail support can be, for example, a tie plate (for wooden crosstie applications) or a pad (for concrete crosstie applications).

Preferably, the system for inspecting a railway track described above is located on a rail vehicle and further includes an encoder electromechanically engaged with a wheel of the rail vehicle and in communication with the processor to provide location data of the rail vehicle. Preferably, the system also comprises a GPS antenna in communication with the processor for detecting a location of the system Preferably, the at least one sensor of the system for inspecting a railway track described above further comprises a light emitter and a camera in communication with the processor, wherein the camera captures a field of view of the railway track including reflected light from the light emitter to generate a three-dimensional elevation map of the railway track. Alternatively, the at least one sensor may comprise one or more time of flight sensors. In some embodiments, the at least one sensor may comprise one or more light emitters, one or more cameras, and one or more time of flight sensors.

In addition to the system described above, a method of determining wear of a railway track is also disclosed, such method comprising the steps of shining a beam of light along a railway track, interrogating a railway track using at least one sensor which forms part of a track assessment system housed on a rail vehicle; receiving data corresponding to the railway track based on the interrogation of the railway track using the at least one sensor; determining an elevation of a rail head of the railway track based on the received data; determining an elevation of a top surface of a rail crosstie of the railway track based on the received data; estimating a total rail height of the railway track and a height of an underlying rail support; and determining a crosstie wear value based on the elevation of the rail head, the elevation of the top surface of the crosstie, the estimated total rail height, and the estimated height of the underlying rail support.

In a preferred embodiment, the estimated height of the rail is based on one or more visual indicators displayed on the rail which are visually captured by the at least one sensor and compared by the processor to a database of rail markings used by the manufacturer of the rail.

In a preferred embodiment, the method described above further comprises the step of determining a geographic location of one or more railway track features corresponding to the data captured on the at least one sensor, wherein the estimated total rail height is based on the geographic location of the one or more railway track features.

In a preferred embodiment, the method described above further comprises the step of determining an estimated total rail height by using the processor to access a database which includes data which correlates specific geographic track locations to the identities of the specific types of rails placed at those geographic track locations.

In one embodiment (in which the underlying rail support comprises a crosstie plate), the step of estimating a total rail height of the railway track and a height of an underlying rail support further comprises estimating a thickness of the crosstie plate. This method may further include the step of estimating a thickness of the tie plate based on received data at a plurality of locations along a length of track, wherein the estimated tie plate thickness is based on a maximum distance from the top surface of the rail head to the top surface of the rail crosstie along the length of track.

In one embodiment of the method described above, the rail wear value is a plate cut value corresponding to an amount that the tie plate has cut into a top surface of the rail crosstie being interrogated.

In one embodiment (in which the rail crosstie is a concrete rail crosstie), the rail wear value is a rail seat abrasion value corresponding to an amount that a rail base seat has cut into a top surface of the concrete rail crosstie being interrogated. In a related embodiment, the underlying rail support comprises a pad and the rail crosstie being interrogated is a concrete crosstie.

In one embodiment (in which the underlying rail support comprises a pad separating a rail from a concrete crosstie), the method further comprises the step of estimating a thickness of the pad. This method may further include the step of estimating a thickness of the pad based on received data at a plurality of locations along a length of track, wherein the estimated pad thickness is based on a maximum distance from the top surface of the rail head to the top surface of the rail crosstie along the length of track.

The disclosure herein also covers a railway track assessment apparatus for gathering, storing, and processing profiles of one or both rails on a railway track while the apparatus travels on a rail vehicle along the railway track. Such apparatus includes a processor; a system controller in communication with the processor; a data storage device in communication with the processor; a power source for providing electric power to the track assessment apparatus; and a first sensor pod attached adjacent to an undercarriage of the rail vehicle. The first sensor pod includes a first 3D sensor in communication with the system controller wherein the first 3D sensor is oriented at an oblique angle β relative to a railway track bed surface supporting rails on which the rail vehicle is moving wherein such orientation provides the first 3D sensor a side view of a first side of a first rail of the railway track so that the first 3D sensor can obtain data from the first side of the first rail; and a first structured light generator in communication with the system controller. In one embodiment, the first sensor pod is oriented at an oblique angle α relative to the undercarriage of the rail vehicle.

The first sensor pod can further include a first sensor enclosure wherein the first 3D sensor and the first structured light generator are attached adjacent to the first sensor enclosure inside of the first sensor enclosure; a first thermal sensor; and a first heating and cooling device wherein the system controller further includes a temperature controller in communication with the first thermal sensor and the first heating and cooling device wherein the first heating and cooling device is activated or deactivated by the temperature controller based on feedback from the first thermal sensor so that the temperature inside the first sensor enclosure is maintained within a specific range.

The railway track assessment apparatus may further include an encoder engaged with a wheel of the rail vehicle to transmit pulses to the system controller based on the direction and distance travelled of the rail vehicle; a GNSS receiver in communication with the processor for providing position data of the railway track assessment apparatus to the processor; the system controller further including a sensor trigger controller; and computer executable instructions stored on a computer readable storage medium in communication with the sensor trigger controller operable to convert wheel encoder pulses to a desired profile measurement interval; and reference profile scans to geo-spatial coordinates by synchronizing encoder pulses with GNSS receiver position data.

The railway track assessment apparatus preferably further includes (1) a second sensor pod attached adjacent to the undercarriage of the rail vehicle, the second sensor pod including a second 3D sensor in communication with the system controller wherein the second 3D sensor is oriented at an oblique angle β relative to a railway track bed surface supporting rails on which the rail vehicle is moving wherein such orientation provides the second 3D sensor a side view of a second side of the first rail of the railway track so that the second 3D sensor can obtain data from the second side of the first rail; and a second structured light generator in communication with the system controller; (2) a third sensor pod attached adjacent to the undercarriage of the rail vehicle, the third sensor pod including a third 3D sensor in communication with the system controller wherein the third 3D sensor is oriented at an oblique angle β relative to a railway track bed surface supporting rails on which the rail vehicle is moving wherein such orientation provides the third 3D sensor a side view of a first side of a second rail of the railway track so that the third 3D sensor can obtain data from the first side of the second rail; and a third structured light generator in communication with the system controller; and (3) a fourth sensor pod attached adjacent to the undercarriage of the rail vehicle, the fourth sensor pod including a fourth 3D sensor in communication with the system controller wherein the fourth 3D sensor is oriented at an oblique angle β relative to a railway track bed surface supporting rails on which the rail vehicle is moving wherein such orientation provides the fourth 3D sensor a side view of a second side of the second rail of the railway track so that the fourth 3D sensor can obtain data from the second side of the second rail; and a fourth structured light generator in communication with the system controller. The railway track assessment apparatus may further include (1) an encoder engaged with a wheel of the rail vehicle to transmit pulses to the system controller based on the direction and distance travelled of the rail vehicle; (2) a GNSS receiver in communication with the processor for providing position data of the railway track assessment apparatus to the processor; (3) the system controller further including a sensor trigger controller; and (4) computer executable instructions stored on a computer readable storage medium in communication with the processor operable to (a) synchronize the repeated activation of the first 3D sensor, the second 3D sensor, the third 3D sensor, and the fourth 3D sensor; (b) combine profile scans from the first 3D sensor and the second 3D sensor into a first combined profile scan, and combine profile scans from the third 3D sensor and the fourth 3D sensor into a second combined profile scan; and reference the first combined profile scan and the second combined profile scan to geo-spatial coordinates by synchronizing encoder pulses with GNSS receiver position data.

Additionally or alternatively, the railway track assessment apparatus may further include a first sensor enclosure inside which the first 3D sensor and the first structured light generator are attached adjacent to the first sensor enclosure; and a cover plate forming a wall of the first sensor enclosure wherein the cover plate further includes a first cover plate aperture with a first glass panel covering the first cover plate aperture, and a second cover plate aperture with a second glass panel covering the second cover plate aperture. Preferably, the first glass panel includes a light transmission band that is compatible with the wavelengths of the first structured light generator, allowing most of any generated light from the first structured light generator to pass through the first glass panel and not be reflected back into the first sensor enclosure by the first glass panel.

The railway track assessment apparatus preferably further includes an air blower in communication with the system controller; and first ducting extending from the air blower to a position proximate to the first glass panel and the second glass panel, wherein the air blower is activated at specified times to blow air through the ducting to dislodge and deflect debris from the first glass panel and the second glass panel. In one specific embodiment, the railway track assessment apparatus further includes (1) an air distribution lid attached adjacent to the cover plate, the air distribution lid further including (a) a first duct mount; (b) a first walled enclosure adjacent to the first glass panel; (c) a first enclosed channel providing space for air to flow from the first duct mount to the first walled enclosure proximate to the first glass panel; (d) a first air distribution lid first aperture at least partially covering the first glass panel; (e) a second duct mount; (f) a second walled enclosure adjacent to the second glass panel; and (g) a second enclosed channel providing space for air to flow from the second duct mount to the second walled enclosure proximate to the second glass panel; (2) an air blower in communication with the system controller; and (3) first ducting from the air blower to the air distribution lid wherein the first ducting further includes a first duct attached adjacent to the first duct mount and a second duct attached adjacent to the second duct mount, wherein the air blower is activated by the system controller at specified times and, when activated, the air blower causes air to flow from the air blower, through the ducting, through first duct mount and the second duct mount, through the first enclosed channel and the second enclosed channel, to the first walled enclosure and the second walled enclosure to dislodge debris from the first glass panel and the second glass panel during operation of the railway track assessment apparatus.

Additionally or alternatively, the railway track assessment apparatus may further include (1) a first database stored on a computer readable medium in communication with the processor wherein the first database includes manufacturing data regarding the physical characteristics of specified rails cross-referenced with rail web markings; (2) the system controller further including a 3D sensor controller; (3)computer executable instructions stored on a computer readable storage medium in communication with the 3D sensor controller operable to allow the 3D sensor controller to (a) gather a first scanline of a rail being scanned from the first 3D sensor, such first scanline providing information regarding a physical characteristic of a rail feature shown in the scanline; and (b) gather multiple scanlines to form an elevation map of the rail being scanned; and (4) computer executable instructions stored on a computer readable storage medium in communication with the processor operable to allow the processor to (a) analyze alpha-numeric markings on a side of the rail being scanned using an optical character recognition algorithm, such alpha-numeric markings analyzed using the elevation map; (b) access the first database; (c) cross-reference alpha-numeric markings in the elevation map with manufacturing data in the first database; (d) measure a first physical characteristic of the rail being scanned using the processor to analyze the first scanline; (e) using a machine vision algorithm, compare the first physical characteristic of the rail being scanned with a same type of physical characteristic of a rail found in the first database, wherein the rail found in the first database matches the alpha-numeric markings that were decoded by the 3D sensor controller applicable to the first scanline; and (f) determine the condition of the first physical characteristic of the rail being scanned based on the comparison between the first physical characteristic of the rail being scanned and the same type of physical characteristic of a rail found in the first database. In the same or similar embodiment, the railway track assessment apparatus further includes (1) a wireless transmitter and receiver in communication with the processor; (2) a second database stored on a computer readable medium in communication with the processor but geographically remote from the processor, wherein the second database includes manufacturing data regarding the physical characteristics of specified rails cross-referenced with rail web markings; and (3) computer executable instructions stored on a computer readable storage medium in communication with the processor operable to allow the processor to (a) access the second database; (b) cross-reference alpha-numeric markings in the elevation map with manufacturing data in the second database; and (c) measure the first physical characteristic of the rail being scanned using the processor to analyze the first scanline; (d) using a machine vision algorithm, compare the first physical characteristic of the rail being scanned with a same type of physical characteristic of a rail found in the second database, wherein the rail found in the second database matches the alpha-numeric markings that were deciphered by the 3D sensor controller applicable to the first scanline; and (e) determine the condition of the first physical characteristic of the rail being scanned based on the comparison between the first physical characteristic of the rail being scanned and the same type of physical characteristic of a rail found in the second database.

Additionally or alternatively, the railway track assessment apparatus may further include (1) the system controller further including a 3D sensor controller; and (2) computer executable instructions stored on a computer readable storage medium in communication with the 3D sensor controller operable to allow the 3D sensor controller to gather an elevation map of the first side of the first rail using the first 3D sensor; (3) computer executable instructions stored on a computer readable storage medium in communication with the processor operable to allow the processor to (a) determine whether there is an elevation variation in the elevation map; (b) if there is an elevation variation in the elevation map, (I) determine the likely cause of the elevation variation based on the size and shape of the elevation variation; (II) assign a specific type of rail component identity to that elevation variation; (III) analyze the elevation variation under the presumption that the elevation variation coincides with the assigned specific type of rail component; and (IV) save the elevation map, the identity of the assigned rail component, and the measurements made during the analysis of the elevation variation to the data storage device.

Additionally or alternatively, the railway track assessment apparatus may further include (1) the system controller further including a 3D sensor controller; (2) computer executable instructions stored on a computer readable storage medium in communication with the 3D sensor controller operable to allow the 3D sensor controller to gather a scanline of the first side of the first rail using the first 3D sensor; (3) computer executable instructions stored on a computer readable storage medium in communication with the processor operable to allow the processor to (a) calibrate the first 3D sensor to determine the real world unit width of a pixel in a scanline; (b) locate a pixel representing a rail base bottom using a horizontal edge detection machine vision algorithm (c) determine whether a tie is present in the scanline by detecting a generally smooth planar surface in proximity to and below the first rail using a machine vision algorithm; (d) if a tie is present in the scanline, locate a pixel representing the top of the tie surface using a machine vision algorithm; (e) calculate the difference in elevation between the bottom of the rail and the top of the tie surface representing the thickness of a pad under the first rail; and (f) based on the calculated thickness of the pad, determine the amount of rail seat abrasion on the tie under the first rail.

Additionally or alternatively, the railway track assessment apparatus may further include (1) the system controller further including a 3D sensor controller; (2) computer executable instructions stored on a computer readable storage medium in communication with the 3D sensor controller operable to allow the 3D sensor controller to gather a scanline of the first side of the first rail using the first 3D sensor; (3) computer executable instructions stored on a computer readable storage medium in communication with the processor operable to allow the processor to (a) calibrate the first 3D sensor to determine the real word unit width of a pixel in a scanline; (b) locate a pixel representing a rail base bottom using a horizontal edge detection machine vision algorithm; (c) determine whether a tie is present in the scanline by detecting a generally smooth planar surface in proximity to and below the first rail using a machine vision algorithm; (d) if a tie is present in the scanline, locate a pixel representing the top of the tie surface using a machine vision algorithm; and (e) calculate the difference in elevation between the bottom of the rail and the top of the tie surface representing the amount of plate cut in the first rail.

Additionally or alternatively, the system controller may further include (1) a laser power controller in communication with the first structured light generator and the processor; and (2) computer executable instructions stored on a computer readable storage medium in communication with the laser power controller operable to allow the laser power controller to adjust the power to the structured light generator based on the light intensity of the most recent profile scan made by the first 3D sensor.

A method for analyzing the side of a rail of a railway track is also disclosed, such method including the steps of (1) scanning the first side of a first rail of a railway track with an optical scanning system using a first sensor that is attached adjacent to a rail vehicle and oriented at an oblique angle relative to a railway track bed surface supporting rails on which the rail vehicle is moving wherein the first sensor obtains data regarding the first side of the first rail; (2) generating a first 3D profile of the first side of the first rail based on the data gathered by the first sensor using a system controller; (3) analyzing the first 3D profile using a processor, such processor operating using a machine vision algorithm.

The method may further include (4) generating a 3D elevation map of the first side of the first rail by combining a plurality of 3D profiles including the first 3D profile using a processor; (5) analyzing alpha-numeric markings on the first side of the first rail shown in the 3D elevation map using the processor operating an optical character recognition algorithm; (6) referencing the 3D elevation map to geospatial coordinates using the processor by synchronizing the plurality of 3D profiles forming the 3D elevation map with the location of the rail vehicle when those 3D profiles were generated using a GNSS receiver; and (7) storing the referenced 3D elevation map to a data storage device using a processor. This method may further include (8) accessing a database stored on a computer readable using a processor wherein the first database includes manufacturing data regarding the physical characteristics of specified rails crossreferenced with alpha-numeric rail markings located on the sides of the specified rails; (9) cross-referencing the alpha-numeric markings in the elevation map with manufacturing data in the database using the processor; (10) measuring a physical characteristic of the first side of the first rail using the processor to analyze the first 3D profile; (11) comparing the physical characteristic of the first side of the first rail shown in the first 3D profile with a same type of physical characteristic of a rail found in the database matching the alpha-numeric markings that were detected by the processor; and (12) determining the condition of the first physical characteristic of the first side of the first rail being scanned based on the comparison between the first physical characteristic of the first side of the first rail being scanned and the same type of physical characteristic of the specified rails found in the database.

Additionally or alternatively, the method may include (4) controlling the temperature of the inside of a first sensor enclosure in which the first sensor is located using a temperature controller in communication with a thermal sensor and a heating and cooling device.

Additionally or alternatively, the method may further include (4) scanning the second side of the first rail of the railway track with the optical scanning system using a second sensor that is attached adjacent to the rail vehicle and oriented at an oblique angle relative to the undercarriage of the rail vehicle wherein the second sensor obtains data regarding the second side of the first rail; (5) generating a second 3D profile of the second side of the first rail based on the data gathered by the second sensor using the system controller; (6) scanning the first side of a second rail of the railway track with the optical scanning system using a third sensor that is attached adjacent to the rail vehicle and oriented at an oblique angle relative to the undercarriage of the rail vehicle wherein the third sensor obtains data regarding the first side of the second rail; (7) generating a third 3D profile of the first side of the second rail based on the data gathered by the third sensor using the system controller; (8) scanning the second side of the second rail of the railway track with the optical scanning system using a fourth sensor that is attached adjacent to the rail vehicle and oriented at an oblique angle relative to the undercarriage of the rail vehicle wherein the fourth sensor obtains data regarding the second side of the second rail; (9) generating a fourth 3D profile of the second side of the second rail based on the data gathered by the fourth sensor using the system controller; (10) analyzing the first 3D profile using the processor, such processor operating using a machine vision algorithm. Such method may further include (11) synchronizing activation of the first sensor, the second sensor, the third sensor, and the fourth sensor using the system controller in communication with an encoder; (12) combining the first 3D profile from the first sensor, the second 3D profile from the second sensor, the third 3D profile from the third sensor and the fourth 3D profile from the fourth sensor into a single combined 3D profile scan; and (13) referencing the combined 3D profile scan to geo-spatial coordinates by synchronizing encoder pulses with GNSS receiver position data from a GNSS receiver.

Additionally or alternatively, the method may further include (4) generating a 3D elevation map of the first side of the first rail by combining a plurality of 3D profiles including the first 3D profile using the processor; (5) determining whether there is an elevation variation in the 3D elevation map using the processor operating a machine vision algorithm; and (6) if there is an elevation variation in the elevation map, (a) determining the likely cause of the elevation variation based on the size and shape of the elevation variation using the processor operating a machine vision algorithm; (b) assigning a specific type of rail component identity to that elevation variation using the processor; (c) analyzing the elevation variation under the presumption that the elevation variation coincides with the assigned specific type of rail component using the processor; and (d) saving the elevation map, the identity of the assigned rail component, and any measurements made during the analysis of the elevation variation to a data storage device using the processor.

Additionally or alternatively, the method may further include (4) calibrating the first sensor to determine the real word unit width of a pixel in a 3D profile; (5) locating a pixel representing a rail base bottom using the processor operating a machine vision algorithm; (6) determining whether a tie is present in the 3D profile using the processor operating a machine vision algorithm; and (7) if a tie is present in the 3D profile, (a) locating a pixel representing the top of the tie using the processor operating a machine vision algorithm; (b) calculating the thickness of a pad under the first rail using the processor; and (c) determining the amount of rail seat abrasion on the tie under the first rail based on the calculated thickness of the pad using the processor.

Additionally or alternatively, the method may further include (4) calibrating the first sensor to determine the real word unit width of a pixel in a 3D profile; (5) locating a pixel representing a rail base bottom using the processor operating a machine vision algorithm; (6) determining whether a tie is present in the 3D profile using the processor operating a machine vision algorithm; and (7) if a tie is present in the 3D profile, (a) locating a pixel representing the top of the tie using the processor operating a machine vision algorithm; and (b) calculating the plate cut under the first rail using the processor.

Additionally or alternatively, the method may further include adjusting the power to a structured light generator based on the light intensity of the most recent 3D profile scan made by the first sensor using the processor and a laser power control controller.

In another aspect, a method of clearing debris from the view of a sensor of a railway track assessment system is disclosed. The method includes the steps of (1) blowing air from an air blowing device on a rail vehicle wherein such air is blown through a duct to an exit location wherein the exit location is proximate to a sensor enclosure including a transparent window through which a sensor has a field of view; and (2) clearing the transparent window of debris using the air exiting the duct at the exit location.

In another aspect, a sensor pod is disclosed including a sill mount attached adjacent to an undercarriage of a rail vehicle; a first side bracket attached adjacent to a first side of the sill mount; a second side bracket attached adjacent to a second side of the sill mount; and a sensor enclosure wherein a first side of the sensor enclosure is attached adjacent to the first side bracket and a second side of the sensor enclosure is attached adjacent to the second side bracket. In one preferred embodiment, (1) the first side bracket further includes a plurality of elongate first side bracket apertures; (2) the second side bracket further includes a plurality of second side bracket apertures; and (3) the sensor enclosure further includes (a) a first plurality of tapped holes for receiving fasteners located along a first side of the sensor enclosure that align with the plurality of elongate first side bracket apertures; and (b) a second plurality of tapped holes for receiving fasteners located along a second side of the sensor enclosure that align with the plurality of elongate second side bracket apertures, wherein the sensor enclosure can be selectively fastened to the first side bracket at different angles using first fasteners extending through the plurality of elongate first side bracket apertures into the first plurality of tapped holes and wherein the sensor enclosure can be selectively fastened to the second side bracket at different angles using second fasteners extending through the plurality of elongate second side bracket apertures into the second plurality of tapped holes.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 32A shows a side view of the internal frame from FIG. 30 which is located inside the sensor enclosure;

FIG. 32B is a plan view of the internal frame shown in FIG. 32A;

FIG. 32C shows an end view of the internal frame shown in FIGS. 32A and 32B;

FIG. 32D shows a frame base which forms the base of the internal frame shown in FIGS. 32A-32C;

FIG. 34A shows a first side bracket of the sensor pod;

FIG. 34B shows a second side bracket of the sensor pod;

FIG. 35 shows a sill mount of the sensor pod which is used to engage sensor pod with the undercarriage of a rail vehicle;

FIG. 36 shows a pair of sensor pods oriented at oblique angles a on either side of a rail so that data can be gathered from both sides of the rail;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

"Track", "Railway track", "track bed", "rail assembly", or "railway track bed" is defined herein to mean a section of railway including the rails, crossties (or "ties"), components holding the rails to the crossties, components holding the rails together, and ballast material.

A "processor" is defined herein to include a processing unit including, for example, one or more microprocessors, an application-specific instruction-set processor, a network processor, a vector processor, a scalar processor, or any combination thereof, or any other control logic apparatus now known or later developed that is capable of performing the tasks described herein, or any combination thereof.

The phrase "in communication with" means that two or more devices are in communication with one another physically (e.g., by wire) or indirectly (e.g., by wireless communication).

When referring to the mechanical joining together (directly or indirectly) of two or more objects, the term "adjacent" means proximate to or adjoining. For example, for the purposes of this disclosure, if a first object is said to be attached "adjacent to" a second object, the first object is either attached directly to the second object or the first object is attached indirectly (i.e., attached through one or more intermediary objects) to the second object.

Embodiments of the present disclosure provide methods and apparatuses for determining plate cut and rail seat abrasion values without requiring the upper surface of a crosstie plate for wooden crossties or rail base for concrete crossties to be visible to sensors located in proximity of a rail assembly. Methods described herein enable determination of plate cut and rail seat abrasion values when all or portions of the rail assembly are obscured by ballast or other debris, and only require that a top of the rail head and a portion of an underlying crosstie surface to be visible to sensors passing overhead.

Figure 9:
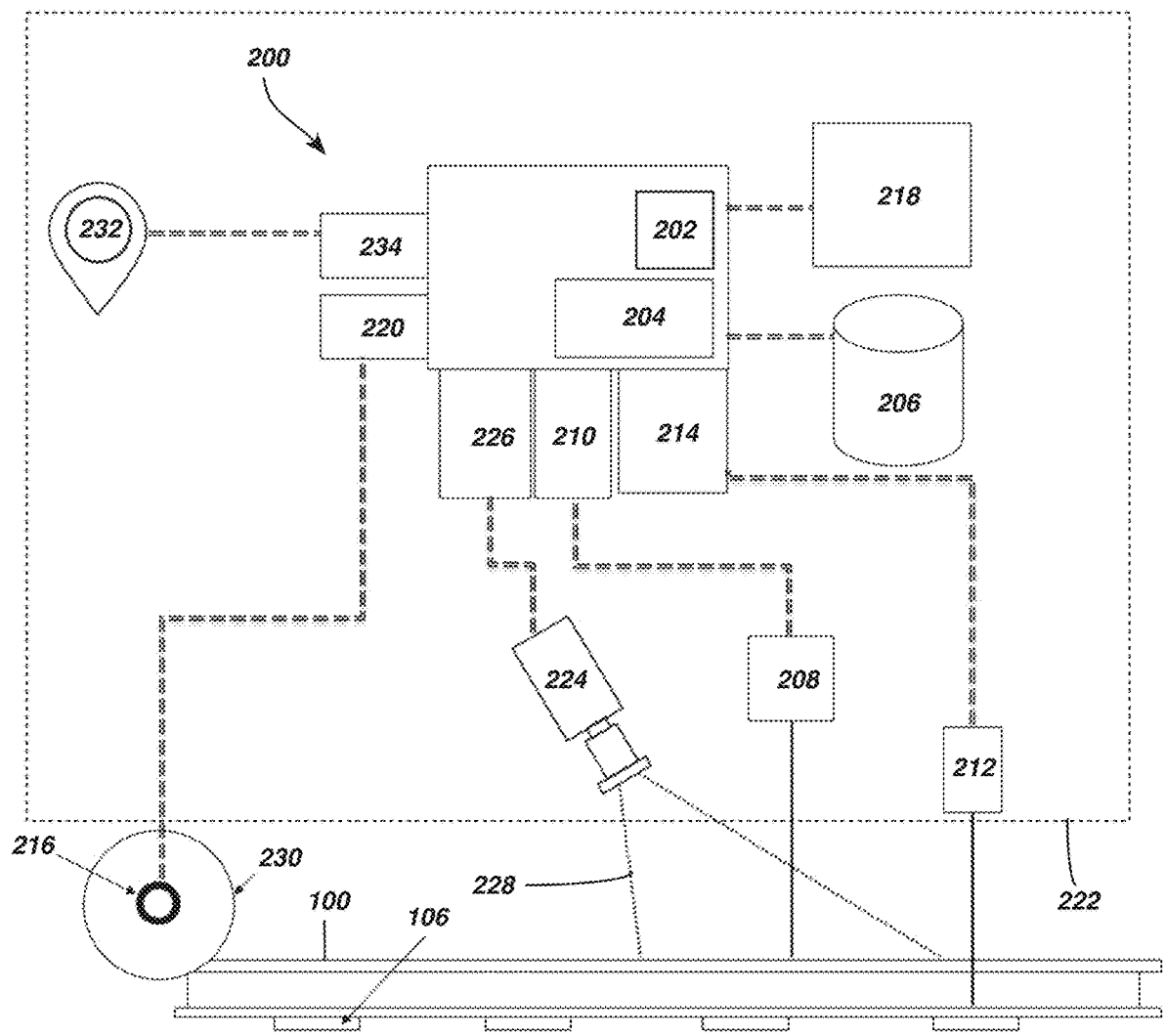
FIG. 9 shows a track assessment system according to one embodiment of the present disclosure.
Figure 10:
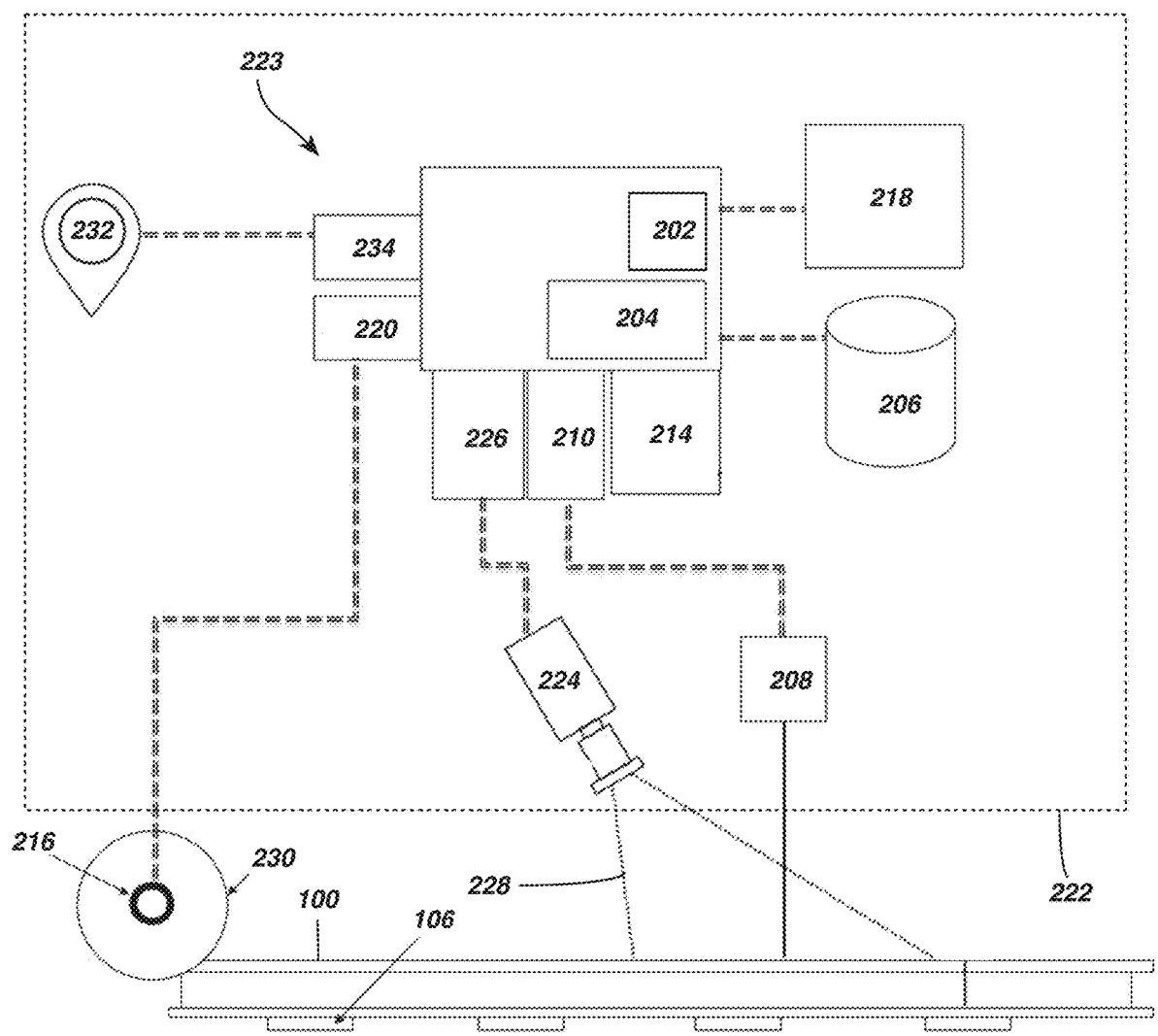
FIG. 10 shows an alternative arrangement of a track assessment system according to one embodiment of the present disclosure.

As shown in FIG. 9, methods and apparatuses for calculating plate cut and rail seat abrasion values may be performed using a track assessment system 200 preferably including a processor 202, an onboard computer readable storage medium 204, a data storage device 206 in communication with the processor 202, computer executable instructions stored on one of the onboard computer readable storage medium 204 or the data storage device 206, optionally one or more light emitters 208 (e.g., a laser line emitter) via an optional light emitter interface 210, one or more sensors 212 in communication with the processor 202 via a sensor interface 214, and an optional encoder 216 in communication with the processor 202 via an optional encoder interface 220. In a preferred embodiment, the one or more sensors 212 are Time of Flight ("ToF") sensors. However, it is also understood that various other suitable sensors including three-dimensional or "3D" sensors 212 may be used. The track assessment system 200 further preferably includes a display and user interface 218 in communication with the processor 202 to display data to or receive input from an operator. The track assessment system 200 is preferably mounted on a rail vehicle 222, such as a rail car, locomotive, high-rail vehicle, or other railway vehicle. The track assessment system 200 may be powered by the rail vehicle 222 or may be powered by a battery or other local power source. The data storage device 206 may be onboard the vehicle 222 or may be remote from the vehicle, communicating wirelessly with the processor 202. The track assessment system 200 preferably includes the 3D Track Assessment System 223 or "3DTAS" available from Tetra Tech, Inc. and described in U.S. Patent Application Publication Number 2016/0249040 dated Aug. 25, 2016 entitled "3D Track Assessment System and Method," the contents of which are incorporated herein by reference in their entirety. An embodiment of the 3DTAS 223 including its basic components is shown in FIG. 10.

For embodiments employing one or more light emitters 208, such light emitters 208 are used to project a light, preferably a laser line, onto a surface of an underlying rail assembly to use in association with three-dimensional sensors to three-dimensionally triangulate the rail assembly. In a preferred embodiment, a camera 224 in communication with the processor 202 via a camera interface 226 is oriented such that a field of view 228 of the camera 224 captures the rail assembly including the light projected from the light emitter 208. The camera 224 may include a combination of lenses and filters and using known techniques of three-dimensional triangulation a three-dimensional elevation map of an underlying railway track bed can be generated by the processor 202 after vectors of elevations are gathered by the camera 224 as the rail vehicle 222 moves along the rail.

Elevation maps generated based on the gathered elevation and intensity data can be interrogated by the processor 202 or other processing device using machine vision algorithms. Suitable cameras and sensors may include commercially available three-dimensional sensors and cameras, such as three-dimensional cameras manufactured by SICK AG based in Waldkirch, Germany.

ToF sensors are preferably based on pulsed laser light or LiDAR technologies. Such technologies determine the distance between the sensor and a measured surface by calculating an amount of time required for a light pulse to propagate from an emitting device, reflect from a point on the surface to be measured, and return back to a detecting device. The ToF sensors may be a single-point measurement device or may be an array measurement device, commonly referred to as a ToF camera, such as those manufactured by Basler AG or pmdtechnologies AG.

Figure 11:
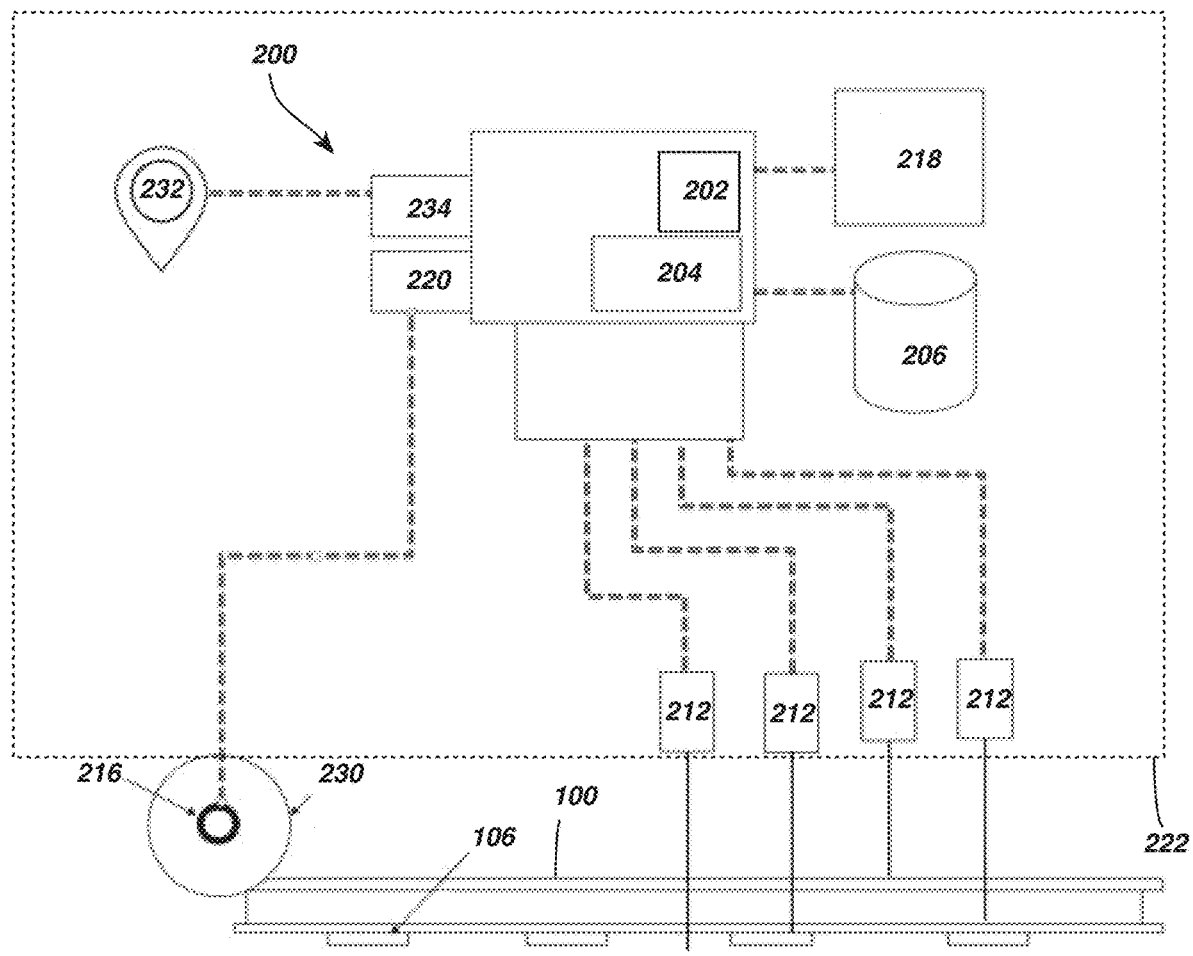
FIG. 11 shows another alternative arrangement of a track assessment system according to one embodiment of the present disclosure.
Figure 12:
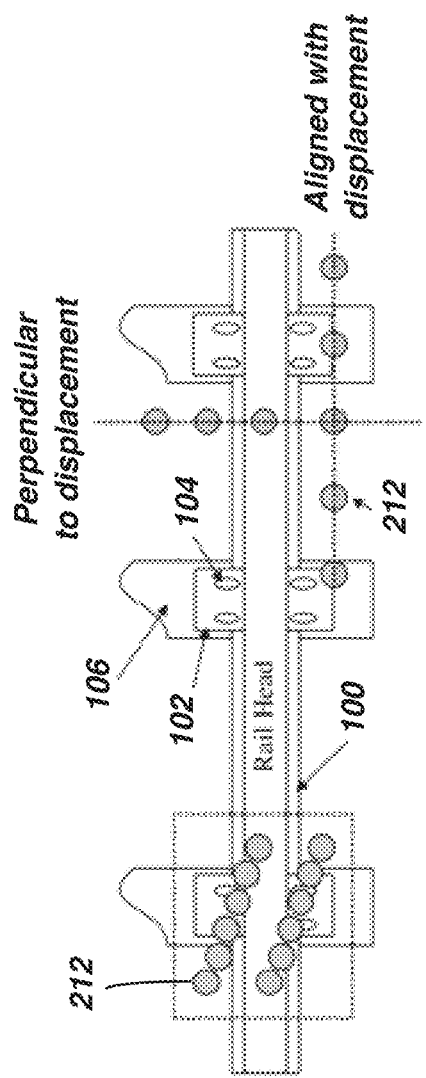
FIG. 12 shows placement of sensors of a track assessment system above a rail according to one embodiment of the present disclosure.

Referring to FIG. 10, three-dimensional mapping of a rail assembly may be performed by the track assessment system 200 using only the camera 224 and one or more light emitters 208. Alternatively, and as shown in FIG. 11, three-dimensional mapping may be performed using only sensors 212 comprising ToF sensors. A plurality of ToF sensors may be used such that various patterns and areas of an underlying rail assembly may be captured by the sensors 212. Referring to FIG. 12, the one or more sensors 212 may be arranged in varying patterns such that a measurement area is captured by the one or more sensors 212. The one or more sensors may be aligned perpendicular to the direction of travel (along the rails) or arranged in two or more directions to optimize a resolution of data acquired from the measurement area.

Referring again to FIG. 9, the camera interface 226 and sensor interface 214 receive signals from the camera 224 and sensors 212 respectively and convert the received signals into data that is compatible with the processor 202 and computer readable storage medium 204. The camera interface 226 and sensor interface 214 may further provide power to the camera 224 and sensors 212 and allow the processor 202 to communicate with the camera 224 and sensors 212, such as to communicate specific actions and settings such as acquisition rate, calibration parameters, and start/stop signals.

In a preferred embodiment, data from the camera 224 and one or more sensors 212 is combined, and a calibration process is preferably performed between the camera 224 and one or more sensors 212 using a known dimensional calibration target such that the camera 224 and one or more sensors 212 combine to generate a 3D elevation map as described in greater detail below.

The encoder 216 is located at a wheel 230 of the rail vehicle 222 and is in communication with the processor 202 via the encoder interface 220. The encoder 216 preferably operates at a rate of at least 12,500 pulses per revolution of the wheel 230 with a longitudinal distance of approximately 0.25 mm per pulse. Measurements from sensors 212 of the track assessment system are preferably synchronized with data from the encoder 216 to determine locations of measurements of the track assessment system and a generated three-dimensional elevation map. In one embodiment, the track assessment system further includes a GPS antenna 232 in communication with the processor 202 via a GPS interface 234 to further provide geo-position synchronization data during measurement of a rail assembly.

Figure 4:
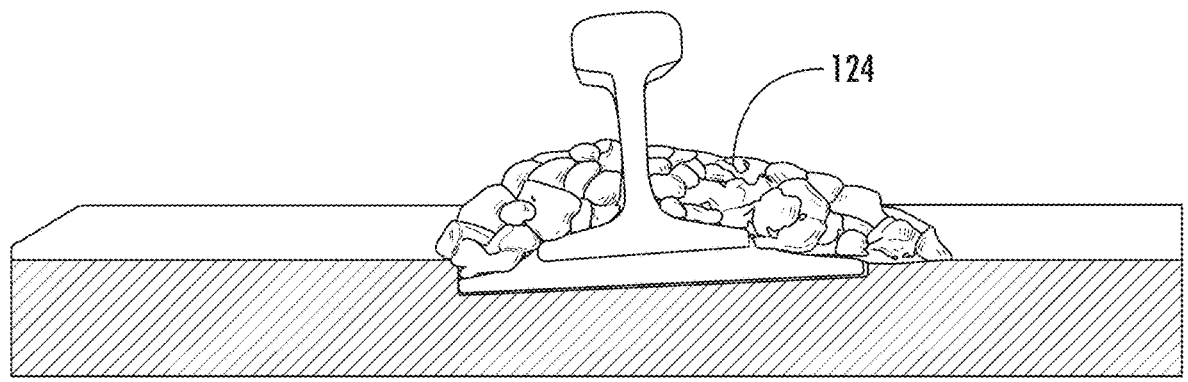
FIG. 4 shows a wooden crosstie rail assembly at least partially obscured by ballast according to one embodiment of the present disclosure.
Figure 5:
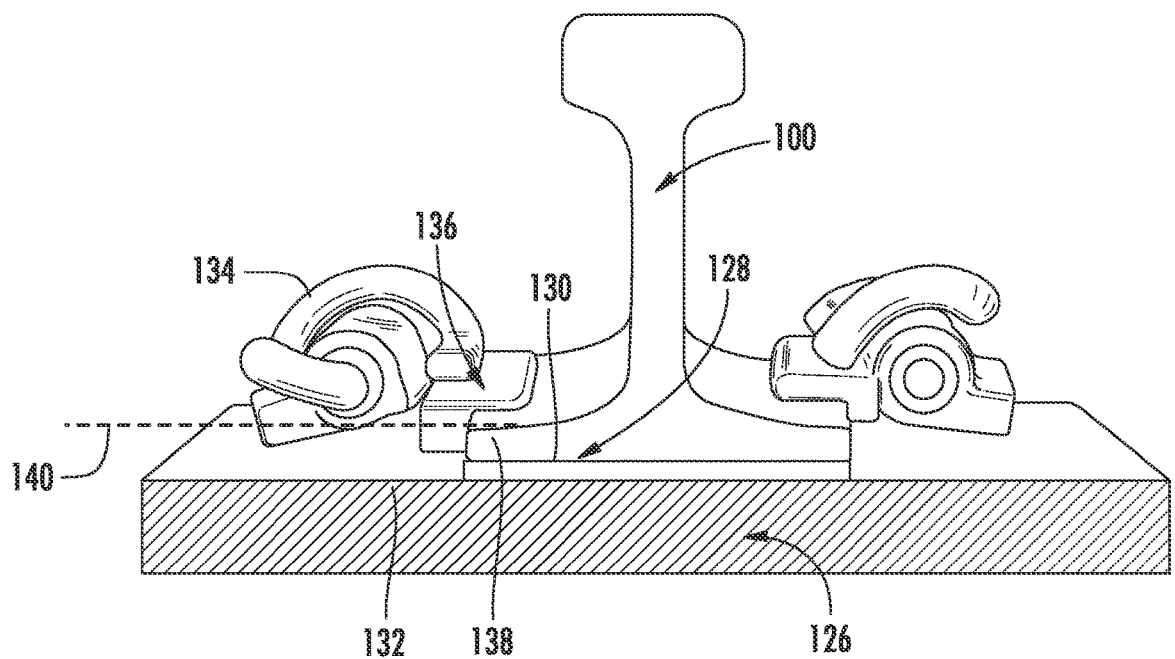
FIG. 5 shows a concrete crosstie rail assembly according to one embodiment of the present disclosure.
Figure 6:
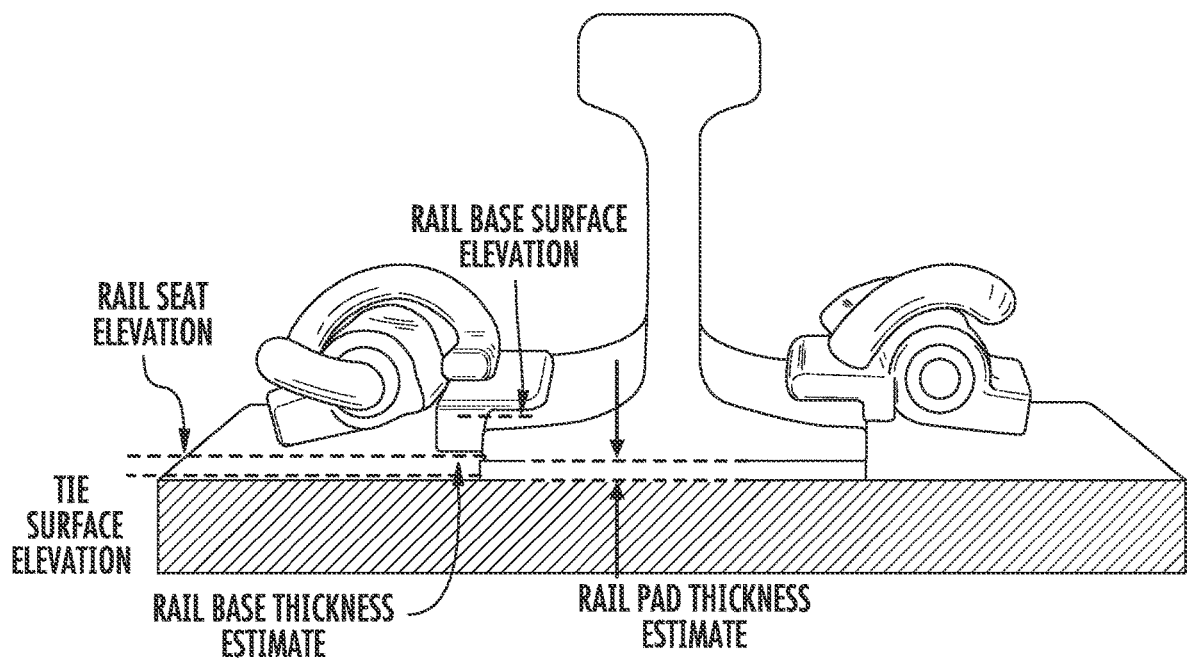
FIGS. 6 and 7 show prior methods of determining rail seat abrasion according to one embodiment of the present disclosure.
Figure 7:
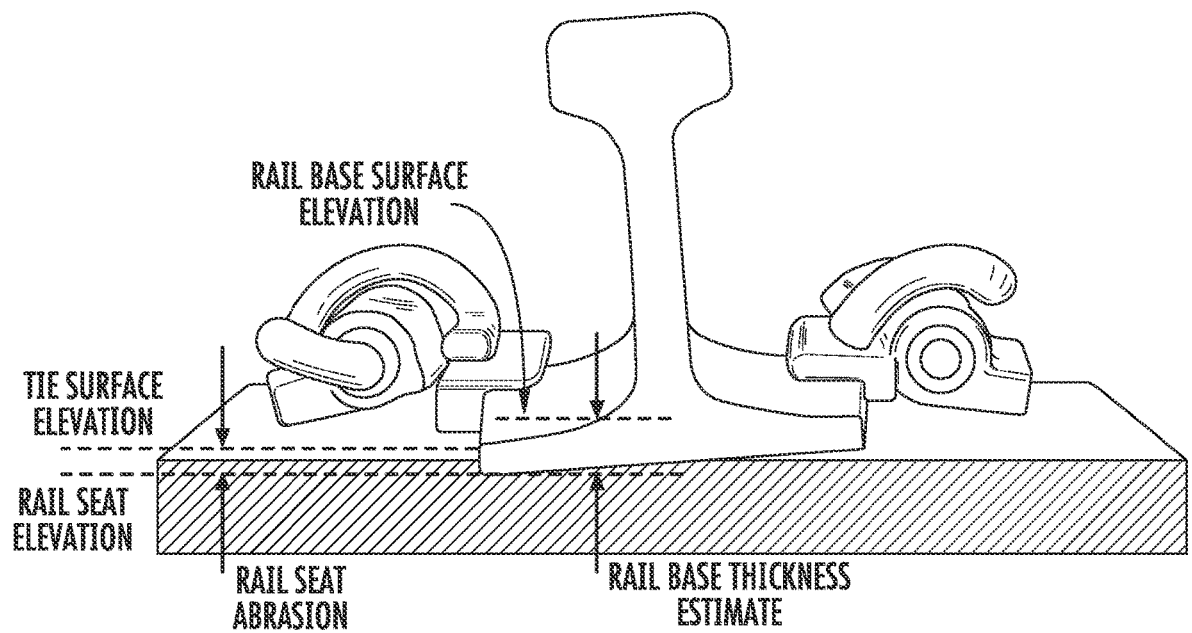
Figure 8:
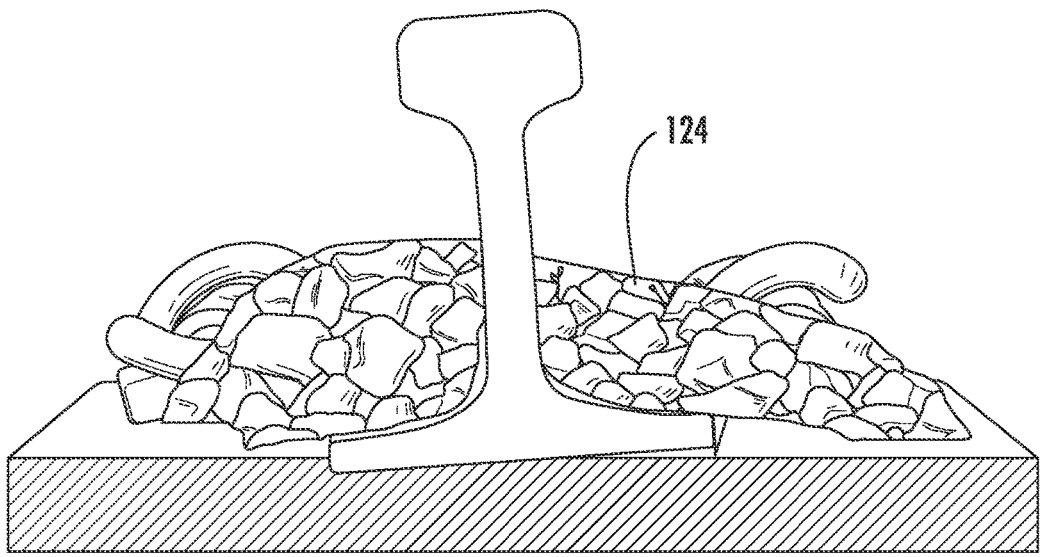
FIG. 8 shows a concrete crosstie rail assembly at least partially obscured by ballast according to one embodiment of the present disclosure.
Figure 13:
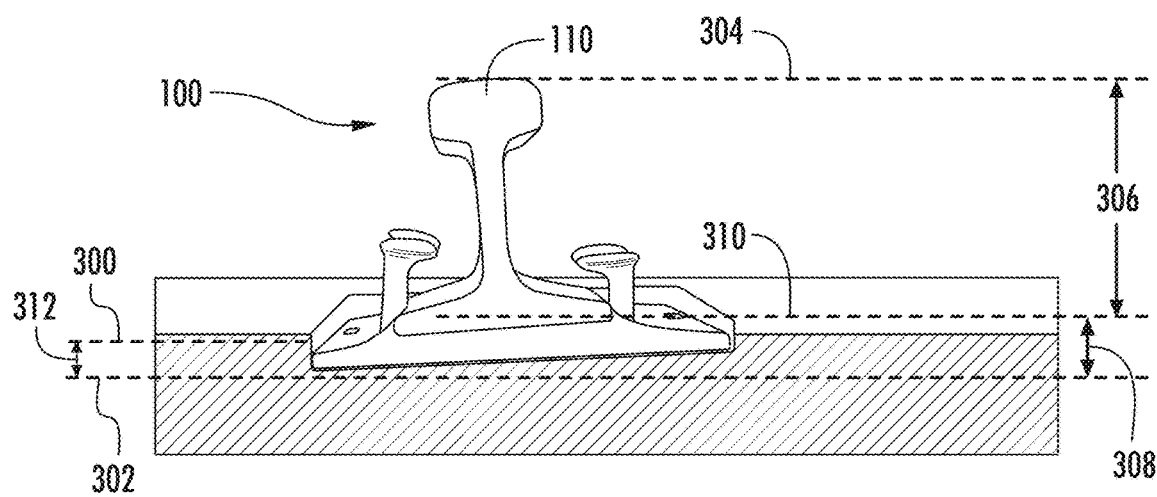
FIG. 13 shows determination of a plate cut value according to one embodiment of the present disclosure.

In order to extend the ability to estimate plate cut measures in areas with obscured crosstie plates (FIG. 4), embodiments of the present disclosure include measurements referenced to a top surface of the rail 100 or rail head 110 as shown in FIG. 13, the surface on which the wheels of a train travel, which is an area of the track structure which is never obscured. Plate cut measurements referenced from an elevation of the top of the rail 100 along the rail head 110 produce valid plate cut values, even in conditions where the presence of ballast, debris or foliage in and around the track obscures all but the top surface of the rail head and a small portion of the surface of the crosstie.

Methods disclosed herein determine a difference between a wooden crosstie surface elevation 300 and an estimated tie plate base elevation 302. The improved rail head surface elevation method described herein measures a rail head surface elevation 304 as a reference elevation and calculates a vertical offset from the rail head surface elevation 304 to establish the estimated tie plate base elevation 302. This vertical offset is calculated as the sum of an estimated rail height 306 and an estimated tie plate thickness 308. The total height of the entire rail is the sum of both the "estimated rail height" 306 (which includes the distance from the rail head surface elevation 304 to a rail base surface elevation 310) plus the estimated tie plate thickness 308. A plate cut measurement 312 based on rail head surface elevation (which is insensitive to the presence of rail base surface debris) may be determined, for example, as follows:

Plate Cut Measurement=Crosstie Surface Elevation−(Rail Head Surface Elevation−(Rail Height Estimate+Estimated Crosstie Plate Thickness))  Equation 3:

Estimated rail height 306 may be determined, for example, from a) the specifications of known rail sizes and types, b) by using a representative fixed elevation estimate, or c) by calculating the elevation difference between the rail head and rail base top surface at regular intervals along the length of the track.

Exemplary methods of determining the estimated rail height 306 can include analyzing data collected on the track assessment system 200, including location data from one or both of the encoder 216 and GPS antenna 232 to determine a position at which measurements of the rail assembly are taken. Location data may be used to determine a particular type of rail used based on data provided by an owner or operator of a particular railway, such data accessed directly from an onboard data storage device (e.g., the data storage device 206) or wirelessly from a remote data storage device. For example, an owner or operator of a railway may provide data regarding the manufacturer and size of a rail used at particular locations of the railway, and the estimated rail height 306 may be determined based on known dimensions of the rail available from the manufacturer.

Figure 14:
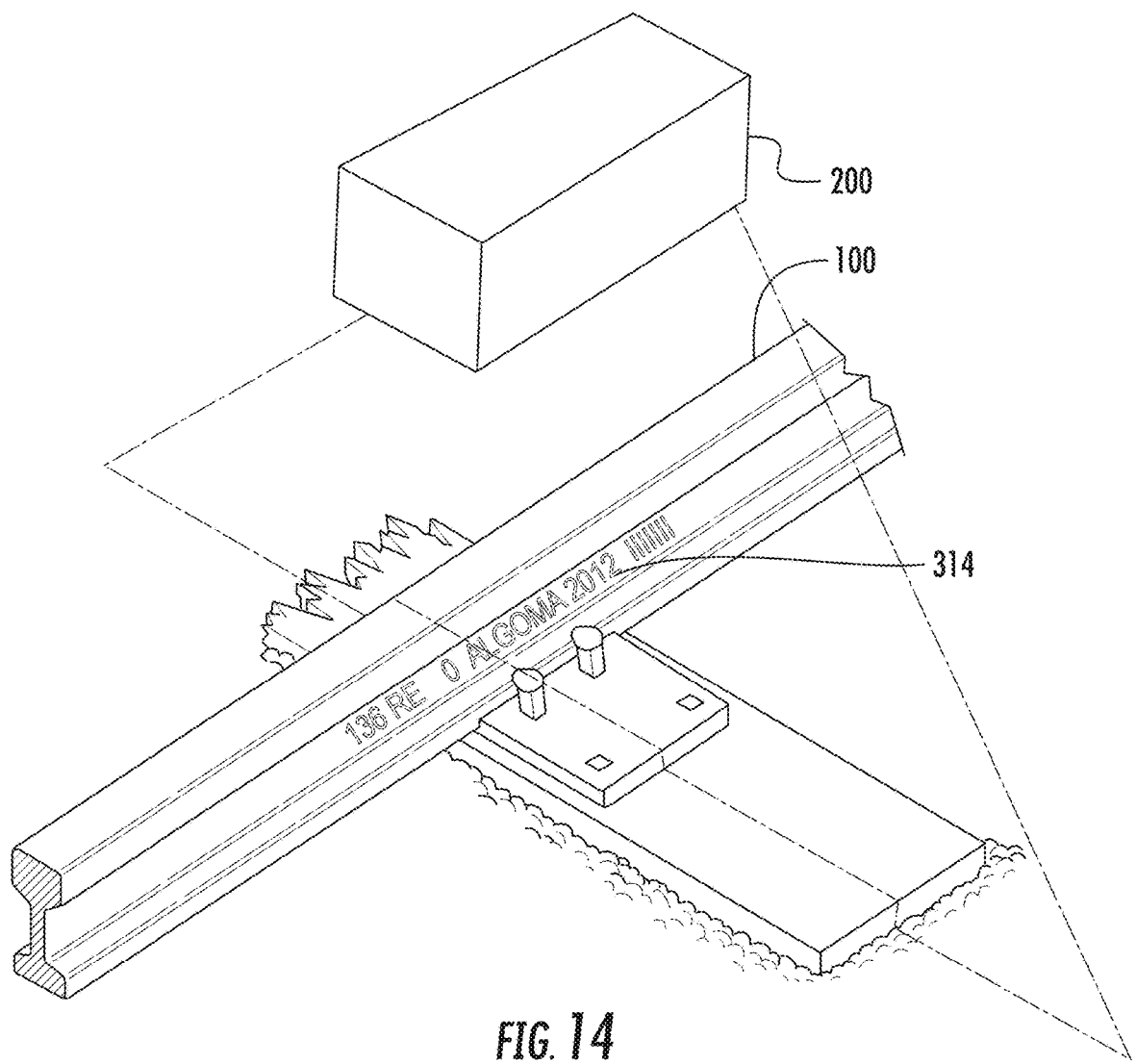
FIG. 14 illustrates detection of visual indicators on a rail according to one embodiment of the present disclosure.

In another exemplary method, data collected from the track assessment system 200 may be analyzed to detect visual marks or indicators 314 located on the rail, as shown in FIG. 14. Visual indicators may include marks from the manufacturer that may be used to identify information such as the manufacturer of the rail and type or model of rail supplied by the manufacturer. Data collected by the track assessment system 200 may include visual data that captures the visual marks or indicators 314. The collected data may be analyzed using automated machine vision, optical character recognition (OCR), or other known methods to identify the visual marks or indicators 314. After identifying the visual marks or indicators 314, the estimated rail height 306 may be determined based on data available from the manufacturer, such data accessed directly from an onboard data storage device (e.g., the data storage device 206) or wirelessly from a remote data storage device.

In yet another exemplary method, the estimated rail height 306 (FIG. 13) may be determined based on detecting differences in elevation of the rail head 110 and a rail base surface 118 using the track assessment system 200 of FIGS. 9-11. Measurements may be taken at regular intervals along a length of track using sensors 212 of the track assessment system 200, and the estimated rail height 306 of FIG. 13 may be derived from elevation data collected by sensors 212 of the track assessment system 200.

The estimated tie plate thickness 308 shown in FIG. 13 may also be estimated using various methods. For example, the estimated tie plate thickness 308 may be determined based on a representative fixed value provided by an owner or operator of a railway. In another example, visual data of the tie plate 102 may be analyzed, such as using known methods of machine vision, to identify the tie plate 102 based on dimensions of the tie plate, size and number of fastening holes, and other visual information of the tie plate 102 captured by the track assessment system 200. Image processing algorithms may be used to compare visual information of the tie plate 102 with previously acquired tie plate data, or 3D feature classification algorithms may be used to compare elevation information with previously acquired tie plate elevation models, such tie plate data and models accessed directly from an onboard data storage device (e.g., the data storage device 206) or wirelessly from a remote data storage device.

Figure 1:
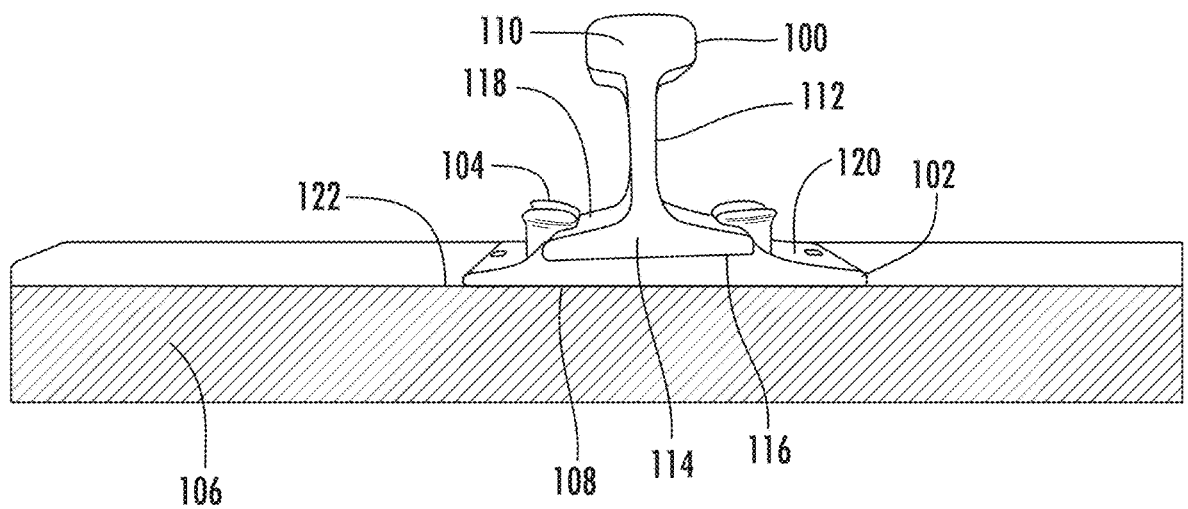
FIG. 1 shows a wooden crosstie rail assembly according to one embodiment of the present disclosure.
Figure 2:
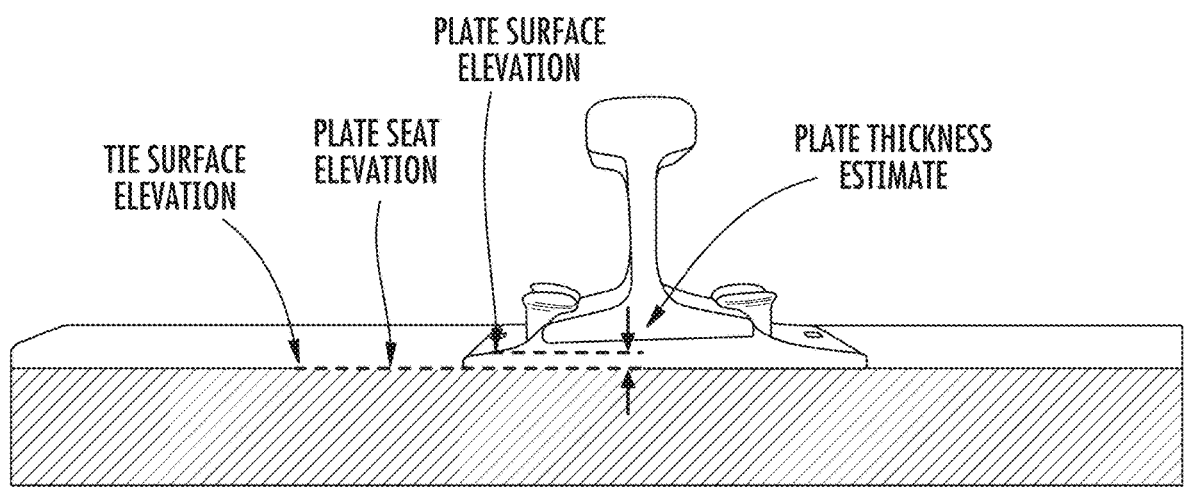
FIGS. 2 and 3 show prior methods of determining of plate cut according to one embodiment of the present disclosure.
Figure 3:
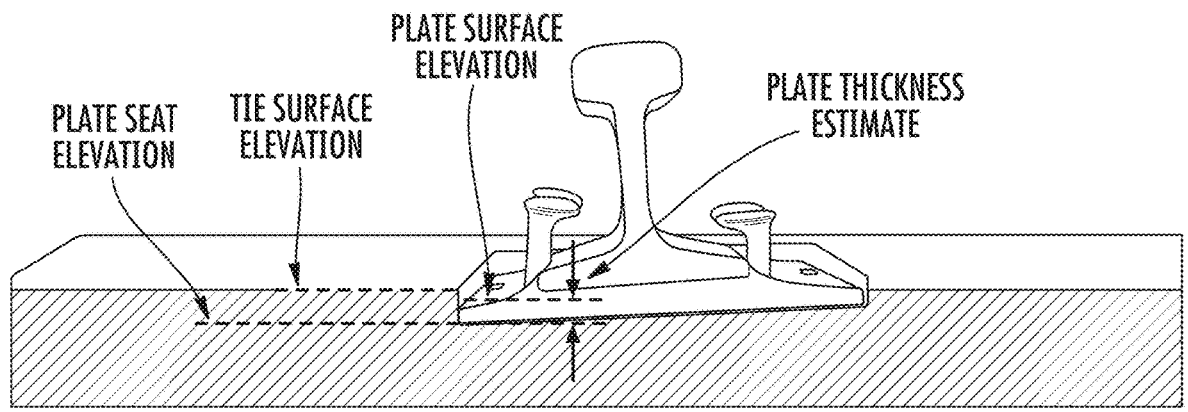
Figure 15:
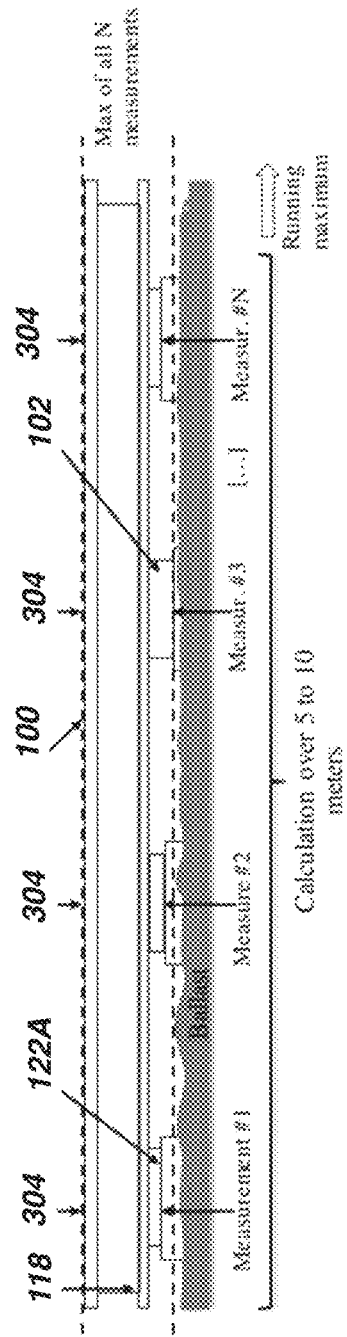
FIG. 15 illustrates estimation of a rail height and plate thickness based along a length of track according to one embodiment of the present disclosure.

Referring to FIG. 15, in another embodiment, estimated tie plate thickness 308 may be determined by calculating a running maximum elevation difference between the rail base surface 118 (at the rail base surface elevation 310 of FIG. 13) and the upper crosstie surface 122 of FIG. 1 (at the upper crosstie surface elevation 300 of FIG. 13). The maximum elevation difference between the rail base surface 118 and the upper crosstie surface 122 shown in FIG. 15 may be measured N times along a certain distance, such as from about 5 meters to about 10 meters of track, and a maximum value of the N measurements may be used as the estimated tie plate thickness 308 (FIG. 13).

Figure 16:
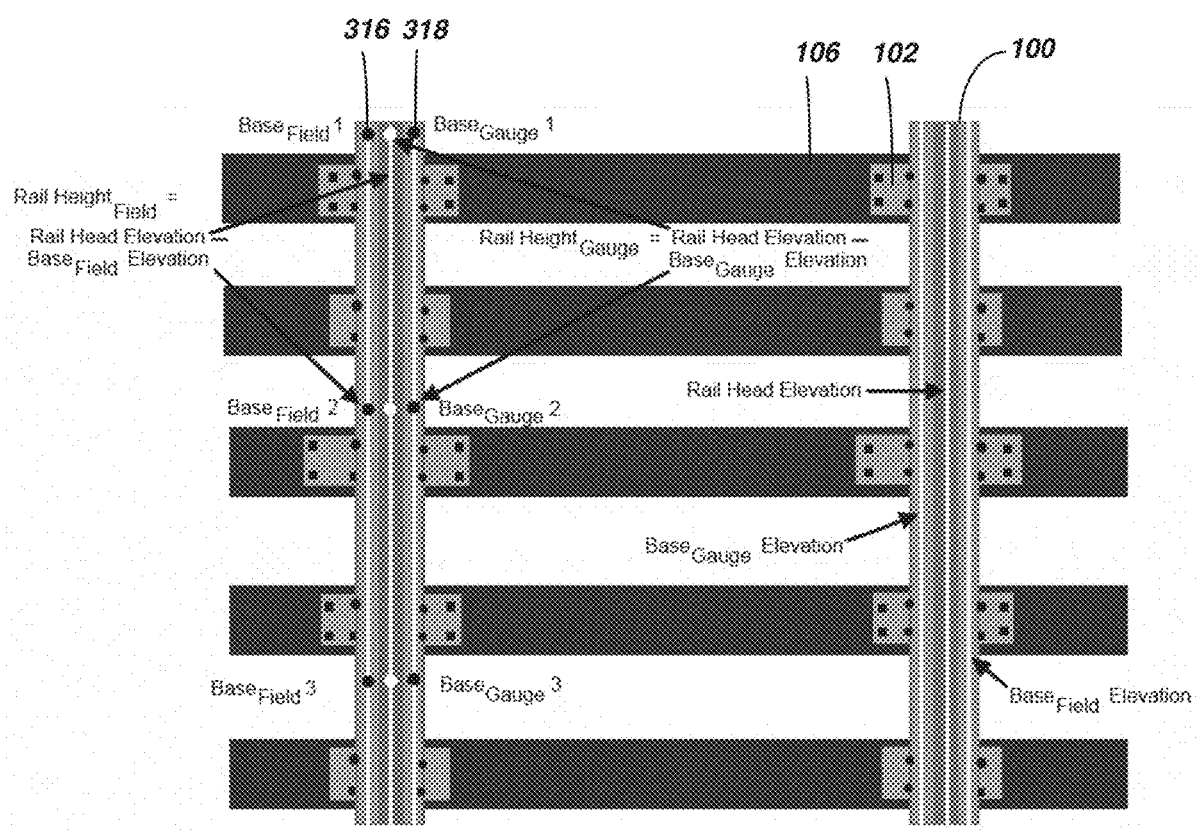
FIG. 16 shows a top view of a track according to one embodiment of the present disclosure.
Figure 17:
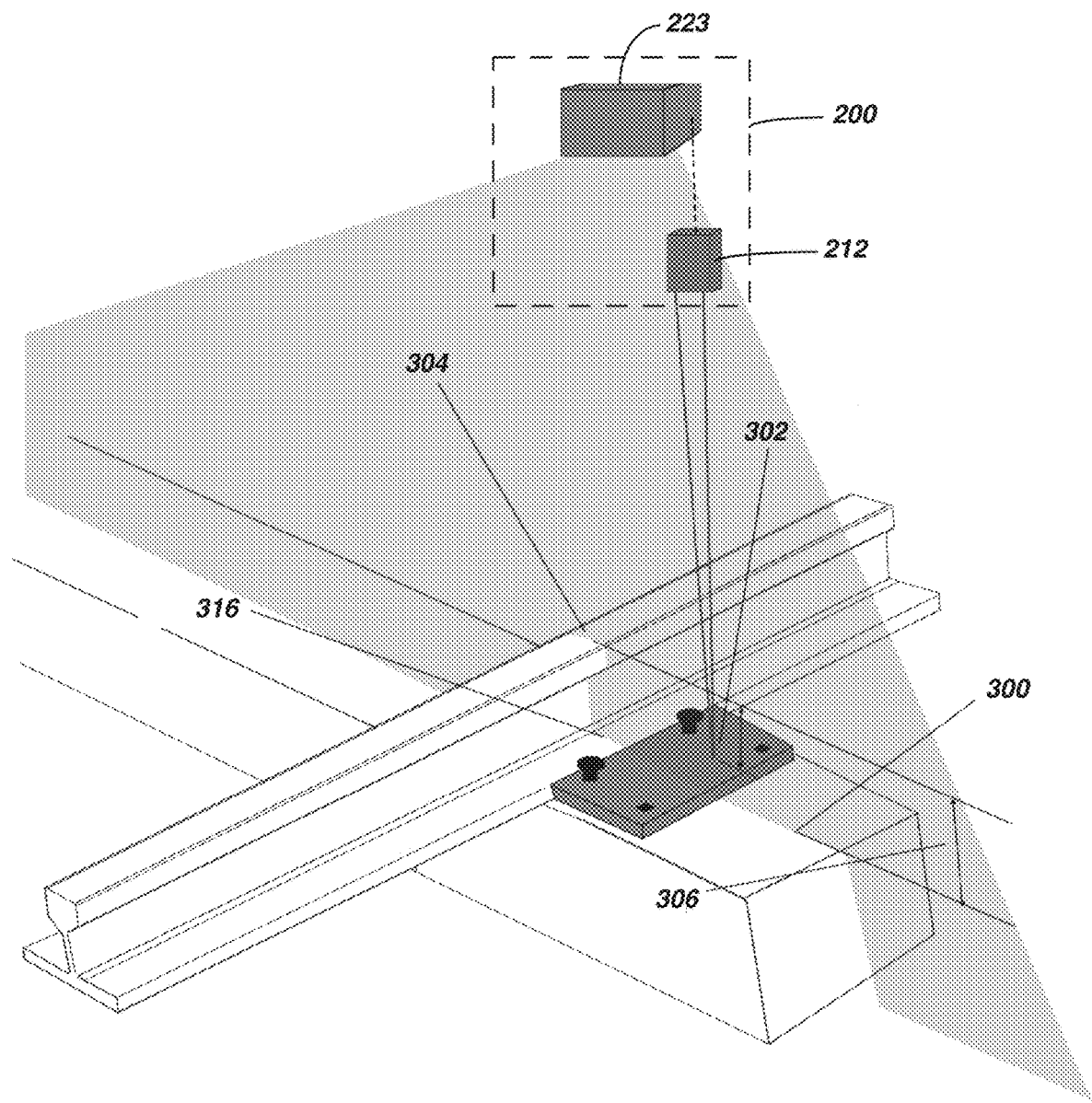
FIG. 17 shows arrangement of a track assessment system and sensors above a rail assembly according to one embodiment of the present disclosure.
Figure 18:
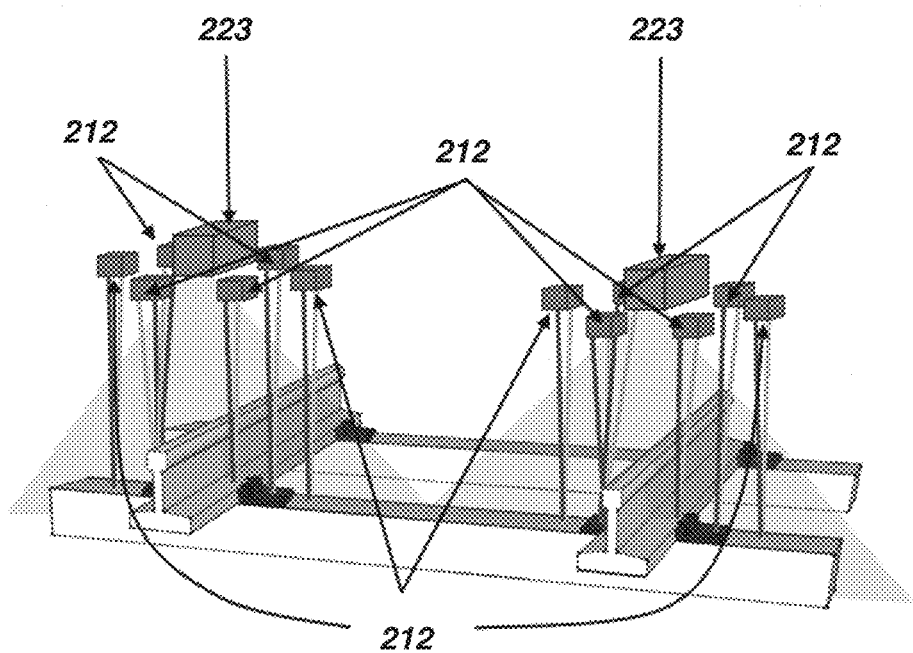
FIG. 18 shows an alternative arrangement of sensors above a track according to one embodiment of the present disclosure.

FIG. 16 shows an overhead view of a track as viewed from sensors of the track assessment system 200. Estimating tie plate thickness can be performed on both field and gauge sides of a track. Sensors 212 of the track assessment system 200 may measure the rail head surface elevation 304 relative to a rail base field elevation 316 and a rail base gauge elevation 318. Field and gauge rail height calculations may be determined based on the following two equations:

Field Rail Height=Rail Head Elevation−Field Rail Base Elevation    Equation 4:

Gauge Rail Height=Rail Head Elevation−Gauge Rail Base Elevation    Equation 5:

Various sensors and technologies may be employed to determine elevations of components of the track and to provide additional measurements when calculating rail height, rail base thickness, or tie plate thickness estimates. These technologies can include fixed point or LiDAR based Time of Flight ToF range sensors referenced to 3D triangulation elevation measurement systems. FIGS. 17 and 18 both show three-dimensional triangulation and measurement of a track surface (such as using the track assessment system 200 described herein) including time of flight technologies.

In order to extend the ability to estimate rail seat abrasion (RSA) measurement in areas with obscured rail base surfaces, the rail base seat elevation measures can be referenced to the top surface of the rail head 110, the surface on which the wheels travel, is an area of the track structure which is never obscured. Rail seat abrasion measurements referenced from the rail head elevation produce valid RSA measures, even in conditions where the presence of ballast, debris or foliage in and around the track obscures all but the top surface of the rail head and a small portion of the crosstie surface.

Figure 19:
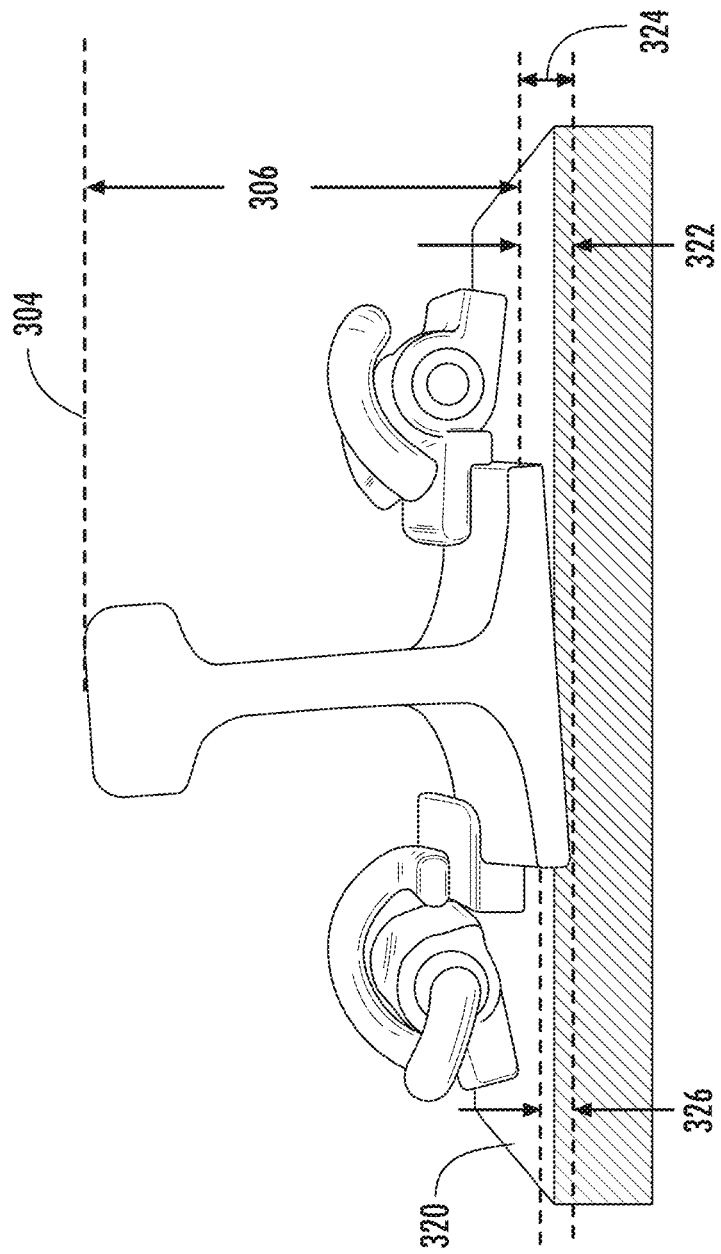
FIG. 19 shows determination of a rail seat abrasion value according to one embodiment of the present disclosure.
Figure 20:
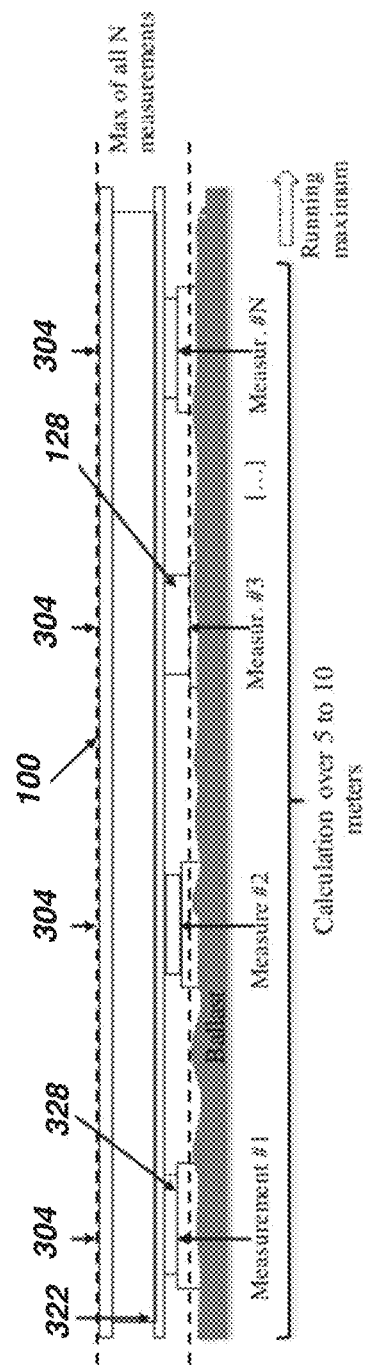
FIG. 20 shows estimation of rail base height and thickness along a length of track according to one embodiment of the present disclosure.

Methods and embodiments of the present disclosure are further capable of determining a rail seat abrasion (RSA) value of a section of track. Referring to FIG. 19, RSA may be calculated based on a difference between a concrete crosstie surface elevation 320 and an estimated elevation of a rail base seat 116 (FIG. 1) (such elevation referred to herein as a rail base seat elevation 322). The rail head surface elevation 304 is used as a reference elevation and calculates a vertical offset from the reference elevation to the rail base seat elevation 322. The calculated vertical offset combines estimated rail height 306 and estimated rail base thickness 324 measurements to calculate a total rail height. A RSA value 326 of the track may be calculated such that the measurement is insensitive to the presence of surface debris on any rail foot or crosstie plate. For example, a RSA value may be determined as follows:

Rail Seat Abrasion=Crosstie Surface Elevation−(Rail Head Elevation−(Rail Height Estimate+Rail Base Thickness Estimate)).    Equation 6:

With further reference to FIG. 19 and FIG. 20, an improved rail head elevation derived rail base elevation determination method is provided. The combined rail height 306, rail base thickness 324 and thickness of an underlying pad 128 can be determined in-situ using various suitable methods. For example, specifications of known rail and pad sizes and types may be known based on a location of track or by manufacturing marks present on the rail. Alternatively, a representative fixed rail height and pad thickness estimate may be used to calculate RSA. In another example, maximum differences between the rail head elevation 304 and a top surface of the concrete crosstie elevation 328 are calculated at intervals along the length of the track, as shown in FIG. 20.

Figure 21:
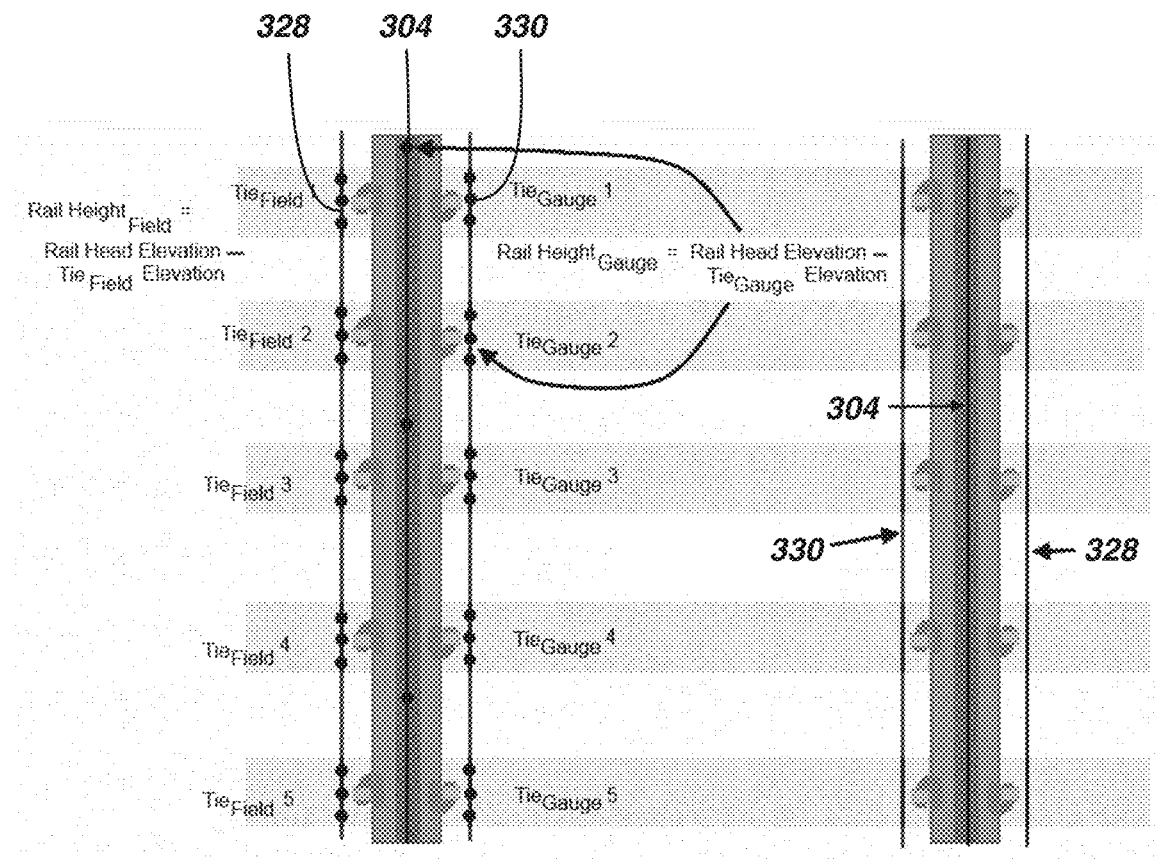
FIG. 21 shows a top view of a track according to one embodiment of the present disclosure.

Referring now to FIG. 21, both field and gauge rail heights may be calculated based on elevation measurements of the track. The rail head surface elevation 304 may be measured according to embodiments described herein. Further, both a crosstie surface field side elevation 328 and a crosstie surface gauge side elevation 330 may be measured at multiple points along a length of the track. Based on both field and gauge side measurements, field side total rail height elevations and gauge side total rail height elevations may be calculated as follows:

Field Side Total Rail Height=Rail Head Elevation− (Field Side Crosstie Elevation+Pad Thickness)    Equation 7:

Gauge Side Total Rail Height=Rail Head Elevation− (Gauge Side Crosstie Elevation+Pad Thickness)    Equation 8:

The combined rail height and rail base thickness (collectively, the "total rail height"), plus pad thickness can be determined by calculating a running maximum of a difference of the rail head surface elevation 304 to the concrete crosstie surface elevation 328, as shown in FIG. 20. The maximum crosstie surface and rail head elevation difference values over an extended distance (5 m to 10 m for example) would typically be representative of crossties with no RSA occurring. This maximum value would be an accurate installed total rail height and pad thickness estimate. This installed total rail height and pad thickness estimate offset would be calculated for both the field and gauge sides of both rails.

Figure 22:
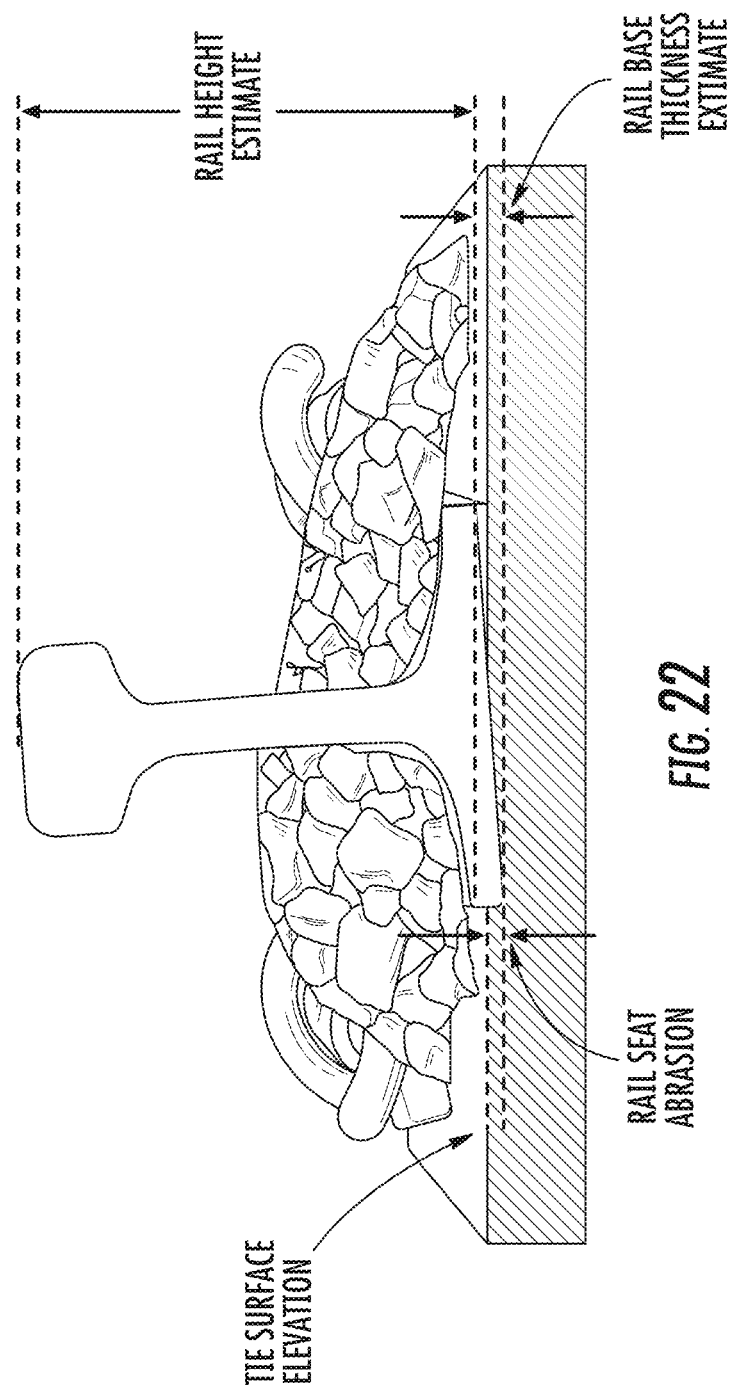
FIG. 22 shows determination of a rail seat abrasion value of a rail assembly including ballast according to one embodiment of the present disclosure.
Figure 23:
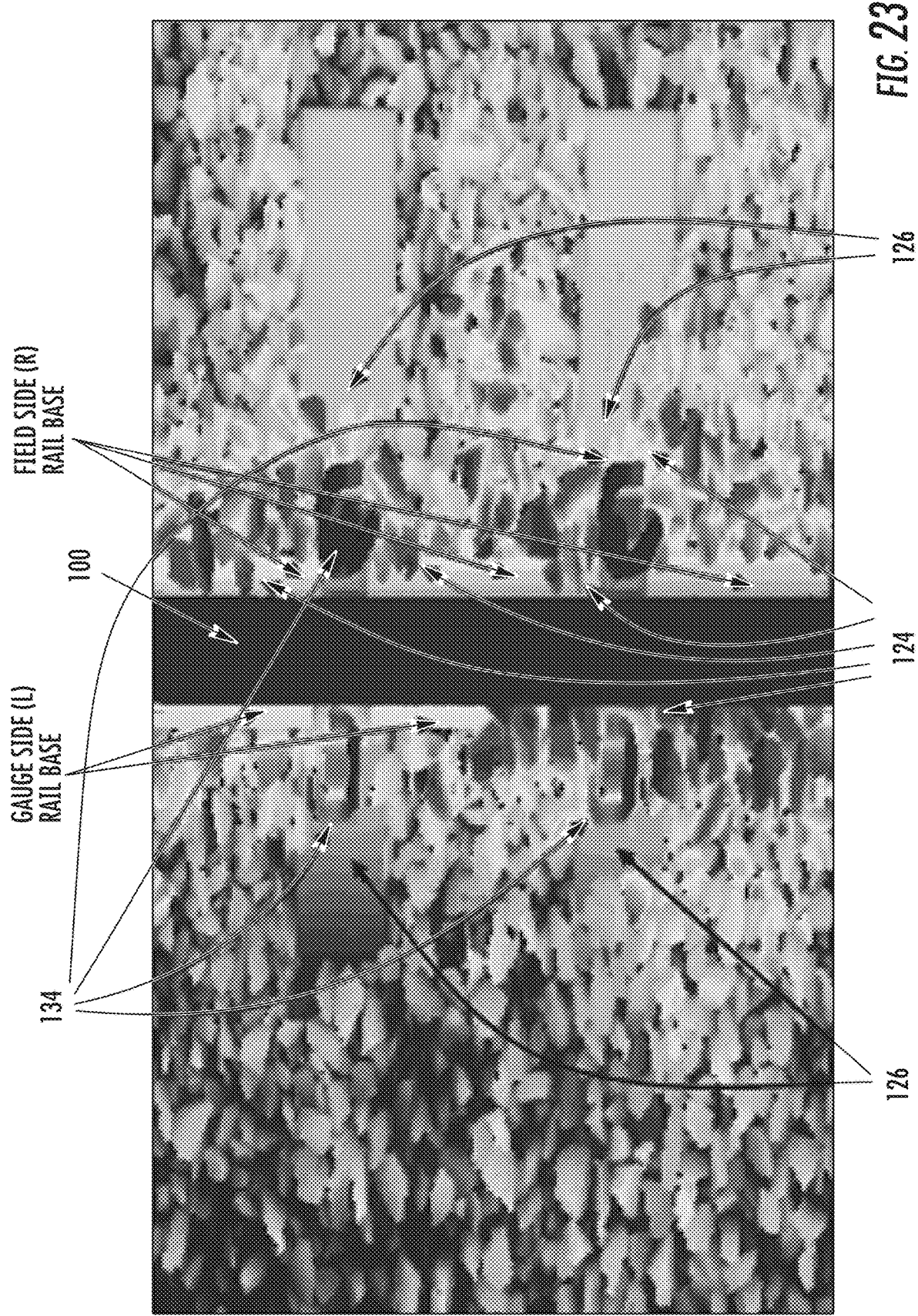
FIG. 23 shows a view of a rail assembly from sensors of a track assessment system according to one embodiment of the present disclosure.

The calculation of the rail seat elevation based on the difference in rail head elevation and combined rail height and rail base thickness measurement allows calculating RSA measurements in situations where the rail base is obscured with track debris, such as ballast stones. The presence of track debris, and ballast stones in particular, on the top surface of the rail base (e.g., the rail foot and crosstie plates) is a common occurrence. FIG. 22 shows a method of RSA measurement in the presence of ballast as follows:

Rail Seat Abrasion=Crosstie Surface Elevation−(Rail Head Elevation−(Rail Height Estimate [including rail head and rail web]+Rail Base Thickness Estimate))  Equation 9:

The method described above is insensitive to the presence of debris on the rail base surface. For example, FIG. 23 shows a top view of a rail assembly including a top view of the rail 100, clips 134, and visible portions of the concrete crosstie 126. As shown, portions of the clips 134 and the corresponding rail base surface are obscured by ballast stones such that portions of the clips 134 and the rail base surface are not visible to sensors of the track assessment system 200 analyzing the rail assembly, thereby making conventional RSA measurements impossible.

Figure 24:
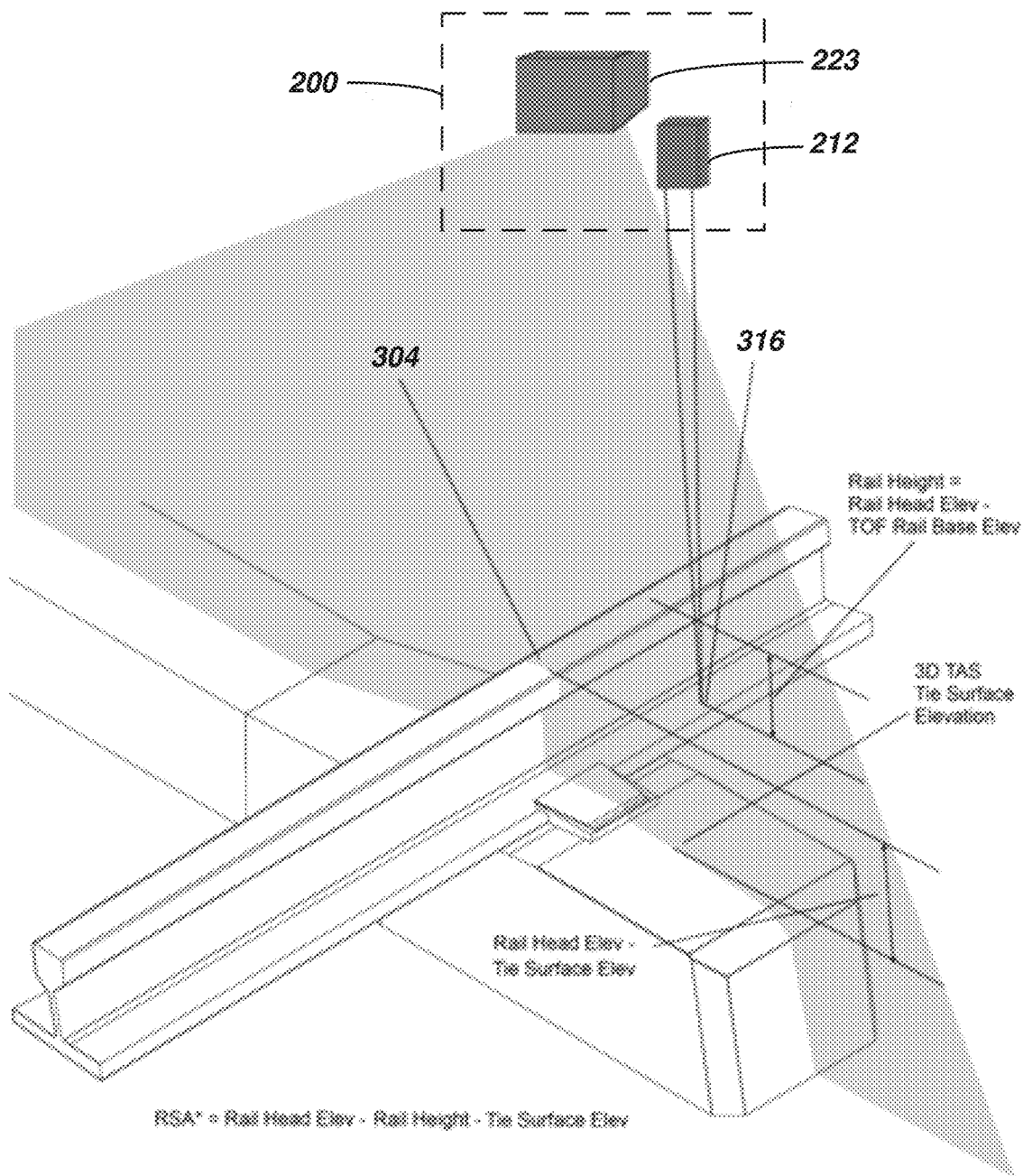
FIG. 24 shows arrangement of a track assessment system above a rail assembly according to one embodiment of the present disclosure.

Referring now to FIG. 24, various suitable technologies may be employed to determine elevations along the rail base to provide additional measurements when calculating the rail height and rail base thickness estimates. These technologies can include fixed point pulsed laser Time of Flight (ToF) or LiDAR based range sensors referenced with respect to the track assessment system 200. These combined features are shown for example in FIG. 24. In the example of FIG. 24, both ToF sensors of the track assessment system 200 may measure various elevations of the rail head, rail base, and other components of the rail assembly to determine RSA values as described herein.

Figure 25:
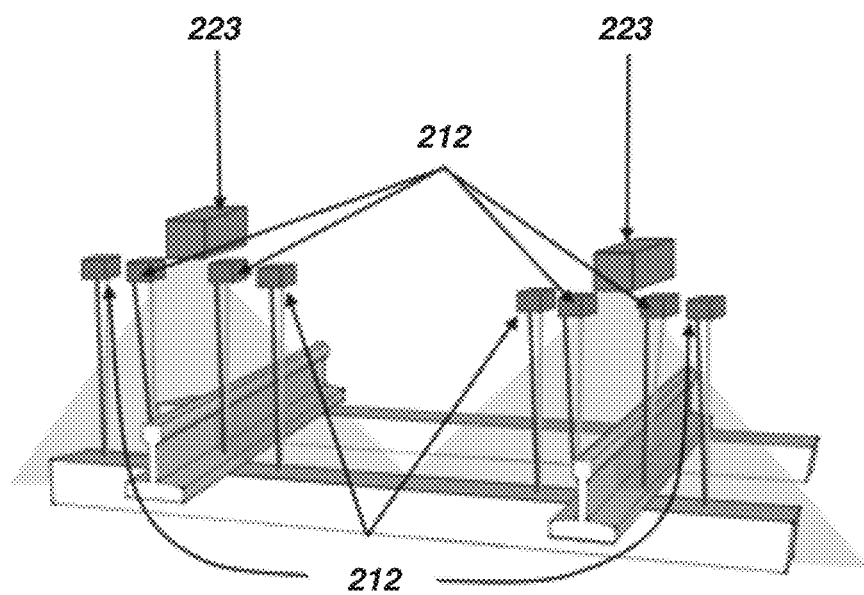
FIG. 25 shows arrangement of sensors above a track according to one embodiment of the present disclosure.

The fixed-point Time of Flight or LiDAR sensors can be positioned to provide measurements for rail base, rail head and crosstie surface elevations for both the field and gauge side of each rail. These systems would be capable of providing real-time rail seat abrasion measures in both clear rail base and obscured rail base scenarios. FIG. 25 shows an RSA detection system combining both 3D triangulation and time of flight elevation measurements.

In operation, the track assessment system 200 scans an underlying track, and the track assessment system 200 preferably moves along the track to gather data at various points along the track. Data from the track assessment system includes elevational data corresponding to an elevation of the rail head and an elevation of a top surfaces of crossties. Elevation data may be stored on the data storage device 206 (FIG. 9) for subsequent analysis. Further, data corresponding to estimated rail heights and other parameters discussed herein may be stored on the data storage device 206 so that such data is accessible to the processor 202. Collected data stored on the data storage device 206 can be processed to determine plate cut or rail seat abrasion measurements to indicate whether portions of a track require maintenance or repair. Collected data stored on the data storage device 206 may be analyzed in real-time as data is collected by sensors or may be analyzed after collection for subsequent remediation.

Figure 26:
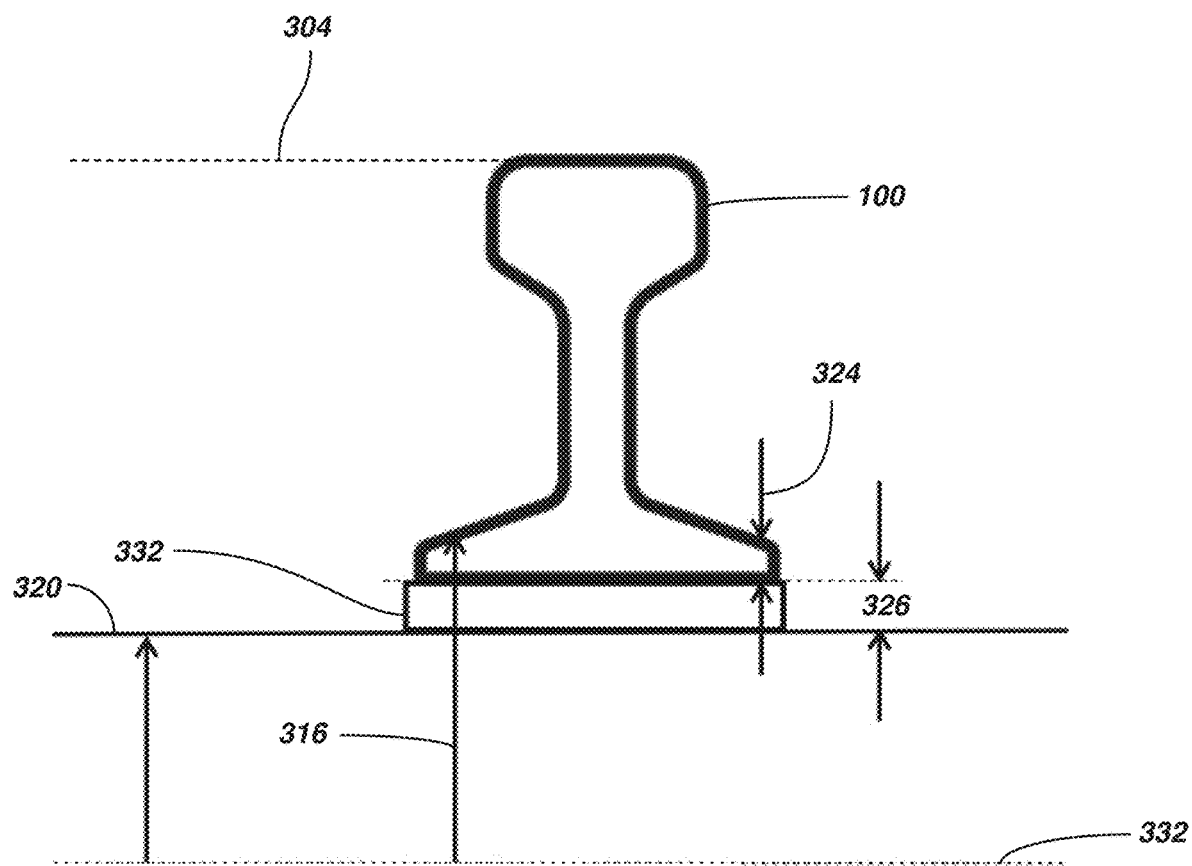
FIG. 26 is an illustration of a reference axis for determining elevations of a rail assembly according to one embodiment of the present disclosure.

Embodiments of the present disclosure refer to an elevation or surface elevation of various components of a rail assembly, such as the concrete crosstie surface elevation 320, rail head surface elevation 304, and other surface elevations. As shown in FIG. 26, a surface elevation may be based on a reference axis 332. The reference axis 332 may be an arbitrary distance from the track assessment system 200 and other sensors detecting an elevation. For example, in the equations disclosed herein, the reference axis 332 is assumed to be located below the concrete crosstie surface elevation 320 and other components of the rail assembly. As shown in FIG. 26, the concrete crosstie surface elevation 320 is determined to be the distance between a top of the concrete crosstie 320 and the reference axis 332. However, it is also understood that the reference axis 332 may be located above the rail assembly, and one having ordinary skill in the art would recognize suitable equations for determining plate cut and rail seat abrasion measures based on the reference axis 332 being located above the rail assembly. In yet another embodiment, the reference axis 332 may be located at the same location as sensors of the track assessment system 200 and an elevation may be determined based on a distance from sensors of the track assessment system 200 to each respective surface of the rail assembly.

Figure 27:
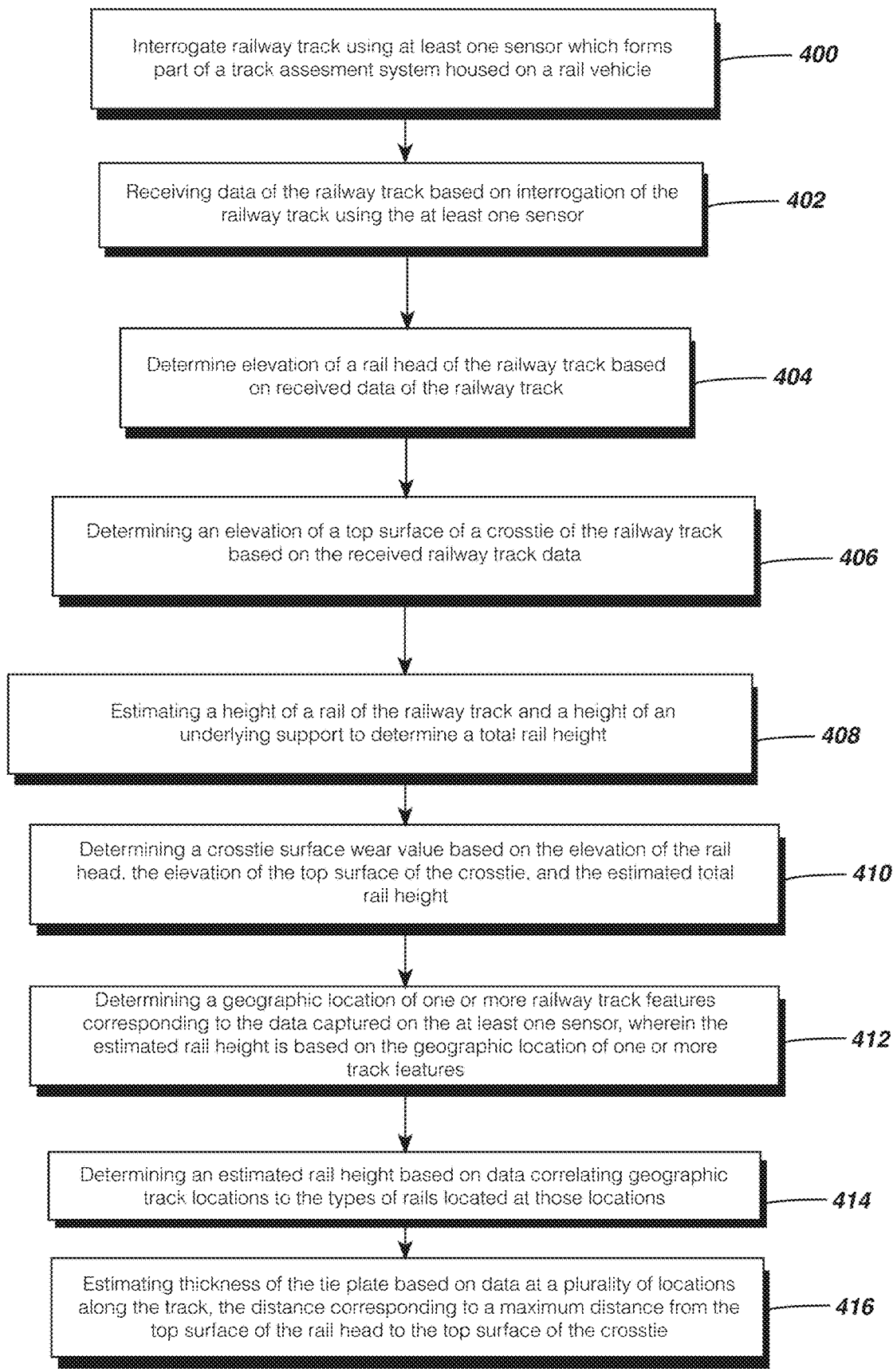
FIG. 27 is a flow chart showing method steps for a method for detecting and measuring plate cut or rail seat abrasion in environments where all or portions of crosstie plates (if applicable) and/or other components of the rail assembly are obscured by debris such as ballast stones.

Methods and embodiments described herein advantageously allow for the detection and measurement of plate cut and rail seat abrasion in environments where all or portions of crosstie plates and other components of the rail assembly are obscured by debris such as ballast stones. One embodiment as shown in FIG. 27 and includes the steps of 400 interrogating a railway track using at least one sensor which forms part of a track assessment system housed on a rail vehicle; 402 receiving data of the railway track based on the interrogation of the railway track using the at least one sensor; 404 determining an elevation of a rail head of the railway track based on the received data; 406 determining an elevation of a top surface of a cross crosstie of the railway track based on the received data; 408 estimating a height of a rail of the railway track and a height of an underlying rail support to obtain a total rail height; 410 determining a crosstie surface wear value based on the elevation of the rail head, the elevation of the top surface of the crosstie, and the estimated total rail height. The method may further include the step of 412 determining a geographic location of one or more railway track features corresponding to the data captured on the at least one sensor, wherein the estimated rail height is based on the geographic location of the one or more railway track features. Step 412 may further comprise the step of 414 determining an estimated rail height by using the processor to access a database which includes data which correlates specific geographic track locations to the identities of the specific types of rails placed at those geographic track locations. For wooden crossties which are situated adjacent to crosstie plates, an additional step can include 416 estimating a thickness of the tie plate based on received data at a plurality of locations along a length of track, wherein the estimated tie plate thickness is based on a maximum distance from the top surface of the rail head to the top surface of the rail crosstie along the length of track.

Figure 28:
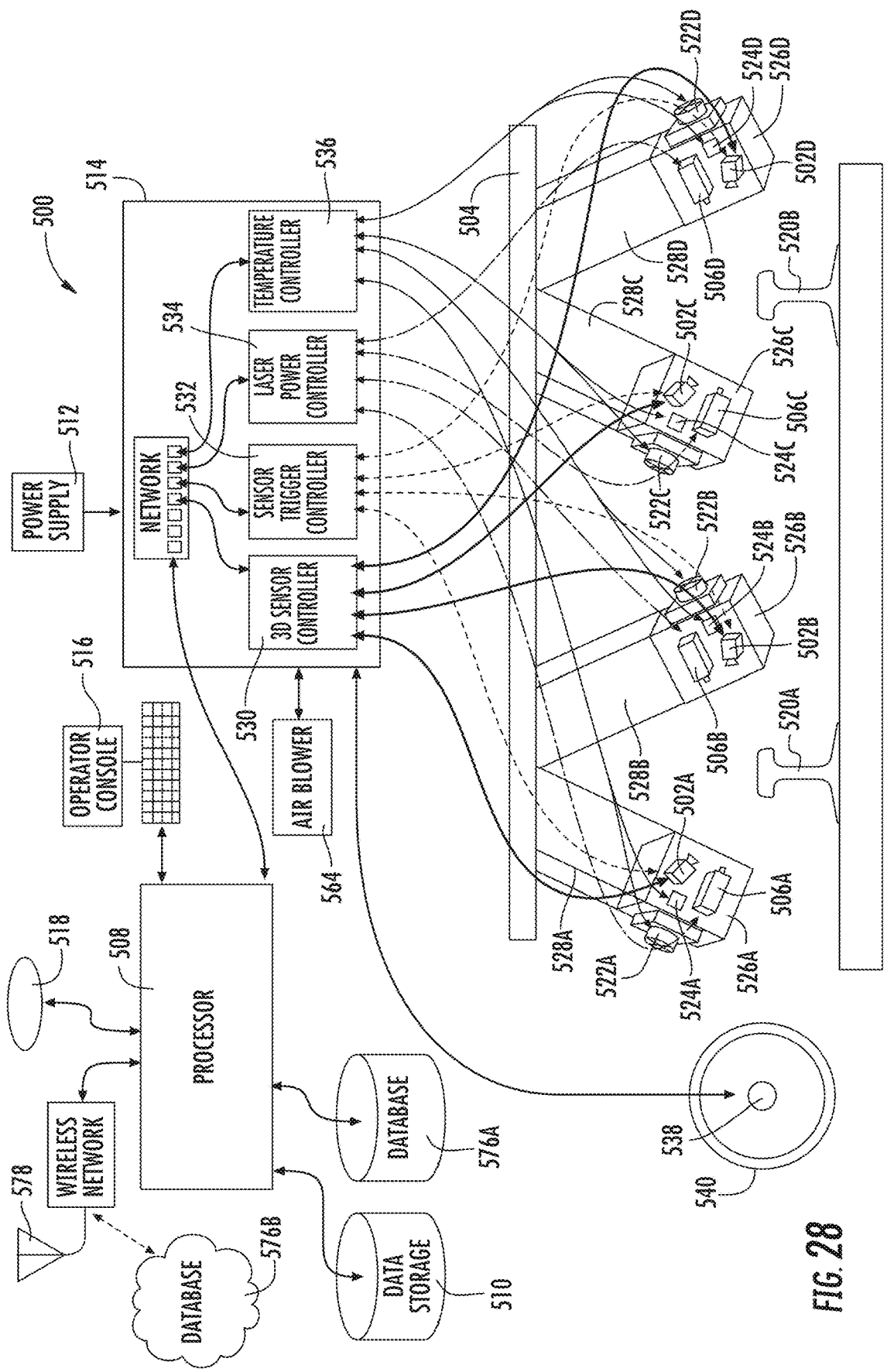
FIG. 28 shows a schematic diagram of a track assessment system and many of its important operating components including sensors oriented at an oblique angle which are capable of gathering data from the rail webs and other parts of the sides of rails.

In certain embodiments a 3D track assessment system 500 can be used as shown schematically in FIG. 28 which includes a plurality of 3D sensors 502 wherein the system 500 and sensors 502 are attached adjacent to a rail vehicle 504 configured to move along a railway track. The sensors 502 are oriented downward from the rail vehicle 504 at an oblique angle looking at a rail from the side as shown in FIG. 28. Suitable sensors may include commercially available 3D sensors and cameras, such as Ranger cameras manufactured by SICK AG based in Waldkirch, Germany. The 3D track assessment system 500 further includes a plurality of structured light generators 506 (similar or identical to light emitters 208). The 3D track assessment system uses a combination of sensors 502, structured light generators 506, a specially configured processor 508, a data storage device 510, a power supply 512, a system controller 514, an operator interface 516, and a Global Navigation Satellite System (GNSS) receiver 518. Although single components are listed, it is understood that more than one of each component may be implemented in the 3D track assessment system 500 including, for example, more than one processor 508 and more than one controller 514. These and other system components help provide a way to gather high resolution profiles of the sides of rails including the heads, the bases and the rail webs of rails 520 (including a first rail 520A and a second rail 520B) on a railway track. The 3D sensors 502 are preferably configured to collect four high resolution substantially vertical profiles at programmable fixed intervals as the system 500 moves along a railway track. The current implementation can collect 3D profiles (or scanlines) every 1.5 millimeters (mm) while the rail vehicle is moving along a railway track at speeds up to 70 miles per hour. The system autonomously monitors sensor 502 operation, controls and configures each sensor 502 independently, and specifies output data storage parameters (directory location, filename, etc.). The system 500 further provides rail web manufacturer mark inventory capabilities, and various rail features inventory, exception identification and reporting capabilities. Typical exceptions include rail head and joint bar defects or dimensional anomalies. When identified, these exceptions can be transmitted based on specific thresholds using exception prioritization and reporting rules.

Figure 29:
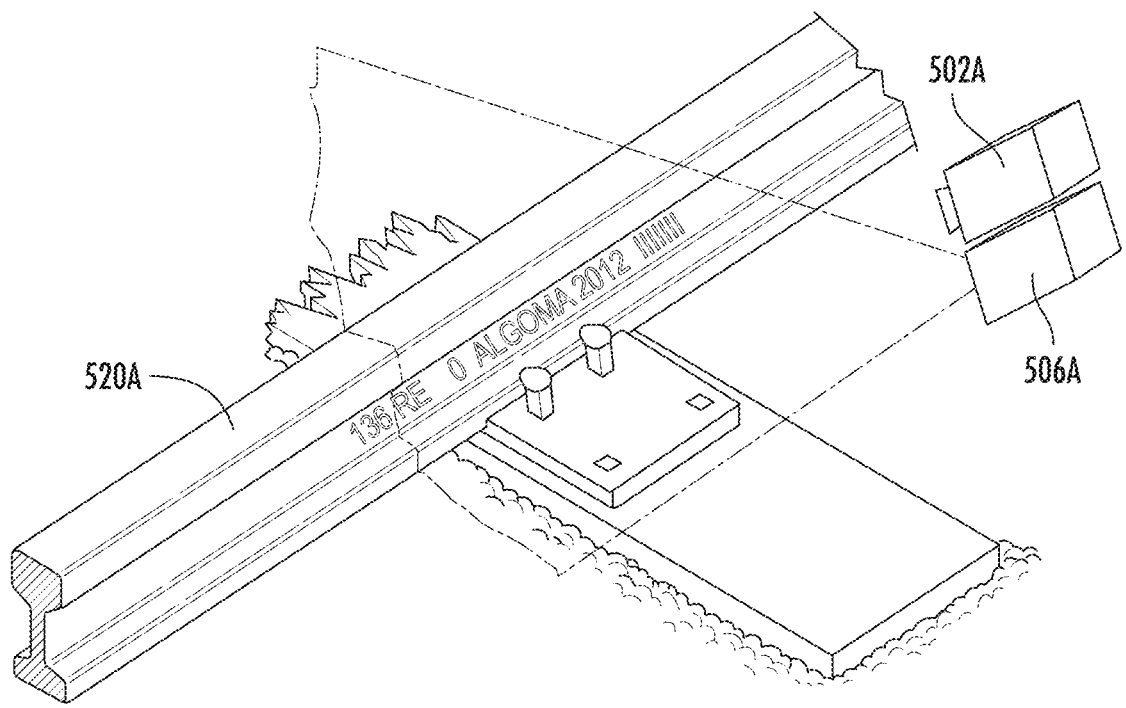
FIG. 29 shows a schematic of a 3D sensor and light emitter oriented at an oblique angle, gathering data from the side of a rail.
Figure 30:
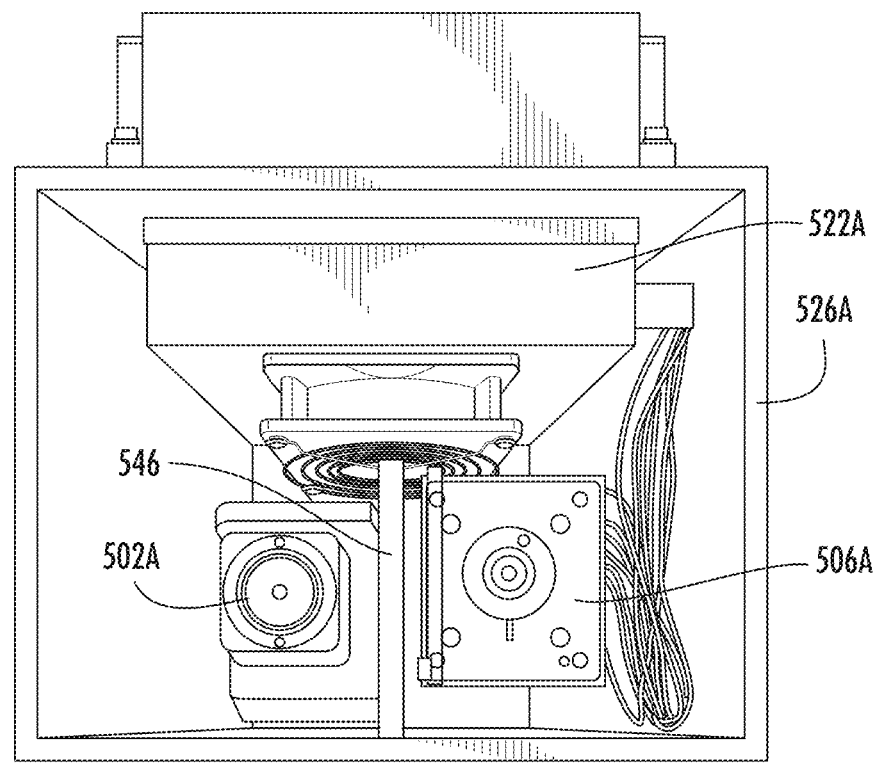
FIG. 30 shows a sensor enclosure including a sensor and a light emitter attached adjacent to an internal frame inside the sensor enclosure as well as a heating and cooling device for maintaining the operating temperature inside the sensor enclosure to within specific temperature limits.

In a preferred embodiment, the 3D track assessment system 500 includes a first sensor 502A, a first structured light generator 506A, a first heating and cooling device 522A (e.g., solid state or piezo electric), and a first thermal sensor 524A all substantially sealed in a first enclosure 526A forming part of a first sensor pod 528A; a second sensor 502B, a second structured light generator 506B, a second heating and cooling device 522B, and a second thermal sensor 524B all substantially sealed in a second enclosure 526B forming part of a second sensor pod 528B; a third sensor 502C, a third structured light generator 506C, a third heating and cooling device 522C, and a third thermal sensor 524C all substantially sealed in a third enclosure 526C forming part of a third sensor pod 528C; and a fourth sensor 502D, a fourth structured light generator 506D, a fourth heating and cooling device 522D, and a fourth thermal sensor 524D all substantially sealed in a fourth enclosure 526D forming part of a fourth sensor pod 528D. FIG. 29 shows an image of the first sensor 502A and the first light generator 506A (without the first enclosure 526A for illustrative purposes) oriented at an oblique angle to the plane of the railway track bed surface allowing a view of the side of the first rail 520A. FIG. 30 shows the first sensor 502A, the first light generator 506A, and the first heating and cooling device 522A inside the first enclosure 526A.

The controller 514 further includes a 3D sensor controller 530 in communication with the 3D sensors 502, a sensor trigger controller 532 in communication with the 3D sensors 502, a structured light power controller 534 in communication with the structured light generators 506, and a temperature controller 536 in communication with the heating and cooling devices 522 and the thermal sensors 524. The system controller 514 further includes a network interface 538 in communication with the processor 508 and the 3D sensor controller 530, sensor trigger controller 532, structured light power controller 534, and the temperature controller 536. The triggering for the 3D sensors 502 is generated by converting pulses from an encoder 538 (e.g., a quadrature wheel encoder attached adjacent to a wheel 540 on the survey rail vehicle 504 wherein the encoder 538 is capable of generating 12,500 pulses per revolution, with a corresponding direction signal) using the dedicated sensor trigger controller 532, a component of the dedicated system controller 514, which allows converting the very high resolution wheel encoder pulses to a desired profile measurement interval programmatically. For example, the wheel 540 could produce encoder pulses every 0.25 mm of travel and the sensor trigger controller 532 would reduce the sensor trigger pulse to one every 1.5 mm and generate a signal corresponding to the forward survey direction, or a different signal for a reverse survey direction.

The configuration of the four 3D sensors 502 and light generators 506 ensure that the complete rail profile is captured by combining the trigger synchronized left and right 3D sensor profiles of both rails 520 on a railway track simultaneously to produce a single combined scan for each rail. These scans can be referenced to geo-spatial coordinates using the processor 508 by synchronizing the wheel encoder 538 pulses to GNSS receiver positions acquired from the GNSS satellite network (e.g., GPS). This combined rail profile and position reference information can then be saved in the data storage device 510.

The 3D sensors 502 and structured light generators 506 are housed in the substantially sealed water tight enclosures 526. Because of the heating and cooling devices 522, thermal sensors 524, and the dedicated temperature controller 536, the inside of the enclosures 526 can be heated when the ambient temperature is below a low temperature threshold and cooled when the ambient air temperature is above a high temperature threshold. The thermal sensors 524 provide feedback to the temperature controller 536 so that the temperature controller can activate the heating function or the cooling function of the heating and cooling devices on an as-needed basis. These sealed and climate-controlled enclosures 526 ensure the correct operation and extend the operational life of the sensitive sensors 502 and light generators 506 by maintaining a clean and dry environment within acceptable ambient temperature limits. The temperature control function is part of the system controller 514 with a dedicated heating and cooling device interface inside each enclosure.

Figure 31:
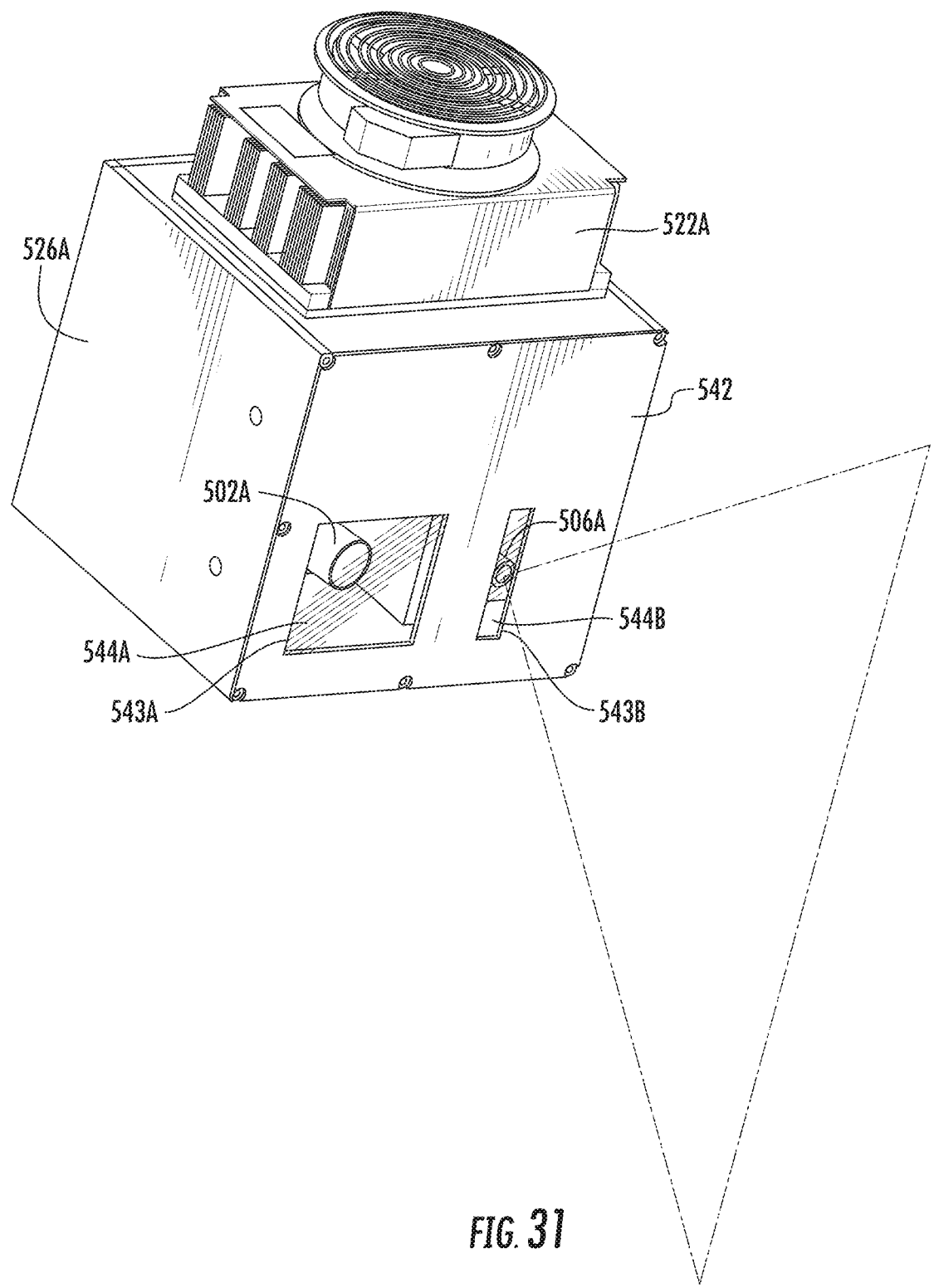
FIG. 31 shows the sensor enclosure of FIG. 30 including a cover plate covering the sensor and the light emitter and enclosing the sensor enclosure.

FIG. 31 shows the first enclosure 526A including a cover plate 542 forming one side of the first enclosure 526A. The cover plate 542 includes a first cover plate aperture 543A through which the first sensor 502A views outside of the first enclosure 526A and a second cover plate aperture 543B through which the light generator casts light outside of the first enclosure 526A. The first cover plate aperture 544A is covered by a first glass panel 544A and the second cover plate aperture 544B is covered by a second glass panel 544B. The glass panels 544 are preferably impact resistant and have optical transmission characteristics that are compatible with the wavelengths of the light generators 506. This helps avoid broken aperture glass and unnecessary heat buildup inside the enclosures 526 from light reflected back into the enclosures 526 during operation. The first sensor 502A and the first light generator 506A are preferably mounted to an internal frame 545 preferably using bolts. The frame 545 is shown in FIGS. 32A-32C and such frame is preferably bolted to the inside of the first enclosure 526A. The frame 545 includes a frame base 546 (shown by itself in FIG. 32D), a laser alignment panel 547 to which the first structured light generator 506A is attached, and a sensor alignment panel 548 to which the first 3D sensor 502A is attached. Each additional enclosure (526B, 526C, and 526D) includes a cover plate (like the cover plate 542) with apertures (like the apertures 544) as well as a frame (like the frame 545) for attaching and optically aligning sensors and light generators together inside the enclosures.

Figure 33:
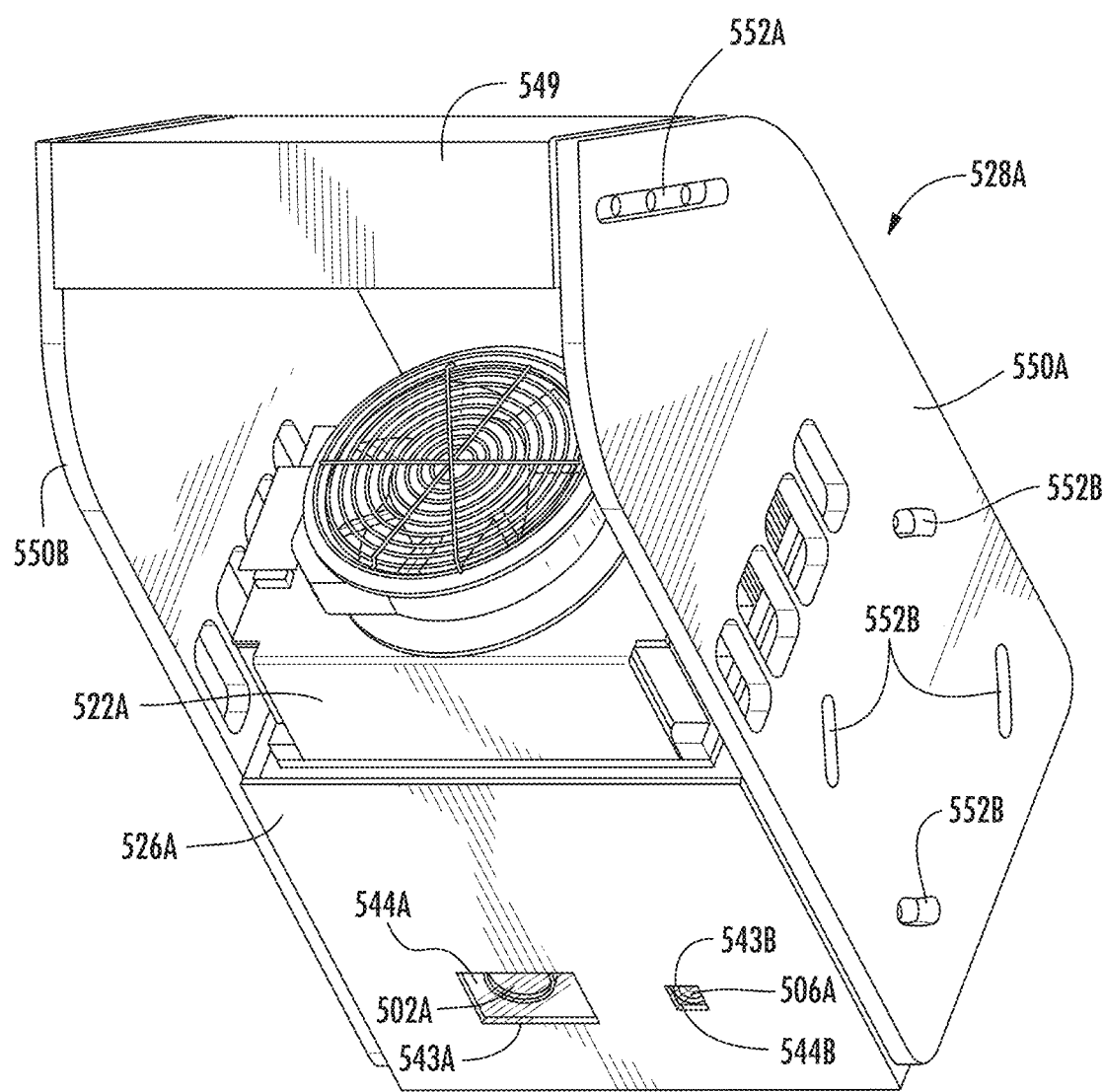
FIG. 33 shows a sensor pod including the sensor enclosure confined therein.

FIG. 33 shows the first sensor pod 528A including the first enclosure 526A. The first sensor pod 528 includes a sill mount 549 and side brackets 550 (including a first side bracket 550A shown in FIG. 34A and a second side bracket 550B shown in FIG. 34B). The sill mount 549 is shown by itself in FIG. 35. The sill mount 549 is preferably attached adjacent to the undercarriage of the rail vehicle 504 by mechanical fastening using bolts or welding the sill mount 549 directly to the rail vehicle undercarriage. The first side bracket 550A is attached adjacent to the sill mount 549 preferably by bolts through a first side bracket first aperture 552A, and the second side bracket 550B is attached adjacent to the sill mount 549 preferably by bolts through a second side bracket first aperture 554A. The first enclosure 526A is attached adjacent to the side brackets 550 preferably using bolts through first side bracket second apertures 552B and second side bracket second apertures 554B extending into tapped holes on the sensor enclosure. As an example, the first side bracket second apertures 552B are elongated so that the first enclosure 526A can be rotated plus or minus up to about 5° relative to the side brackets 550 before being bolted, screwed or otherwise attached tightly adjacent to the side brackets 550. The flexibility to slightly rotate the first enclosure 526A inside the first pod 528A is helpful to compensate for mounting height variations which can occur from rail vehicle to rail vehicle since not all vehicles are the same height. FIG. 36 shows the first sensor pod 528A and the second sensor pod 528B attached adjacent to the undercarriage of the rail vehicle 504 in a configuration that allows for data to be gathered from both sides of the first rail 520A using a combination of the first sensor 502A and the second sensor 502B. In FIG. 36, the first side bracket 550A is removed to show the first enclosure 526A. The orientation of the sensor pods 528 is at an angle α relative to the undercarriage of the rail vehicle 504. Angle α preferably ranges from about 10° to about 60°, more preferably from about 25° to about 55°, and most preferably from about 40° to about 50°. The value for α in FIG. 36 is about 45°. The lowest point of the first sensor pod is preferably at least 75 mm above the rail being scanned by the first sensor 502A. The first sensor 502A is oriented at an oblique angle β relative to the railway track bed surface 555 wherein angle β preferably ranges from about 30° to about 60° and more preferably from about 40° to about 50°.

Figure 37A:
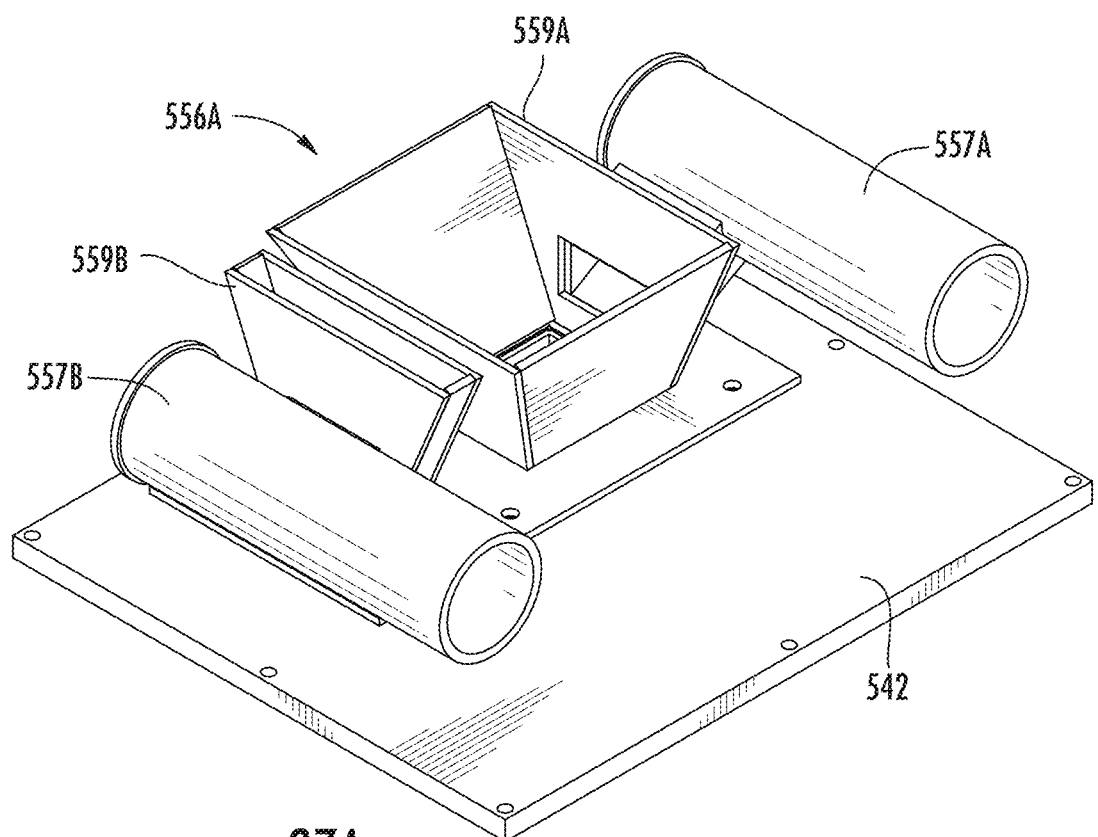
FIG. 37A shows a perspective view of an air distribution lid for covering the cover plate from FIG. 31 and providing air flow to such cover plate to remove debris from cover plate glass panels through which the sensor has a field of view and through which the light emitter emits light.
Figure 37B:
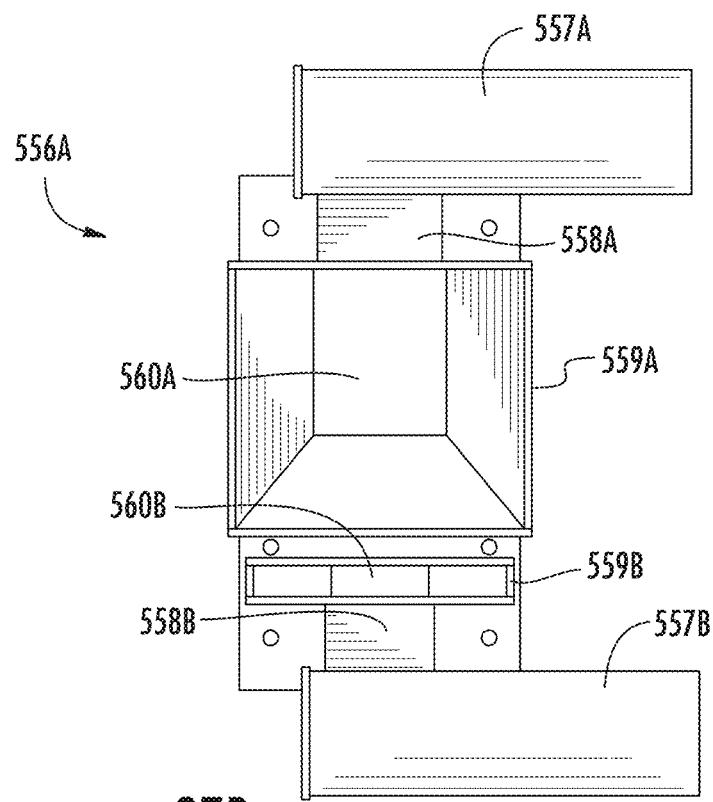
FIG. 37B shows a plan view of the air distribution lid from FIG. 37A.
Figure 37C:
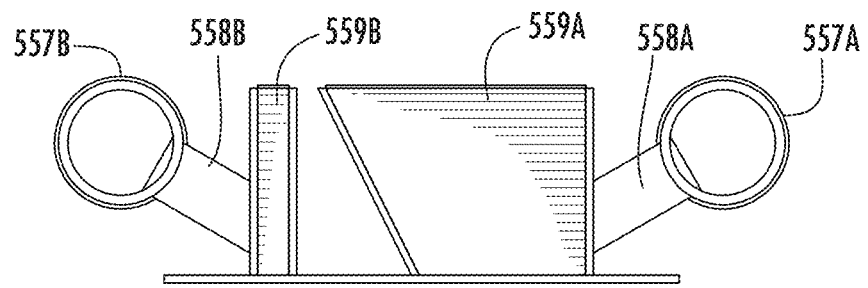
FIG. 37C shows an end view of the air distribution lid shown in FIGS. 37A-37B.
Figure 37D:
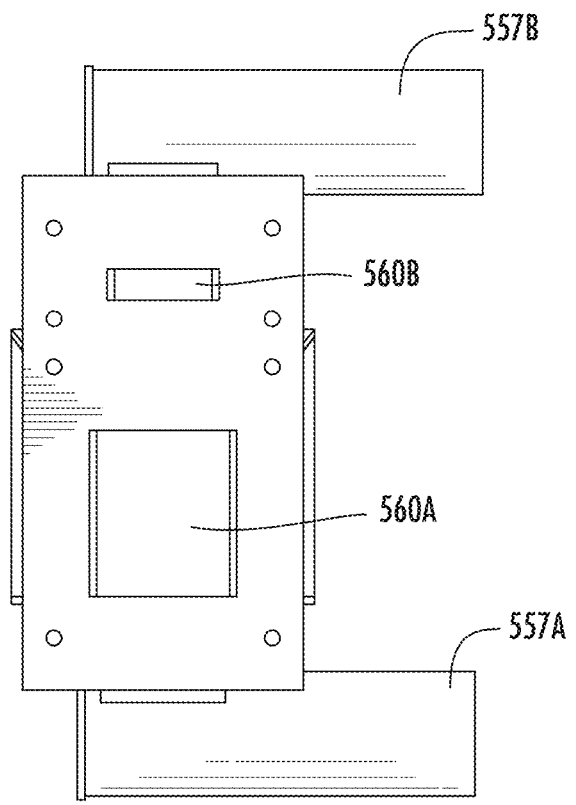
FIG. 37D shows a bottom view of the air distribution lid shown in FIGS. 37A-37C.
Figure 38:
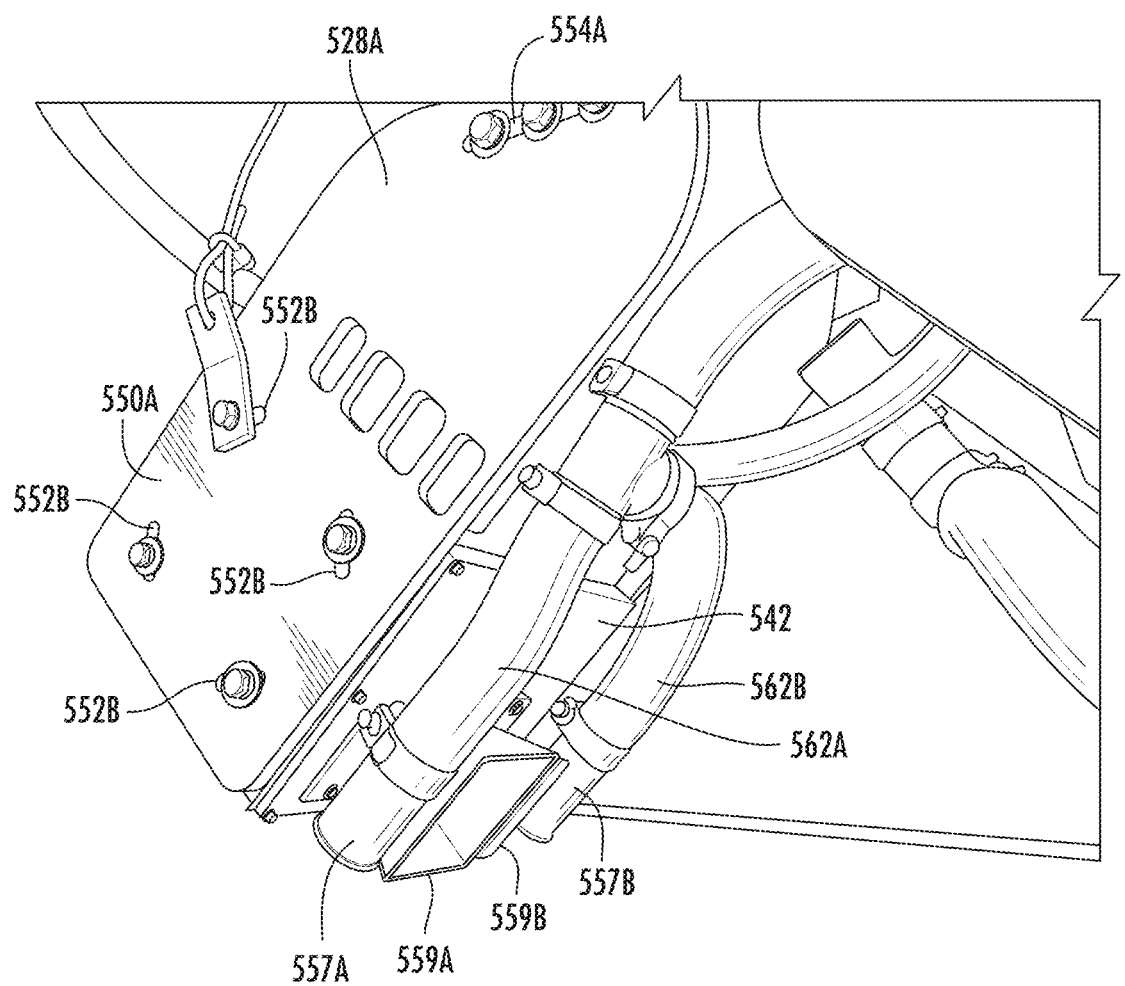
FIG. 38 shows a sensor pod including the air distribution lid from FIGS. 37A-37D attached adjacent to the cover plate of the sensor enclosure from FIG. 31 wherein ducts are attached adjacent to the air distribution lid.
Figure 39:
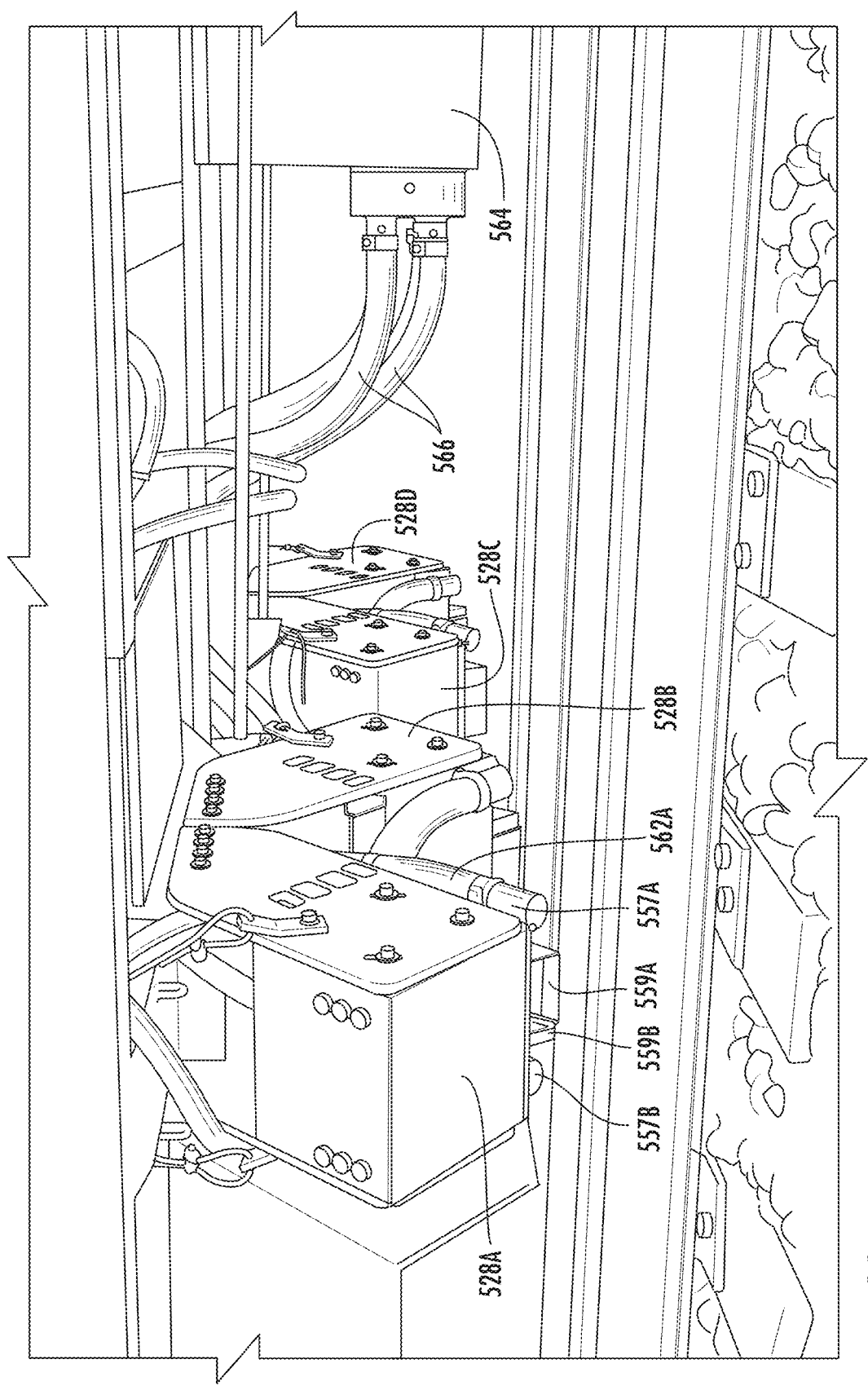
FIG. 39 shows an array of four sensor pods, each pod including an air distribution lid, wherein each air distribution lid is receiving air flow through a plurality of ducts originating from an air blower.
Figure 40:
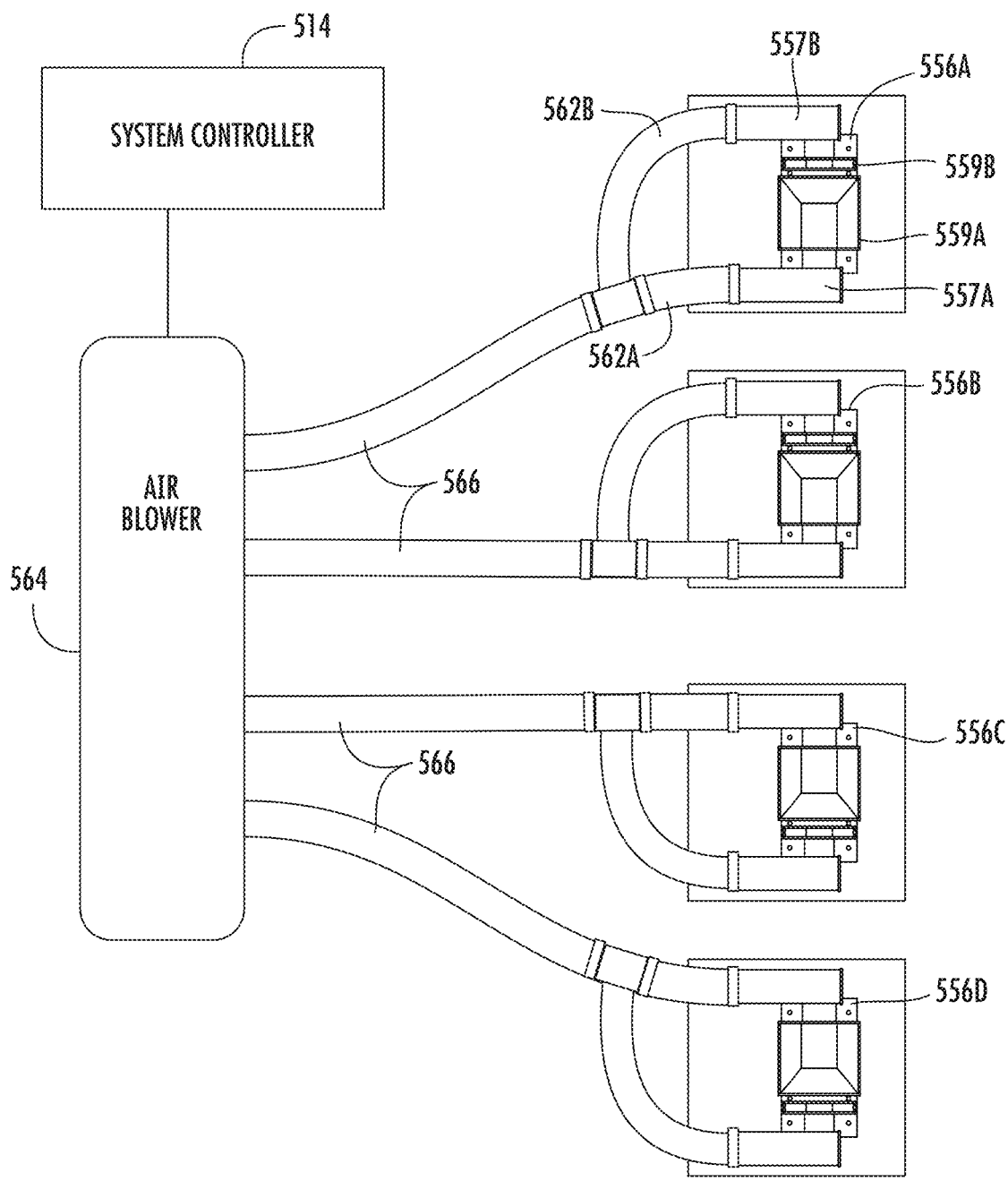
FIG. 40 shows a schematic of the air blower from FIG. 39 and the plurality of ducts leading to the various air distribution lids.

FIG. 37A shows the cover plate 542 with a first air distribution lid 556A attached adjacent to the cover plate 542 preferably by bolts or screws. FIGS. 37B-37D show different views of the first air distribution lid 556A by itself. The first air distribution lid 556A includes a first duct mount 557A which directs air through a first enclosed channel 558A to a first walled enclosure 559A at an area proximate to a first air distribution lid first aperture 560A which overlaps the first cover plate aperture 544A. The first air distribution lid 556A includes a second duct mount 557B which directs air through a second enclosed channel 558B to a second walled enclosure 559B at an area proximate to a second air distribution lid second aperture 560B which overlaps the second cover plate aperture 544B. FIG. 38 shows a perspective view of the first sensor pod 528A including the cover plate 542 and the first air distribution lid 556A. A first air duct 562A is engaged with the first duct mount 557A to supply air to the first walled enclosure 559A. A second air duct 562B is engaged with the second duct mount 557B to supply air to the second walled enclosure 559B. FIG. 39 shows a full array of the sensor pods 528 and shows an air blower 564 supplying air through a plurality of ducts 566. FIG. 40 shows schematically how air is supplied from the air blower 564 to the first air distribution lid 556A, a second air distribution lid 556B, a third air distribution lid 556C, and a fourth air distribution lid 556D. The air blower 564 is in communication with the system controller 514 so that when the 3D sensors 502 are activated, the system controller 514 causes the air blower 564 to be activated also. The air flowing through the plurality of ducts 566 to the air distribution lids 556 is used to clear debris from the area proximate to the enclosure cover plate apertures through which the sensors 502 view rails and through which the light generators 506 shine light. As the rail vehicle 504 moves along a railway track, debris that would otherwise cover the view of the sensors 502 or block the light of the light generators 506 is dislodged by the air flow through the air distribution lids 556.

Sensor pod 528 structural components such as the sides of the enclosures 526, internal frames 546, the sill mount 549, the side brackets 550, and the air distribution lids 556 are preferably made of impact resistant and non-corrosive materials including, for example, aluminum or stainless steels. Although metal is preferred, other materials could be used instead of metal including, for example, polycarbonate or ABS plastics. The power supply 512 can be different types of power sources such as, for example, electricity from the rail vehicle 504 originating from a liquid fuel to propel the rail vehicle 504 and being output as electricity, a generator burning a fuel and outputting electricity, solar panels and outputting electricity or a battery source. Power is preferably fed to the system controller 514 and from there is fed to other components of the system 500 in communication with or otherwise electrically tied to the system controller 514. For example, power is fed from the system controller 514 to the processor 508, components in communication with the processor 508, and the sensor pods 528 (including all electrical hardware in the sensor pods 528). The operator interface 516 can come in the form of different devices including, for example, an onboard computer with a monitor and input device (e.g., a keyboard), a computing tablet, a computing cellular device, or other similar device known to a person having ordinary skill in the art.

Each 3D sensor profile gathered from operating the 3D sensors is analyzed by the system controller 514 and the light intensity from the light generators 506 is adjusted to optimize the exposure levels. Low intensity profile scans result in an increase of structured light generator power and over exposed profile scans reduces the structured light generator drive power level. The laser power controller 534 also monitors structured light source temperature and current and is able to shutdown each individual light source in the event that safe operating limits are exceeded.

Figure 41:
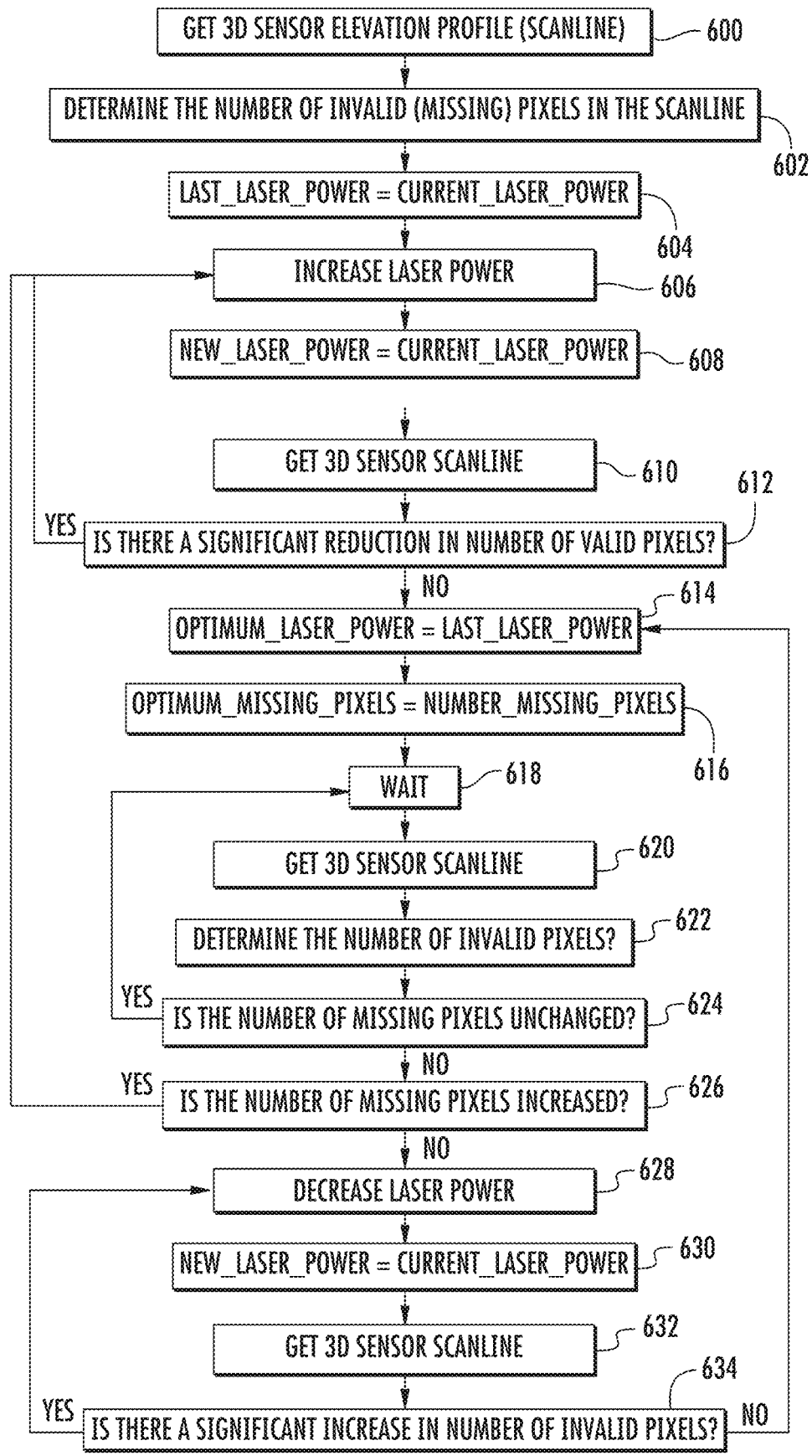
FIG. 41 is a flowchart showing an algorithm used by a laser power controller to control the power to the light emitter and thereby control the intensity of the light emitted from the light emitter.

Computer executable instructions stored on a computer readable storage medium in communication with the system controller 514 are used to run an algorithm to control the amount of power supplied to the structured light generators 506. The structured light generators 506 are preferably laser line generators and are referred to below as "lasers". An example of this algorithm is shown in the flowchart in FIG. 41. A first step (Step 600) includes obtaining a 3D sensor elevation profile (scanline), such profile gathered using the 3D sensors 502. A following step (Step 602) includes determining the number of invalid (missing) pixels in the scanline. At this stage, the laser power from a previous power control round of steps is set as the current laser power level (Step 604). At this point, laser power is increased (Step 606). The new laser power level now is set to equal the current laser power level (Step 608). At this stage, a new 3D sensor elevation profile is obtained (Step 610). The processor 508 then determines whether there is a significant reduction in the number of invalid pixels (Step 612). If the answer is "yes", the processor 508 reverts to Step 606. If "no", the processor 508 sets optimum laser power as the most recent setting of laser power (Step 614). The number of optimum missing pixels in a scanline is set to the actual number of missing pixels (Step 616). The processor 508 then pauses (Step 618) followed by gathering a new 3D sensor scanline (Step 620). The processor 508 then determines the number of invalid pixels in the most recent scanline (Step 622). A determination is then made as to whether the number of missing pixels is unchanged from the previous calculation (Step 624). If the answer is "yes", the processor 508 goes back to Step 618. If the answer is "no", the processor 508 determines whether the number of missing pixels has increased (Step 626). If the answer is "yes", the processor 508 goes back to Step 606. If the answer is "no", laser power is decreased (Step 628) by the laser power controller 534. The new laser power is then set as the current laser power (Step 630). The next step (Step 632) includes gathering a new 3D sensor scanline. The processor 508 then determines whether there is a significant increase in the number of invalid pixels (Step 634). If the answer is "yes, the processor goes back to Step 614. If the answer is "no", the processor 508 goes back to Step 628.

On system 500 initialization, each 3D sensor 502 is configured with required operational parameters by the 3D sensor controller 530. These parameters can include; exposure times, region of interest, gain levels, and sensor processing algorithms. The 3D sensor controller 530 is programmed with the specific 3D sensor operational parameters from a configuration file for each sensor by the processor 508 to allow external changes to the sensor parameters as required.

Figure 42A:
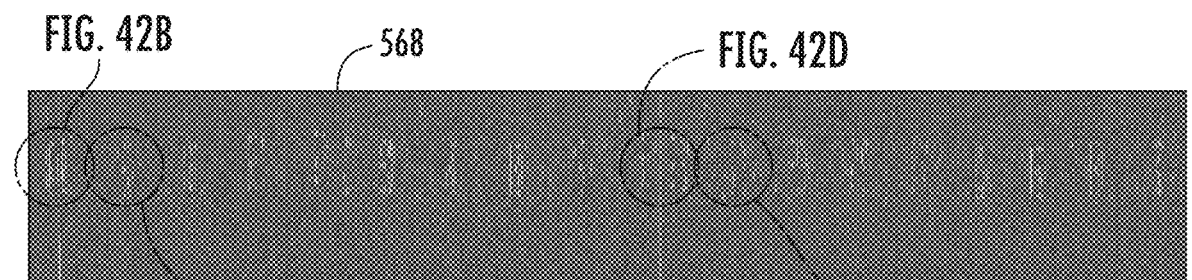
FIG. 42A shows a 3D elevation map of the side of a rail, such rail including markings in the form of alpha-numeric characters.
Figure 42B:
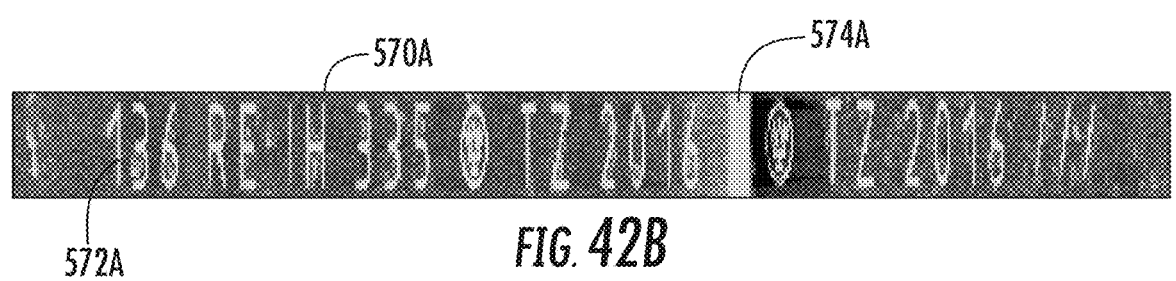
FIG. 42B shows a close-up of a first section of the 3D elevation map shown in FIG. 42A.
Figure 42C:
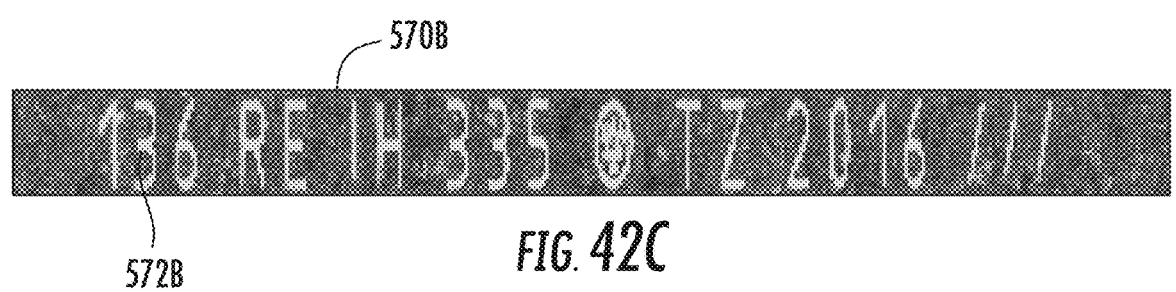
FIG. 42C shows a close-up of a second section of the 3D elevation map shown in FIG. 42A.
Figure 42D:
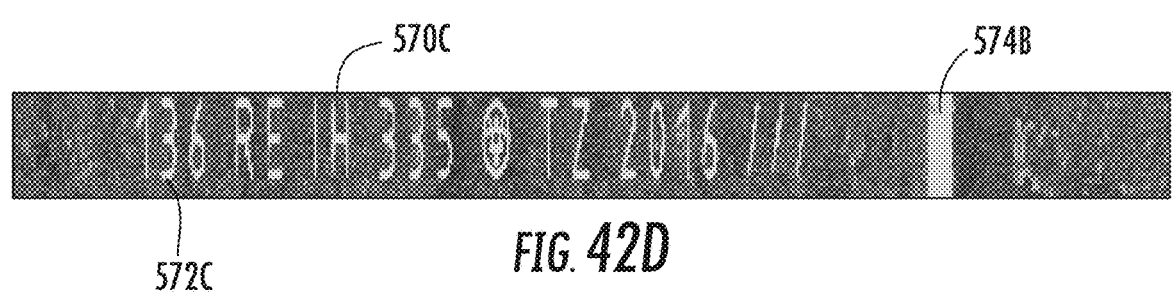
FIG. 42D shows a close-up of a third section of the 3D elevation map shown in FIG. 42A.
Figure 42E:
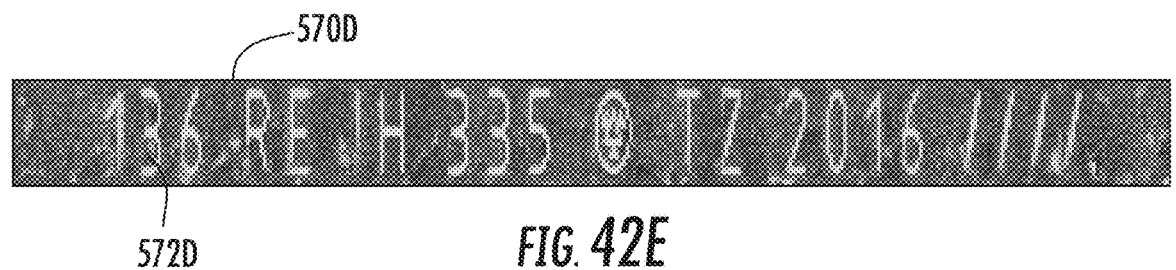
FIG. 42E shows a close-up of a fourth section of the 3D elevation map shown in FIG. 42A.

During operation of the system 500, 3D sensor scan data is streamed from the system controller 514 to the processor 508 for storage in the data storage device 510, linear referencing (wheel encoder based), geo-spatial referencing (GNSS receiver based), processing, and analysis. The processor 508 is programmed with algorithms for real-world profile coordinate correction (converting the oblique scan angle profile data to real-world coordinates), and feature detection and assessments. Features can include the recognition of rail web manufacturer markings (including both branded (raised) and stamped (recessed) marks). These marks are repeated (typically every 4 to 8 feet) on a rail web of a rail on one or both sides of the rail. These marks include the weight of rail (115, 136, 140 lb/yard rail), heat treating information, manufacturer, and year and lot/month of manufacture. Examples of 3D rail web elevation profile-based rail manufacturer marks are shown in FIGS. 42A-42E. Lighter pixels represent higher surfaces, darker pixels represent lower surfaces. FIG. 42A shows a stored image of a continuously welded rail along a section of a rail 568. The image is visually compressed. The top example in FIG. 42B (136 RE IH 335 TZ 2016) of continuously welded rail is taken from a first section in the rail 570A in FIG. 42A, such first section inside the circle labeled as FIG. 42B. This first section of rail 570A includes a first set of alpha-numeric characters 572A and a first factory weld 574A. FIG. 42C shows a second section of the rail 570B including a second set of alpha-numeric characters 572B; FIG. 42D shows a third section of the rail 570C including a third set of alpha-numeric characters 572C a second factory weld 574B; and FIG. 42E shows a fourth section of the rail 570D including a fourth set of alpha-numeric characters 572D. These rail markings are referenced and stored in local data storage device 510. Following storage, these sections of elevation map are processed with optical character recognition (OCR) methods to extract the marking information (weight/size/heat treat/manufacturer/date/lot) when cross referenced with a database 576A including a key to cross-reference such information. In some embodiments, a database 576B in the cloud is accessed for such information.

Figure 43:
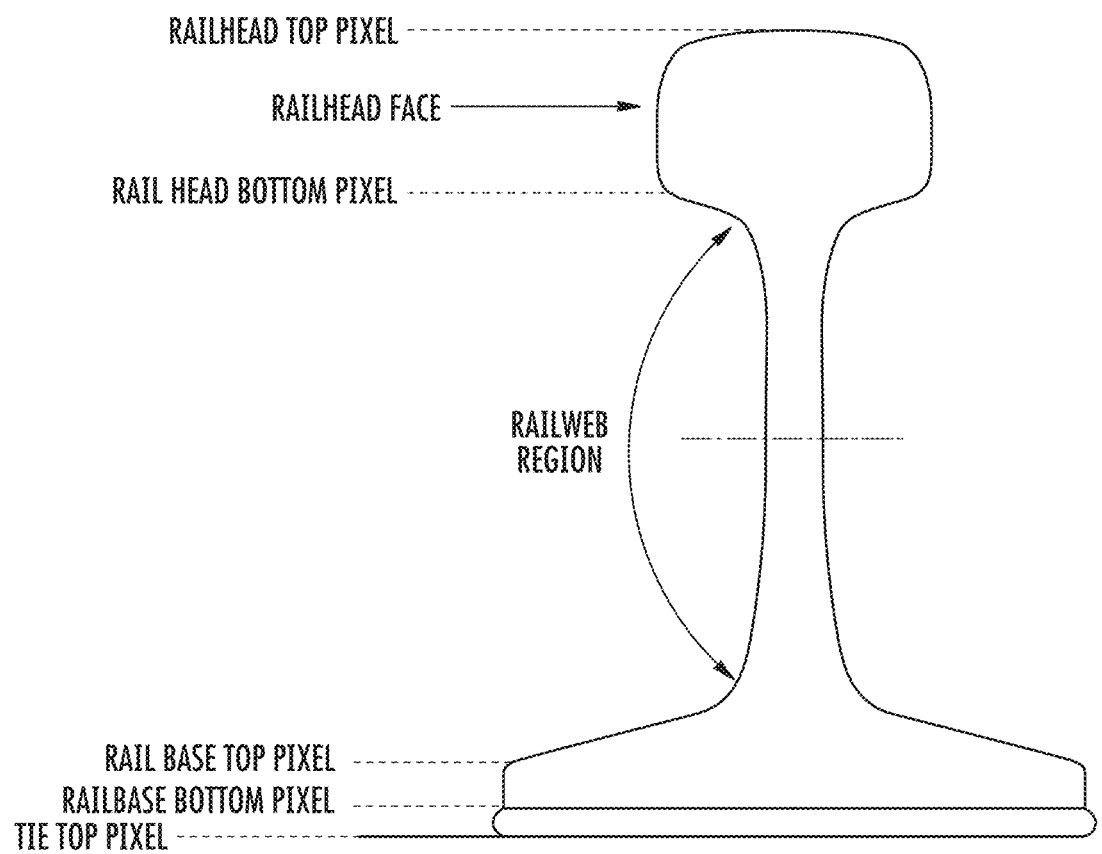
FIG. 43 shows a cross section of a rail situated over a pad wherein specific components of the rail are identified and wherein such information can be stored as a template from which a processor of a track assessment system can compare 3D profiles gathered during the scanning of a rail web and thereby define specific pixel locations on a 3D profile as specific rail components or the relative height of such components.
Figure 44:
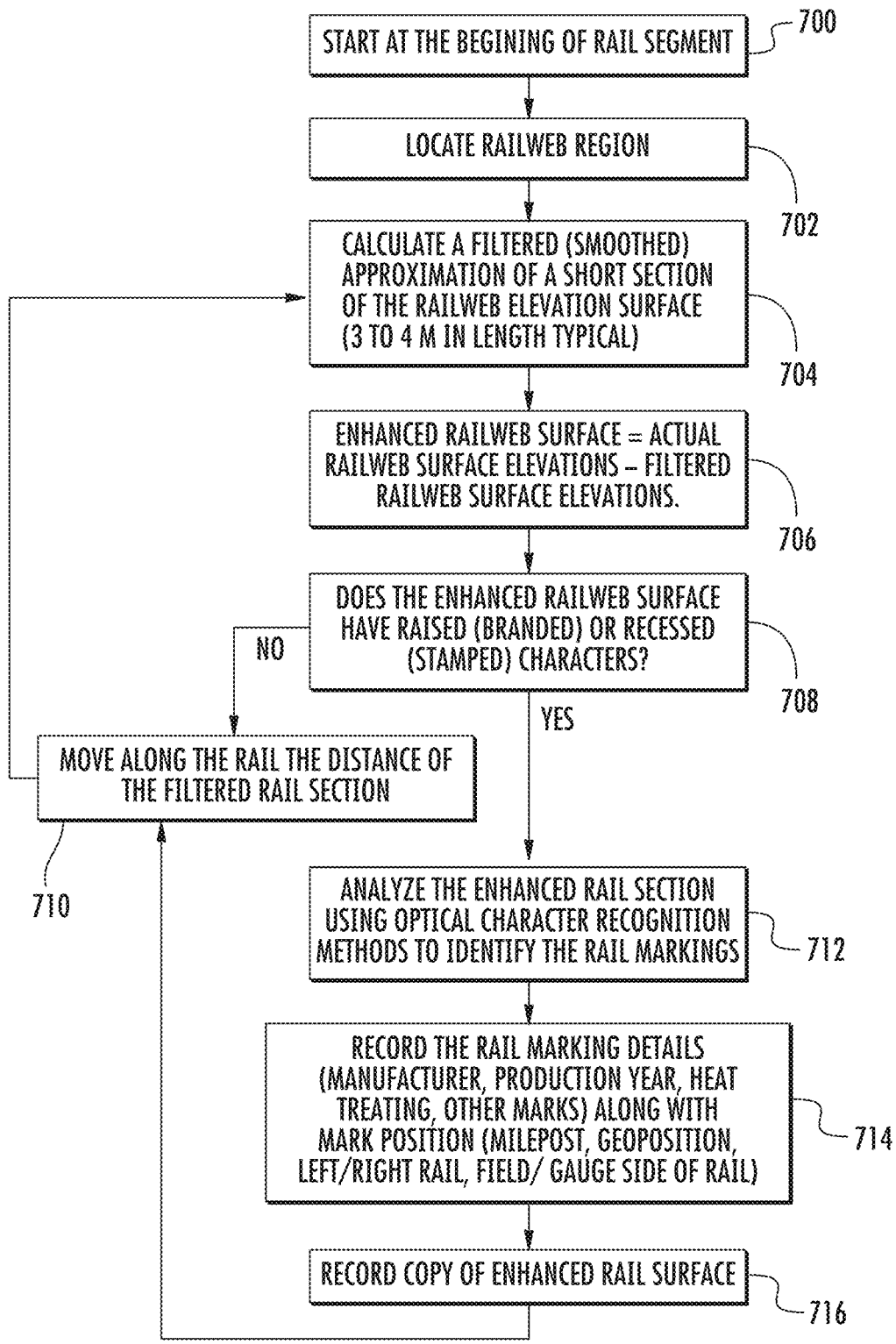
FIG. 44 shows a flowchart showing an algorithm used by a system controller to detect and analyze alpha-numeric characters on rail web markings based on input from a 3D sensor.

FIG. 43 shows an image of a rail and specific points on the example rail are labeled for reference to algorithms discussed below. When the system detects and pinpoints various features of a rail, such features are tied to one or more pixels an image gathered by the system 500. A flowchart showing an algorithm for analyzing rail web manufacturer markings is shown in FIG. 44. Computer executable instructions stored on a computer readable storage medium in communication with the processor 508 are used to run this algorithm. A first step includes identifying and starting the analysis at the beginning of a particular gathered image of a rail segment (Step 700). The processor 508 then locates a particular rail region corresponding to the rail web surface by identifying the nominally flat section of the rail base situated between the bottom of the rail head and top of the rail base (Step 702). This identification is accomplished by defining a region of interest bounded between the bottom of the rail head and the top of the rail base (features located using known horizontal edge detection machine vision methods). The processor 508 then calculates a filtered (smoothed) approximation of a short section of the rail web elevation surface (typically 3 to 4 meters in length) (Step 704) by applying a suitable 2D low pass digital FIR filter such as a Butterworth of order 3. An "Enhanced Rail Web Surface" is defined and calculated as the actual rail web surface elevations minus the filtered rail web surface elevations (Step 706). The processor 508 then determines whether the Enhanced Rail Web Surface has raised (branded) or recessed (stamped) characters (Step 708) using optical character recognition technology known in the art. If "no", the processor 508 instructs the system 500 to continue moving along the railway track the distance of the filtered rail section (Step 710) and then reverts to Step 704. If "yes", the processor 508 analyzes the enhanced rail section using optical character recognition technology known in the art to identify rail markings. (Step 712). The rail markings details are then recorded along with markings position (Step 714). The marking details may include, for example, the identity of the manufacturer, the year the rail was produced, the heat treatment used with that particular section of rail, and other indicia including markings that might be unique to specific manufacturers. The recorded position data of Step 714 may include recording milepost markings, wheel encoder counts, geo-position data, identification of whether it is the right or left rail, and identification of whether it is the field or gauge side of the rail. The system controller 514 then records a copy of the Enhanced Rail Surface for that section of rail to the data storage device 510 (Step 716) and then the system controller reverts to Step 710.

After the alphanumeric markings are processed and recorded, in real time or near real time, the system 500 can access the onboard database 576A or the cloud-based database 576B via a wireless transmitter/receiver 578 in communication with the processor 508. By accessing the database(s) 576, the system 500 is then informed on the specific design specifications for that specific section of rail being analyzed. Current measurements of this section of rail made by the system 500 can then be compared to design specifications for the section of rail to determine changes that have occurred to that rail section over time. The system uses various rail processing steps for this analysis and it preferably processes the data streams from all four 3D sensors simultaneously or substantially simultaneously.

Figure 45:
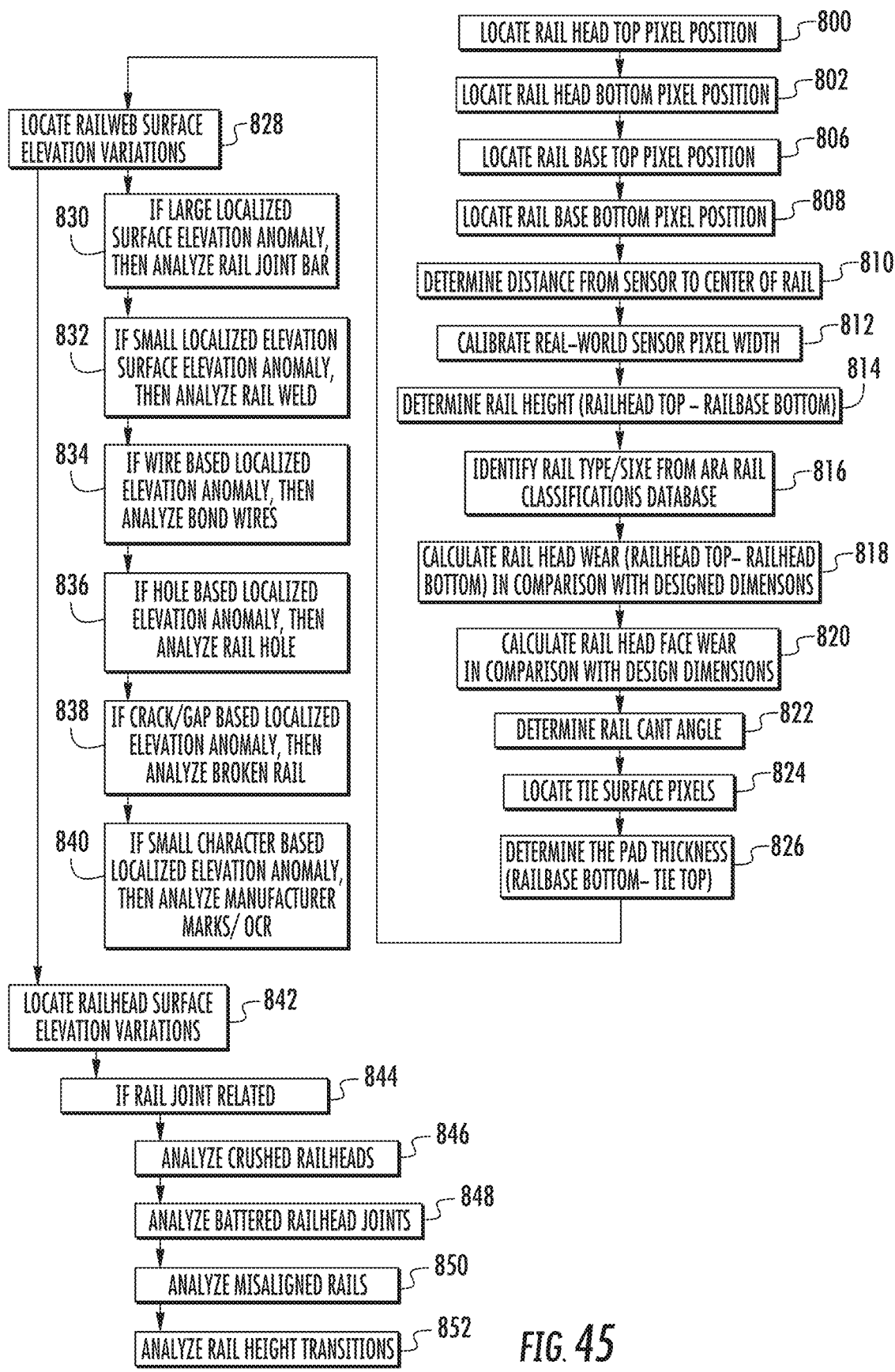
FIG. 45 shows a flowchart showing a group of algorithms which can be used independently or together to analyze rails, rail webs, and rail components found near or on rail webs based on input from a 3D sensor.

With additional reference to FIG. 43, specific algorithm steps of system 500 rail processing are shown in FIG. 45. Computer executable instructions stored on a computer readable storage medium in communication with the processor 508 are used to run this algorithm(s). A first step includes locating a pixel representing the top of the rail head in a scanline (Step 800) by detecting the pixel that is at the uppermost point (highest elevation) of the measured profile. The pixel is found and determined based on image analysis wherein the processor 508 compares the gathered scanline to a typical rail profile wherein key points of the typical rail profile are defined (similar to what is shown in FIG. 43 but defined through code in the processor 508). The processor 508 then locates a pixel representing the bottom of the rail head in the same scanline (Step 802) using known horizontal edge detection methods such as first-order profile derivatives, or Canny edge detector methods applied to the upper region of the profile and the top of the rail base (features) using similar profile derivatives, or Canny edge detector methods applied to a region of the profile in close proximity to the lower edge of the flat rail web region The processor 508 then locates a pixel representing the top of the rail base in the applicable scanline (Step 806) and then locates a pixel representing the bottom of the rail base (Step 808) by detecting the horizontal edge in proximity to the top of rail base edge. Horizontal edge detection methods are applied to the region below the upper rail base edge (lower region of the profile). The processor 508 then preferably determines the distance between the applicable sensor 502 and the center of the rail wherein the center of the rail is defined by the system as a particular pixel from gathered image data (Step 810). The processor 508 then preferably calibrates to determine the real-world width of a pixel from the scanline (Step 812). Rail height can then be determined as the rail head height minus the rail base bottom (Step 814). The rail type can then be identified (Step 816) based on techniques described in FIG. 44 and the cross-referencing with one or more databases 576 to determine the design specifications for the specific rail section being interrogated. At this point, the processor 508 can determine rail head wear by comparing (a) the measured rail head top pixel minus the rail head bottom pixel to (b) design specifications for that section of rail (Step 818). The same process can be followed to determine rail head face wear by comparing the measured rail head face position (identified based on a pixel location) to the actual rail head face position when the rail was first manufactured (Step 820). Any rail feature that can be measured using visual analysis can be compared by the system 500 to the factory design specifications for a rail being interrogated and this disclosure is not intended to be limited to rail head wear and rail face wear.

The processor 508 can also determine rail cant angle by determining the angle that the vertical centerline of the combined field and gauge rail profile (the calculated centerline of the measured rail cross-section) makes with the plane of the tie surfaces to which the rails are fastened (Step 822).

Figure 48:
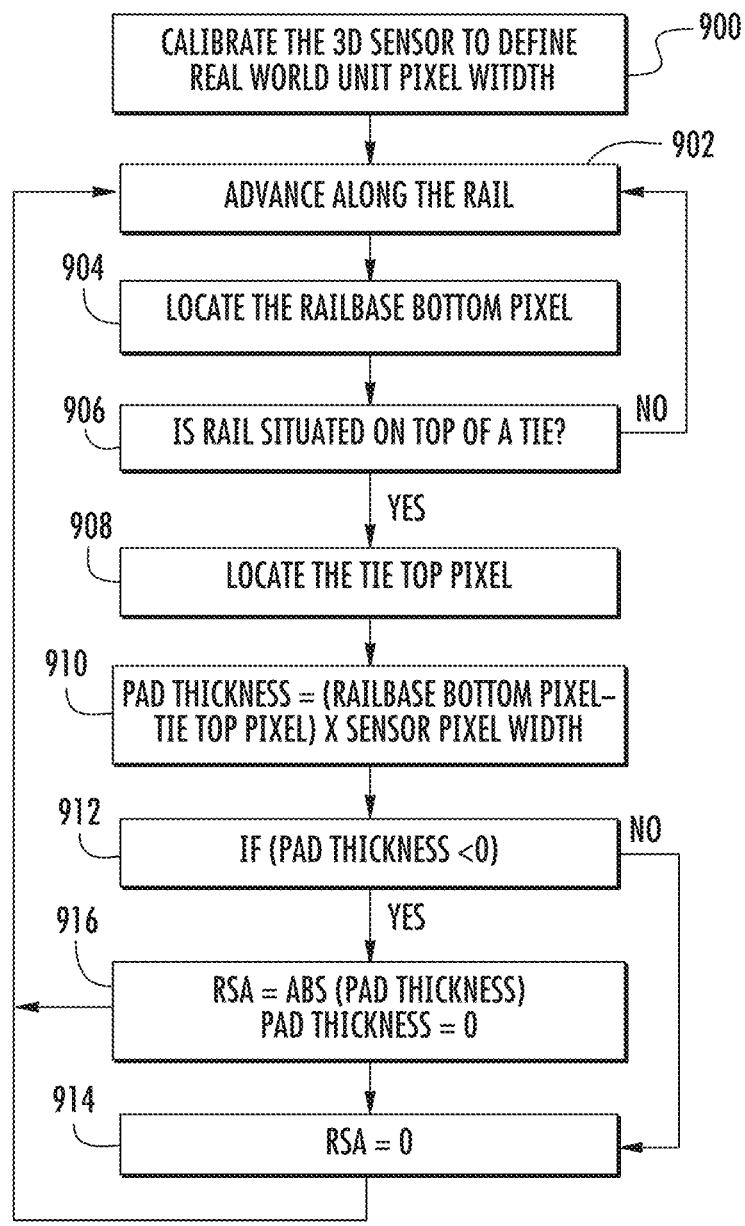
FIG. 48 shows a flowchart showing an algorithm used by a system controller to determine rail seat abrasion based on input from a 3D sensor.

The processor 508 can also locate tie surface pixels if a particular scanline includes a tie (Step 824) by identifying regions of the profile where the surface normal variation (or the profile gradient variation) is low, representing a smooth region of the correct dimension (8 to 10 inches wide typically) and placement (next to both rails. This information can be used to help determine pad thickness between a rail base and a tie under the rail base (Step 826). More details regarding these steps are discussed below and shown in FIG. 48.

Figure 46:
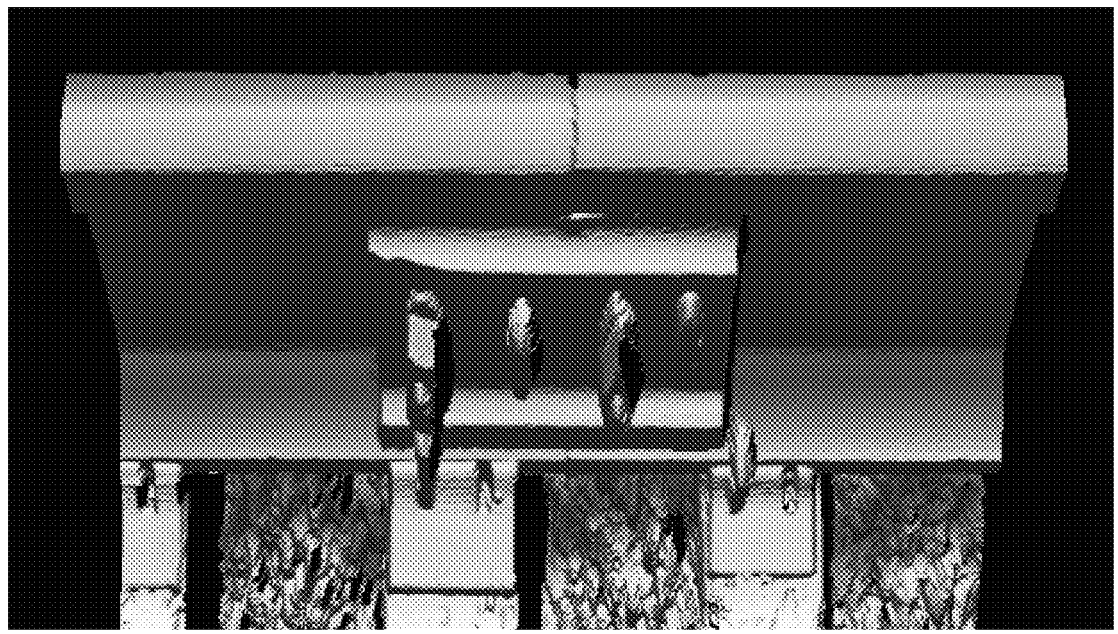
FIG. 46 shows a 3D elevation map of a joint bar taken using an embodiment of the track assessment system described here.
Figure 47:
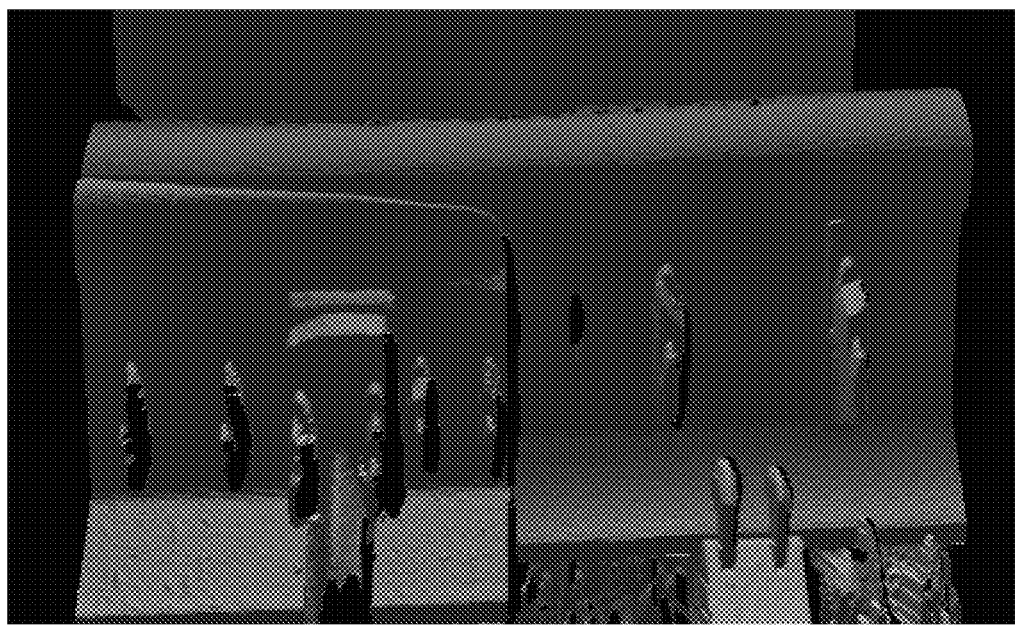
FIG. 47 shows a 3D elevation map of a rail switch point taken using an embodiment of the track assessment system described here.

The processor 508 can also determine rail web surface elevation variations (or anomalies) (Step 828) by determining the difference between the localized rail web surface profile and the extended rail web median profile (a profile derived by calculating the median profile elevation at each point of the profile over a rail length of from about 5 meters to about 6 meters). If a large localized surface elevation difference of a minimum length (anomaly) is detected, the processor 508 presumes that the anomaly represents a rail joint bar and that joint is then analyzed (Step 830). This step can further include sub-steps such as linear and geospatial referencing of the joint, taking inventory of the joint bar (including size and type), determining the joint condition (e.g., whether it is broken or has missing bolts), the width of any gap detected between the joined rail segment ends (rail joint gap) and whether the joint is compliant with any required specifications from the railroad owner. An image reproduced from the combination of multiple scanlines of a joint bar is shown in FIG. 46 and such image can be analyzed using 3D feature matching methods known in the art to locate and inventory features of interest by the processor 508. Similarly, rail switch points can be detected and analyzed using feature matching methods and machine vision algorithms, such as the image shown in FIG. 47. For rail switch points, by analyzing an image gathered and produced by the system 500, the system 500 using the processor 508 can determine whether any part of the switch has broken off, whether the top of a rail point is sitting at the correct height, and whether the point sits flush against a main rail surface. Rail fastening systems such as, for example, concrete rail clips may also be analyzed in similar fashion by the system 500 to detect any abnormalities or breakages that occur along a railway track.

If a small localized surface elevation anomaly is detected, the processor 508 will presume it is a rail weld which can be visually analyzed by the processor 508 (Step 832) and data recorded on the data storage device 510 related to this feature. If a wire based localized elevation anomaly is detected, the processor 508 presumes it is a bond wire which can be analyzed by the processor (Step 834) and data recorded on the data storage device 510 related to this feature. If a hole based localized elevation anomaly is detected, the processor 508 will presume that it represents a rail hole which can be analyzed by the processor 508 (Step 836) and data recorded to the data storage device 510 related to this feature. If a crack or gap based localized elevation anomaly is detected, the processor 508 presumes it represents a broken rail which can be analyzed by the processor 508 (Step 838) and data recorded to the data storage device 510 related to this feature. The processor 508 can also determine elevation anomalies related to manufacturer markings (Step 840) discussed above in association with FIG. 44.

The system 500 can also be used to locate railhead surface elevation variations (Step 842). If the processor 508 detects what it believes is a rail joint based on visual analysis (Step 844), the processor 508 can then visually analyze crushed railheads (Step 846), visually analyze battered railheads joints (Step 848), visually analyze misaligned rails (Step 850), and visually analyze rail height transitions (Step 852). For all of the features that are analyzed in steps 800-852, the system 500 can record and keep track of data associated with that particular location on the rail being interrogated, such information including time, linear referencing (wheel encoder based), and geo-spatial referencing (GNSS receiver based). Such information can be stored in the data storage device 510. Not all of the rail processing steps described above (800-852) have to occur together or in the specific order as listed.

Figure 49:
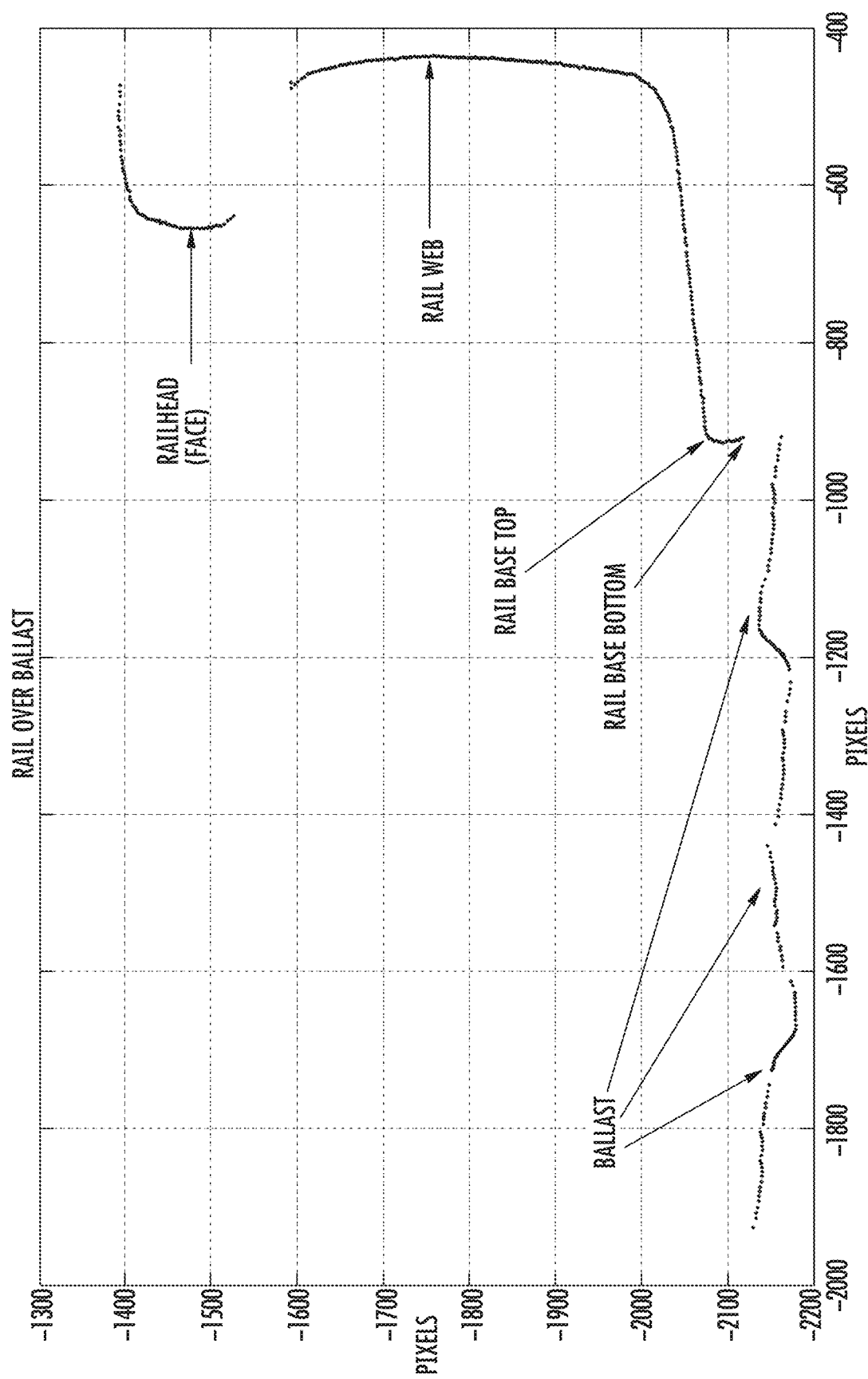
FIG. 49 shows a typical 3D profile (or scanline) of a rail next to ballast using an embodiment of the track assessment system described herein, wherein the image has been geometrically corrected from the raw data obtained at an oblique angle using a 3D sensor.
Figure 50:
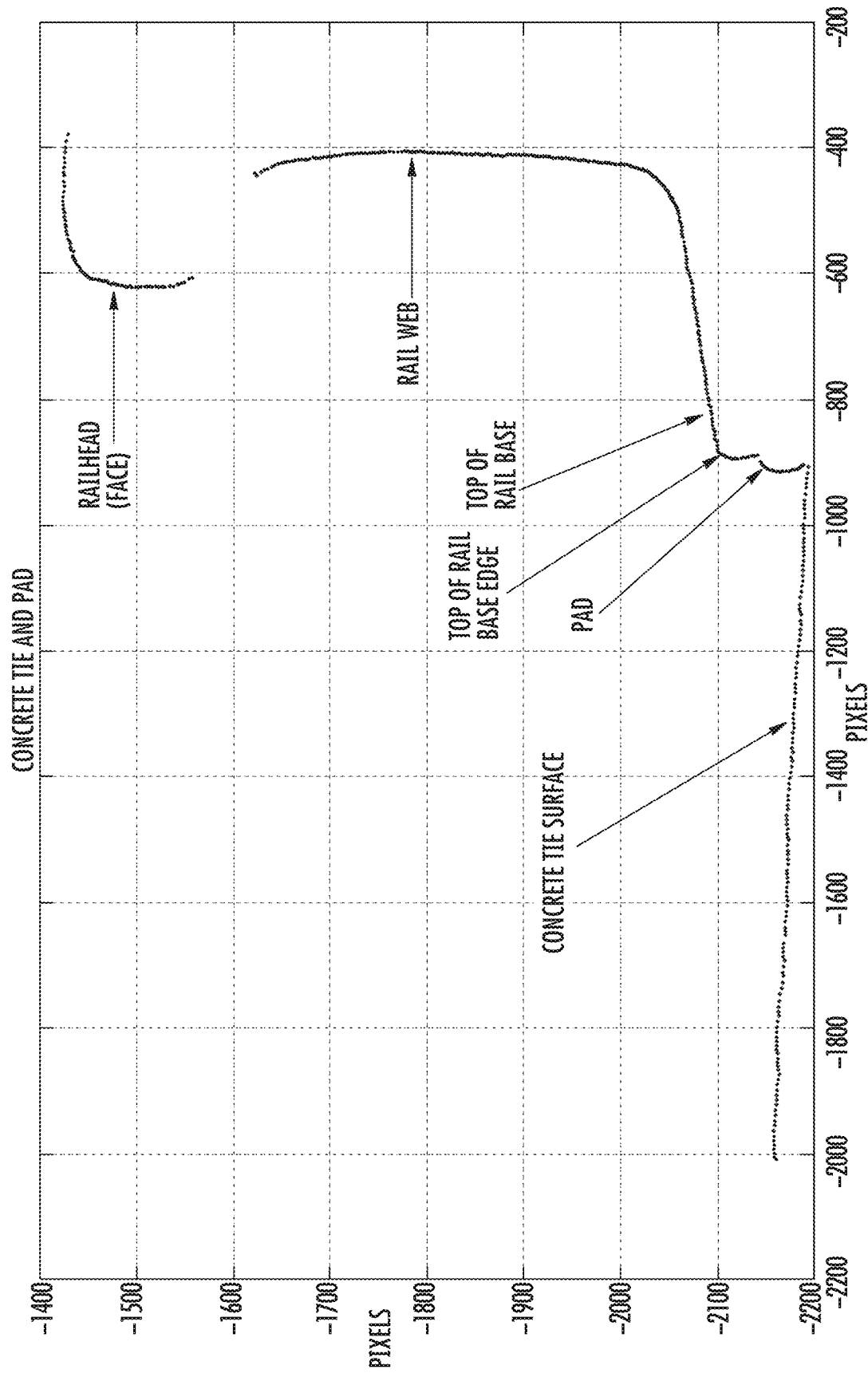
FIG. 50 shows a 3D profile (or scanline) of a rail over a pad and a concrete tie using an embodiment of the track assessment system described herein, wherein the image has been geometrically corrected from the raw data obtained at an oblique angle using a 3D sensor.
Figure 51:
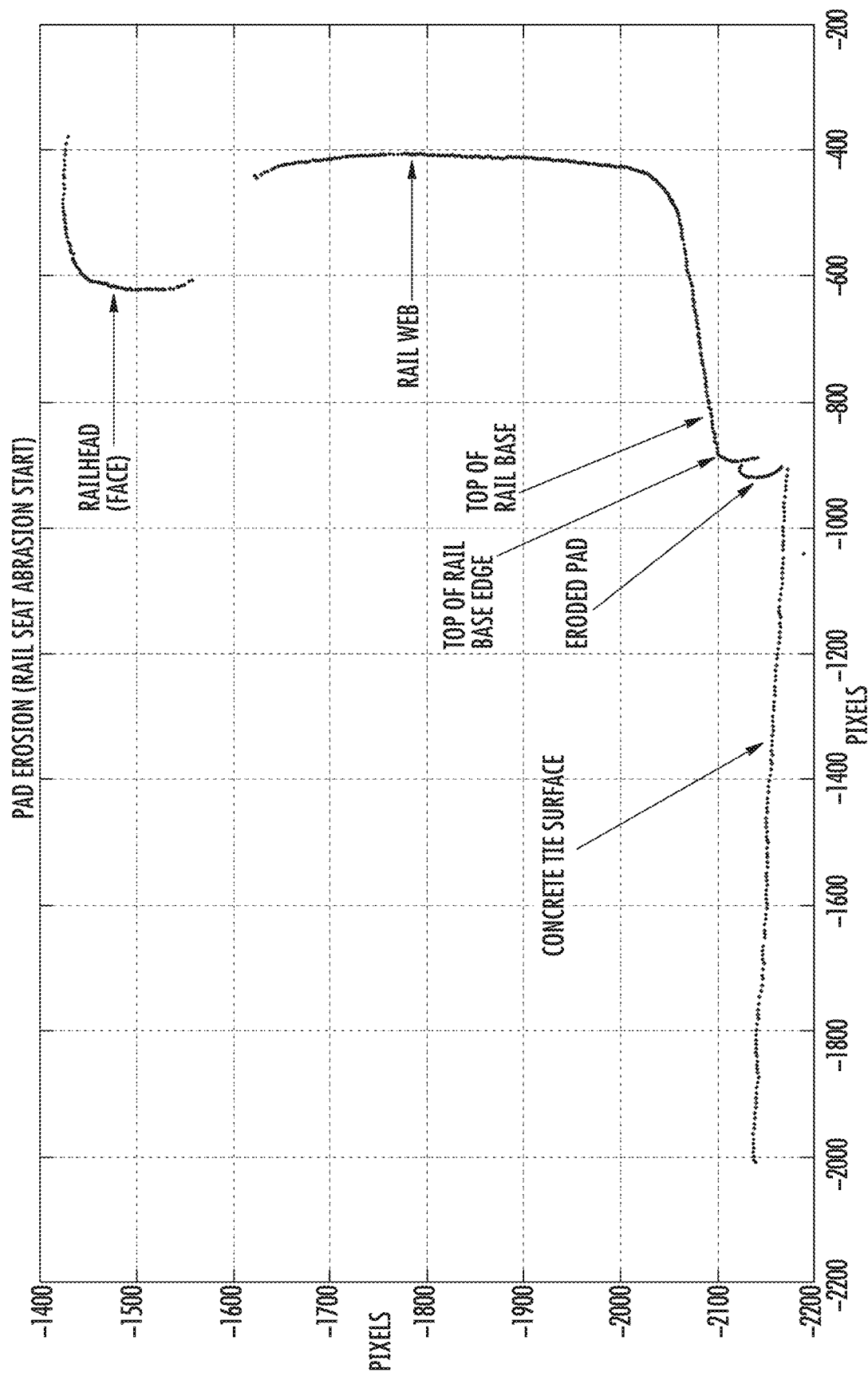
FIG. 51 shows a 3D profile (or scanline) of a rail over a pad and a concrete tie using an embodiment of the track assessment system described herein, wherein the pad shows signs of erosion and wherein the image has been geometrically corrected from the raw data obtained at an oblique angle using a 3D sensor.
Figure 52:
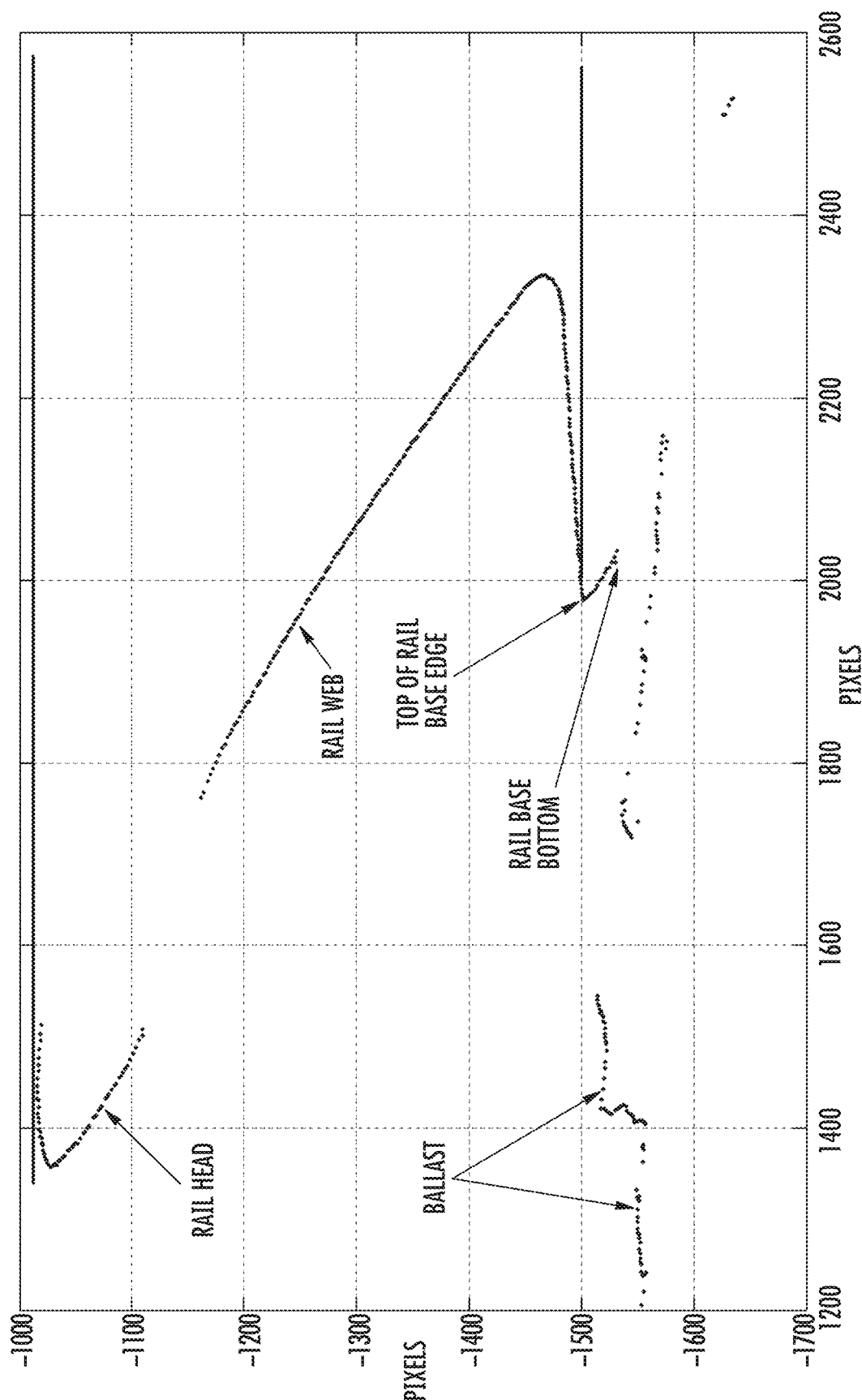
FIG. 52 shows a typical 3D profile (or scanline) of a rail next to ballast using an embodiment of the track assessment system described herein, wherein the image has not been geometrically corrected from the raw data obtained at an oblique angle using a 3D sensor.

Because of the unique orientation of the sensors 502 relative to rails being interrogated, the system 500 also can be used to make direct determinations of rail seat abrasion or plate cut. Computer executable instructions stored on a computer readable storage medium in communication with the processor 508 are used to run this algorithm shown in a flowchart in FIG. 48 (with reference to FIG. 43, and FIGS. 49-51). A first step includes calibrating the specific 3D sensor to define the sensor real world unit pixel width (Step 900). A typical example of pixel width would be 0.3 mm. This step allows the system 500 to know that the width/height of a single pixel in a gathered image equals a specific length in real-world coordinates. The next step is for the system 500 to advance along a railway track gathering data using a 3D sensor 502 (Step 902). The processor 508 then locates the rail base bottom pixel in a scanline, typically when the rail is situated over ballast and the rail base bottom is evident based on the scanline of the rail (Step 904) (see, for example, FIG. 49). The rail base bottom pixel is found by using known horizontal edge detection methods such as first-order profile derivatives, or Canny edge detector methods applied to a region of the profile in close proximity to the rail base top edge. Horizontal edge detection methods are applied to the region below the rail base top edge (lower region of the profile) to determine the rail base bottom edge. Based on the characteristics of the scanline and using a machine vision algorithm, the processor 508 visually determines whether the rail is situated on top of a tie in that particular scanline (Step 906). An example of a scanline using this technique in which a tie is included is shown in FIG. 50 wherein the tie can be clearly seen in the lower region of the profile. The smooth (flat) tie surface can be detected as a region with similar surface normals (vertical) and/or near zero first-order vertical gradients. If not situated on a tie (as shown in FIG. 49), the processor 508 reverts to Step 902. If the rail base is situated on a tie in that scanline (as shown in FIG. 50), the processor 508 locates a pixel representing the top of the tie (Step 908). The top of tie pixel is selected as a pixel from the tie surface region defined above, in close proximity to the rail base edge. The system 500 preferably keeps track of the bottom of the base of the rail continuously with each scanline regardless of whether a tie is present. The processor 508 then calculates the pad thickness as Step 910 using the equation as follows: (Rail Base Bottom Pixel−Tie Top Pixel)×(sensor pixel width [as determined in Step 900]). The processor 508 then determines whether the pad thickness is less than 0 (Step 912). If the pad thickness is not less than 0, the processor 508 defines rail seat abrasion as 0 (Step 914) and then reverts to Step 902. If the pad thickness is less than 0, the processor 508 determines the rail seat abrasion value to be the absolute value of the measured pad thickness and the pad thickness itself is assigned to be 0 (Step 916). The processor 508 then reverts to Step 902. Slanted scanlines gathered from the sensors 502 (as shown for example in FIG. 52) can be corrected through a geometric transformation step using the processor so that the view is more in line with a real-world side view as shown, for example, in FIGS. 49-51. However, it is not necessary for the processor 508 to make such a correction because the necessary pixels can be identified and calculations made based on the scanlines similar to the one shown in FIG. 52 if needed.

Figure 53:
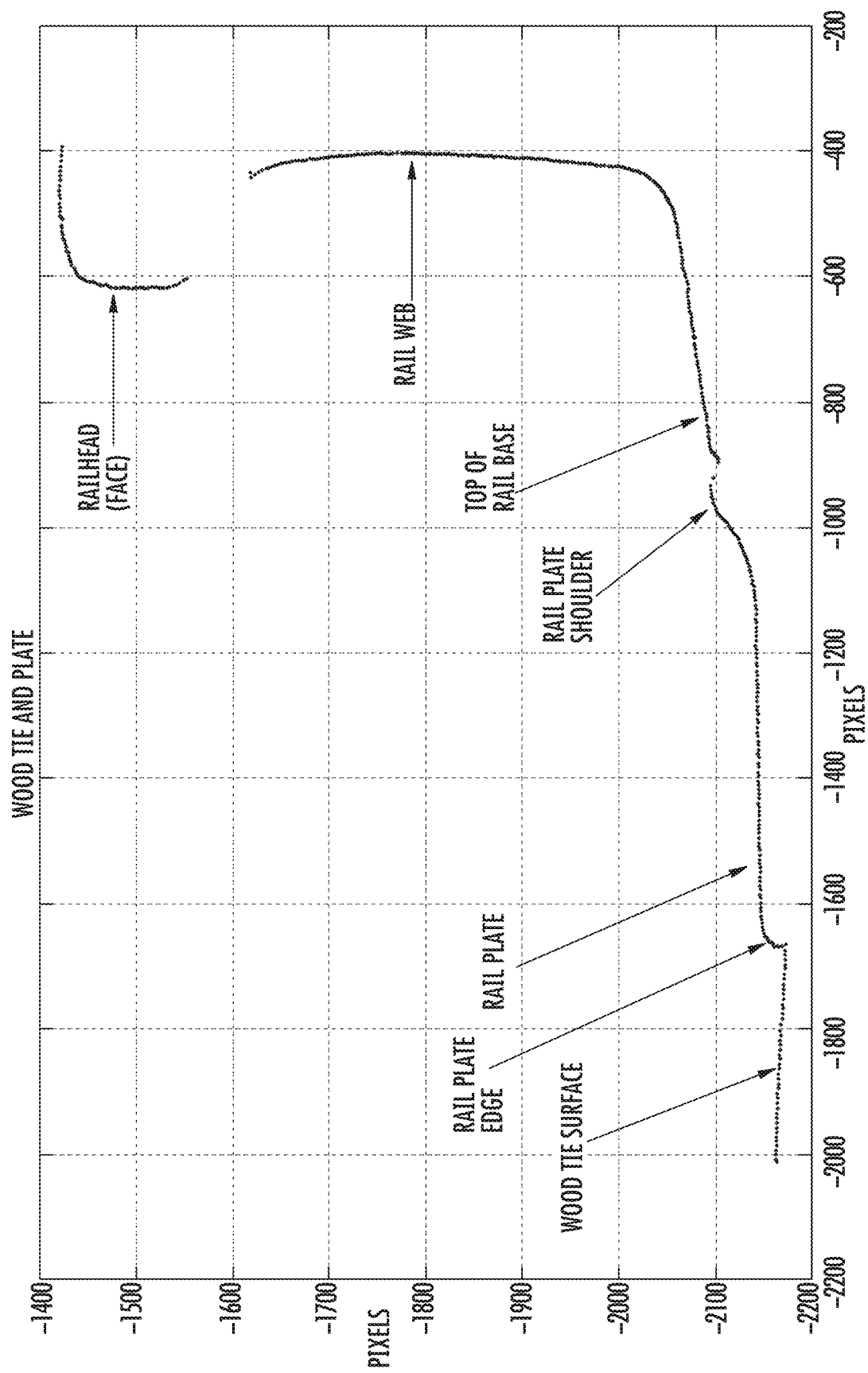
FIG. 53 shows a 3D profile (or scanline) of a rail over a tie plate and a wooden tie using an embodiment of the track assessment system described herein, wherein the image has been geometrically corrected from the raw data obtained at an oblique angle using a 3D sensor.
Figure 54:
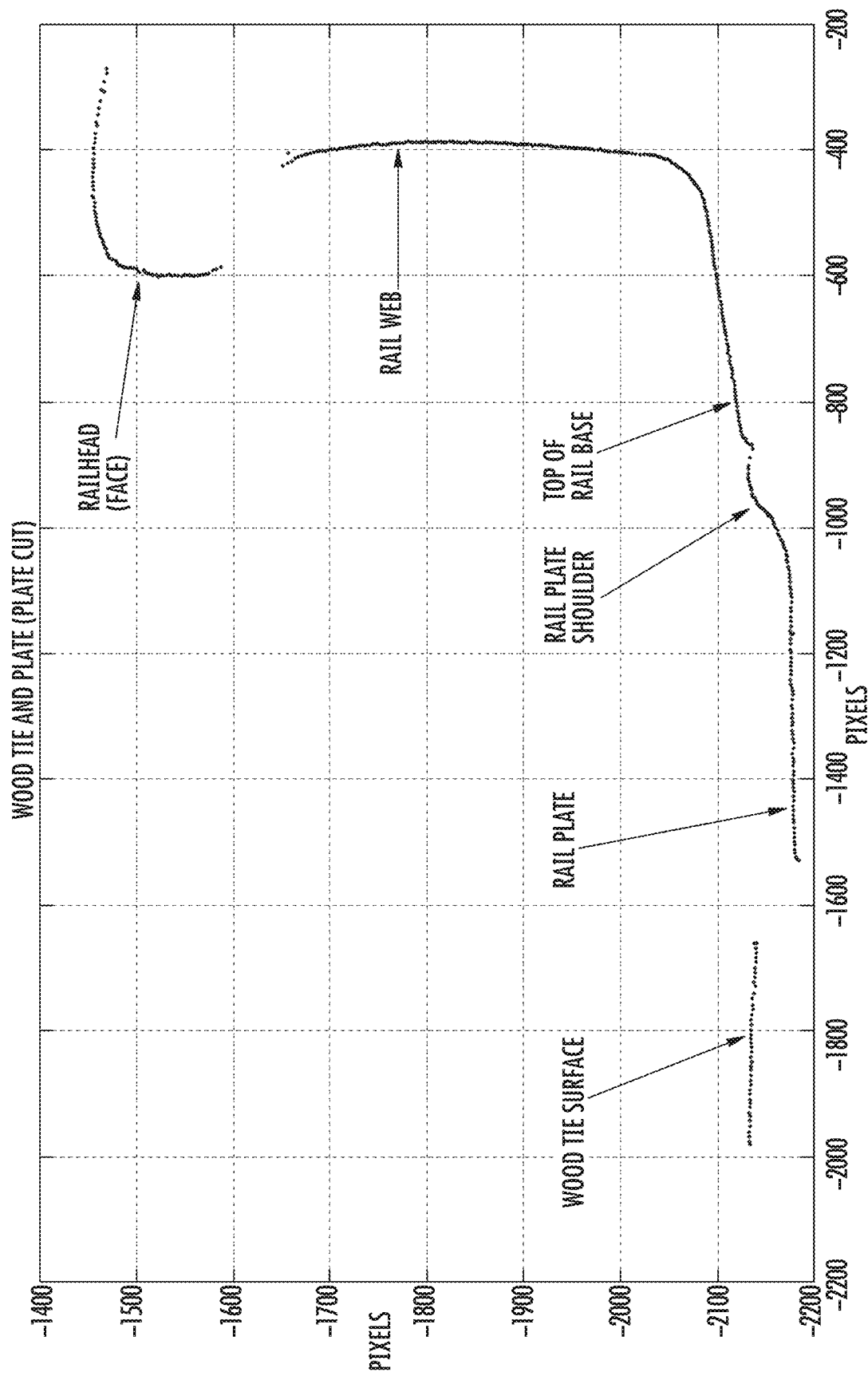
FIG. 54 shows a 3D profile (or scanline) of a rail over a tie plate and a wooden tie using an embodiment of the track assessment system described herein, wherein the tie plate has cut into the wooden tie on which it rests and wherein the image has been geometrically corrected from the raw data obtained at an oblique angle using a 3D sensor.
Figure 55:
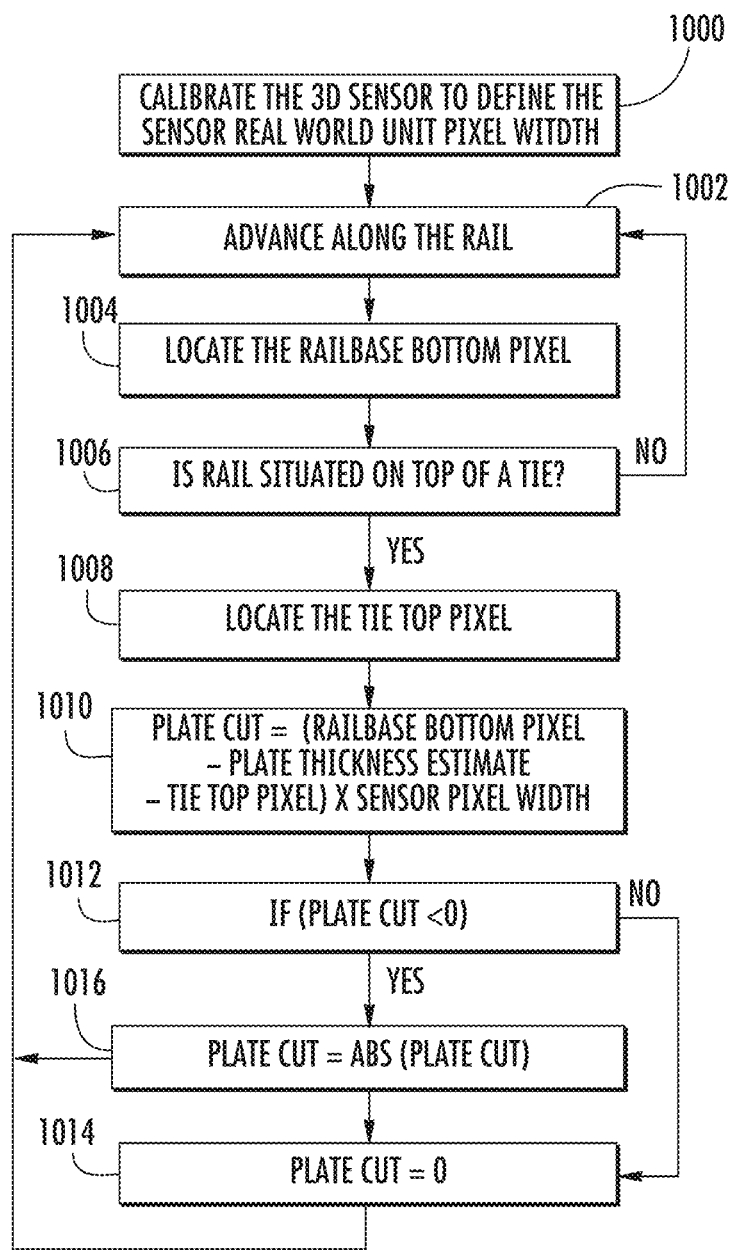
FIG. 55 shows a flowchart showing an algorithm used by a system controller to determine plate cut of a tie plate into a wooden tie based on input from a 3D sensor.

If the system 500 is detecting plate cut values, a slightly different algorithm is used because the estimated thickness of the tie plate must be accounted for. Computer executable instructions stored on a computer readable storage medium in communication with the processor 508 are used to run this algorithm shown in a flowchart in FIG. 55 with reference to FIG. 49, FIG. 53 and FIG. 54. A first step includes calibrating the specific 3D sensor to define the sensor real world unit pixel width (Step 1000). A typical example of pixel width would be 0.3 mm. This step allows the system 500 to know that the width/height of a single pixel in a gathered image equals a specific length in real-world coordinates. The next step is for the system 500 to advance along a railway track gathering data using a 3D sensor 502 (Step 1002). The processor 508 then locates the rail base bottom pixel in a scanline, typically when the rail is situated over ballast and the rail base bottom is evident scanline of the rail (Step 1004) (see, for example, FIG. 49). The rail base bottom pixel is found by using known horizontal edge detection methods applied to a region of the profile in close proximity to the top of rail base edge for profiles not located above a tie. Horizontal edge detection methods are applied to the region below the rail base top edge (lower region of the profile) to determine the rail base bottom edge. Based on the characteristics of the scanline and using a machine vision algorithm, the processor 508 visually determines whether the rail is situated on top of a tie in that particular scanline (Step 1006). An example of a scanline using this technique in which a tie is included is shown in FIG. 53 wherein the tie plate and associated tie can be clearly seen in the lower region of the profile. The smooth (flat) tie plate surface can be detected as a region with similar surface normals (vertical) and/or near zero first-order vertical gradients and a plate shoulder profile elevation approximately the same elevation as the rail base elevation. If not situated on a tie (as shown in FIG. 49), the processor 508 reverts to Step 1002. If the rail base is situated on a tie in that scanline (as shown in FIG. 53), the processor 508 locates a pixel representing the top of the tie (Step 1008). The top of tie surface is identified as a region with similar surface normals (vertical) and/or near zero first-order vertical gradients. A top of tie pixel is selected from the tie surface region defined above, in close proximity to the rail plate edge. The equation below is used by the processor 508 to calculate plate cut (Step 1010) as follows: (Rail Base Bottom Pixel−Estimated Plate Thickness−Tie Top Pixel)×Sensor Pixel Width. The processor then determines whether the plate cut is less than 0 (Step 1012). If the plate cut is not less than 0 (as shown in FIG. 53), the processor 508 defines plate cut as 0 (Step 1014) and then reverts to Step 1102. If the plate cut is less than 0 (as shown in FIG. 54), the processor 508 determines the plate cut value to be the absolute value of the measured plate cut (Step 1016). The processor 508 then reverts to Step 1002. Slanted scanlines gathered from the sensors 502 (as shown for example in FIG. 52) can be corrected through a geometric transformation step using the processor 508 so that the view is more in line with a real-world side view as shown, for example, in FIGS. 53-54. However, it is not necessary for the processor 508 to make such a correction because the necessary pixels can be identified and calculations made based on the scanlines similar to the one shown in FIG. 52 if needed.

One of the advantages of the embodiments described herein is that some of the embodiments represent the first non-contact 3D measurement/analysis of rail webs for the purposes of rail manufacturing mark inventory (required for accurate rail asset management not currently possible) at the network level. The ability to take this type of inventory allows regulatory compliance assessments for rail at the network level (right rail type for the place/use it has been installed). Certain embodiments herein also represent the first 3D measurement/analysis of other side-of-rail hardware (joints, welds, bond wires, rail pads thickness for PCC ties) not previously possible at the network level. These embodiments augment emerging downward looking 3D track assessment technologies with the ability to look at the 'side' of the rails which are one of the most critical components of the overall track structure. Such embodiments produce for the first time a more complete 3D view of the track surface including such side views.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of clearing debris from the view of a sensor of a railway track assessment system, the method comprising:
   i. blowing air from an air blowing device on a rail vehicle wherein such air is blown through a duct to an air distribution lid attached adjacent to a cover plate of a sensor enclosure, the cover plate including a first glass panel and a second glass panel; and
   ii. clearing the first glass panel and the second glass panel of debris using the air flowing through the air distribution lid.

2. The method of claim 1 wherein the operation of blowing air from an air blowing device further comprises blowing air from the air blowing device to the air distribution lid, the air distribution lid further comprising:
   a first duct mount;
   a first walled enclosure adjacent to the first glass panel;
   a first enclosed channel providing space for air to flow from the first duct mount to the first walled enclosure proximate to the first glass panel;
   a first air distribution lid first aperture at least partially covering the first glass panel;
   a second duct mount;
   a second walled enclosure adjacent to the second glass panel; and
   a second enclosed channel providing space for air to flow from the second duct mount to the second walled enclosure proximate to the second glass panel.

3. The method of claim 2 wherein the operation of blowing air from an air blowing device further comprises blowing air from the air blowing device through the first duct mount and the second duct mount, through the first enclosed channel and the second enclosed channel, to the first walled enclosure and the second walled enclosure to dislodge debris from the first glass panel and the second glass panel during operation of the railway track assessment system.

4. A method for analyzing the side of a rail of a railway track comprising:
   i. projecting light from a structured light generator onto the side of a rail wherein the structured light generated is located in a sensor enclosure on a rail vehicle;
   ii. obtaining data from the side of the rail using a first 3D sensor located in the sensor enclosure;
   iii. blowing air from an air blowing device on the rail vehicle wherein such air is blown through a duct to an air distribution lid attached adjacent to a cover plate of the sensor enclosure, the cover plate including a first glass panel and a second glass panel, thereby clearing the first glass panel and the second glass panel of debris.

5. The method of claim 4 further comprising:
   iv. blowing air from the air blowing device on the rail vehicle wherein such air is blown through the duct to the first exit location wherein the first exit location is proximate to the sensor enclosure comprising a first transparent window through which the structured light generator has a field of view, thereby clearing the first transparent window of debris using the air exiting the duct at the exit location.

6. The method of claim 4 further comprising:
   iv. blowing air from the air blowing device on the rail vehicle wherein such air is blown through the duct to a second exit location wherein the second exit location is proximate to the sensor enclosure comprising a second transparent window through which the 3D sensor has a field of view, thereby clearing the second transparent window of debris using the air exiting the duct at the exit location.

7. The method of claim 4 wherein the operation of blowing air from an air blowing device further comprises blowing air from the air blowing device to the air distribution lid, the air distribution lid further comprising:
   a first duct mount;
   a first walled enclosure adjacent to the first glass panel;
   a first enclosed channel providing space for air to flow from the first duct mount to the first walled enclosure proximate to the first glass panel;
   a first air distribution lid first aperture at least partially covering the first glass panel;
   a second duct mount;
   a second walled enclosure adjacent to the second glass panel; and
   a second enclosed channel providing space for air to flow from the second duct mount to the second walled enclosure proximate to the second glass panel.

8. The method of claim 4 wherein the operation of projection light from a structured light generator comprises projecting light through the first glass panel, the first glass panel comprising a light transmission band that is compatible with the wavelengths of the structured light generator, allowing most of any generated light from the structured light generator to pass through the first glass panel and not be reflected back into the sensor enclosure by the first glass panel.

* * * * *